Jan. 20, 1953
N. B. COLEY
2,626,382
AIR TRAFFIC CONTROL SYSTEM
Filed April 13, 1950
14 Sheets-Sheet 1
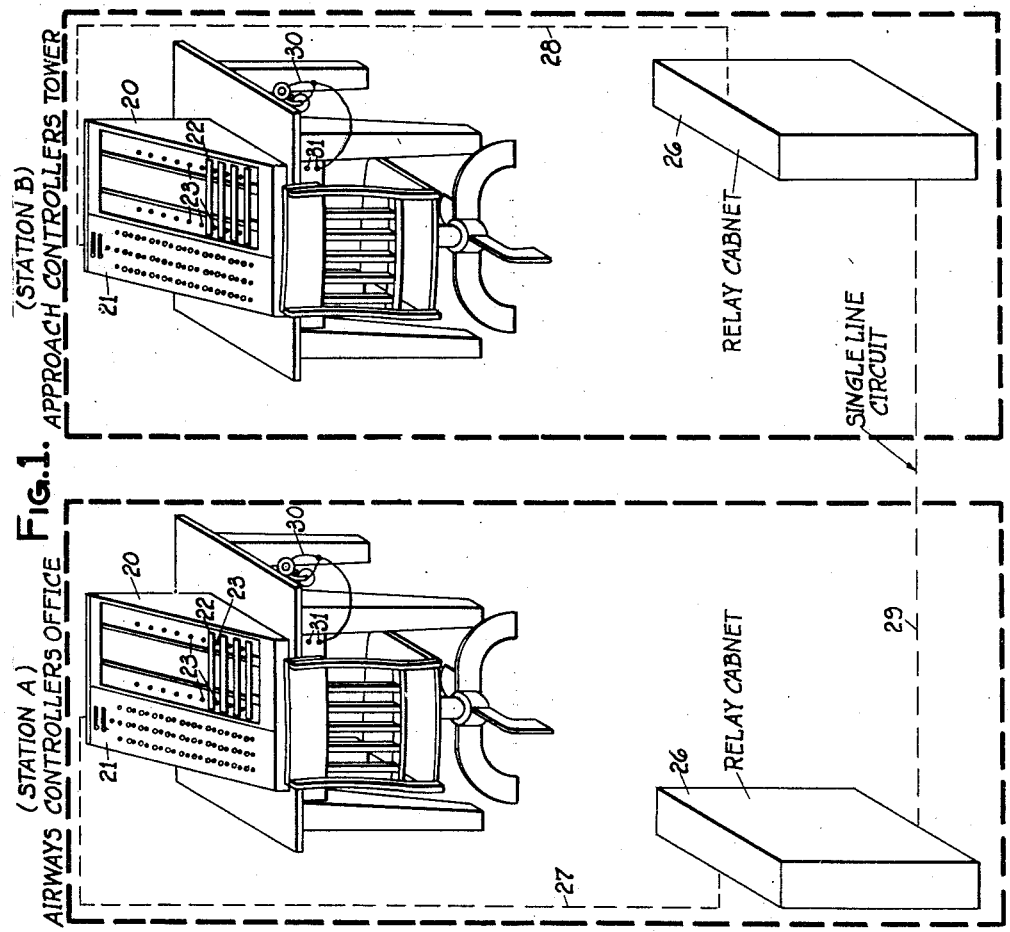
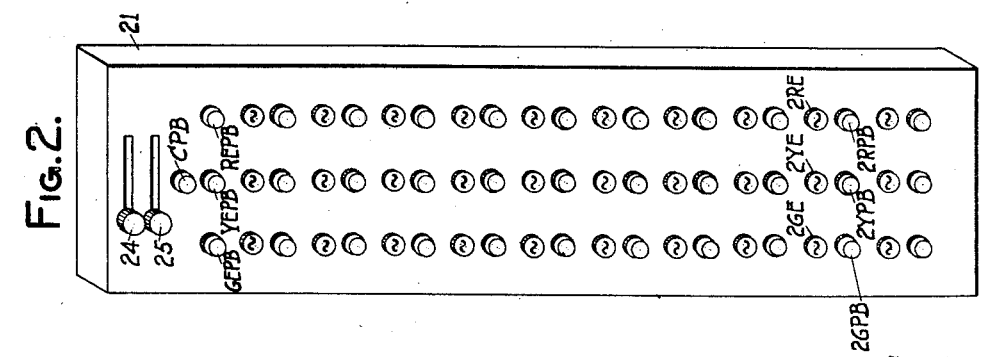
Inventor
N. B. Coley.
Neil W. Preston,
his Attorney

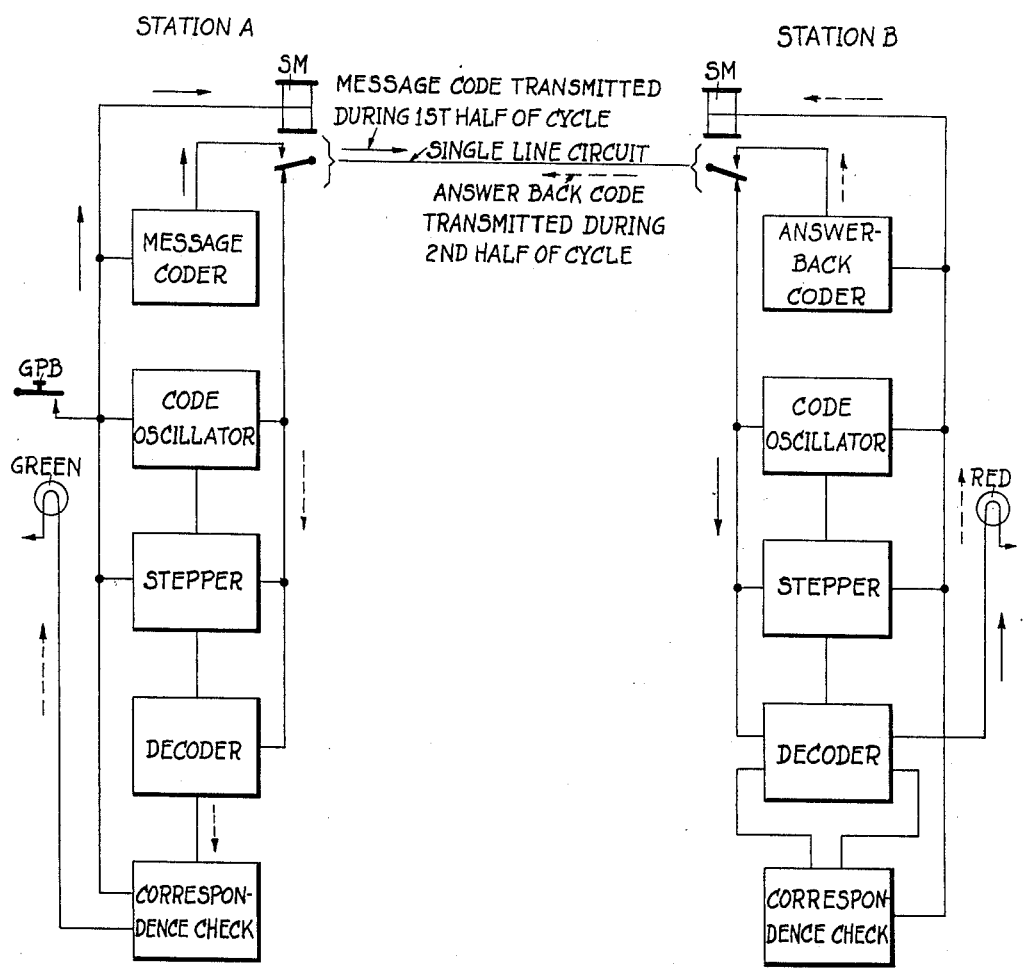

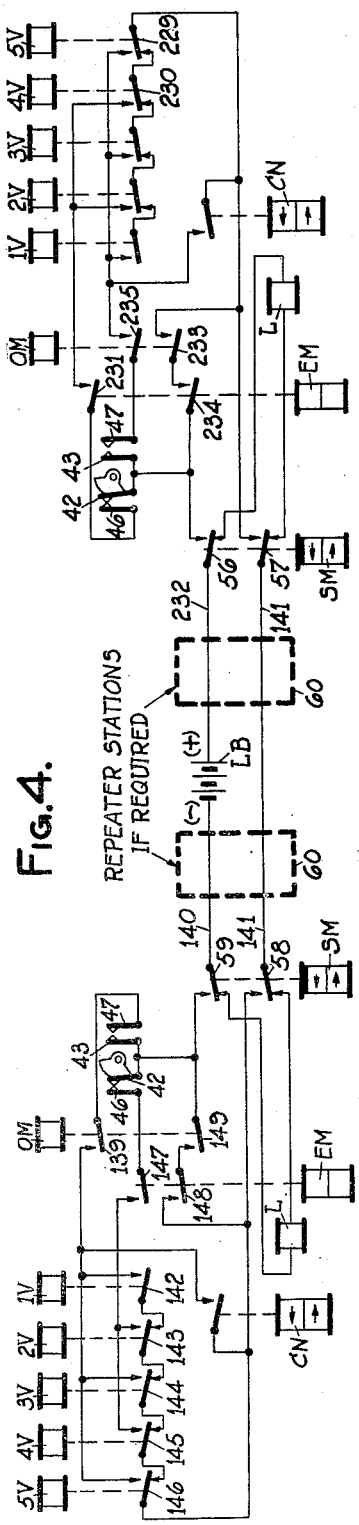

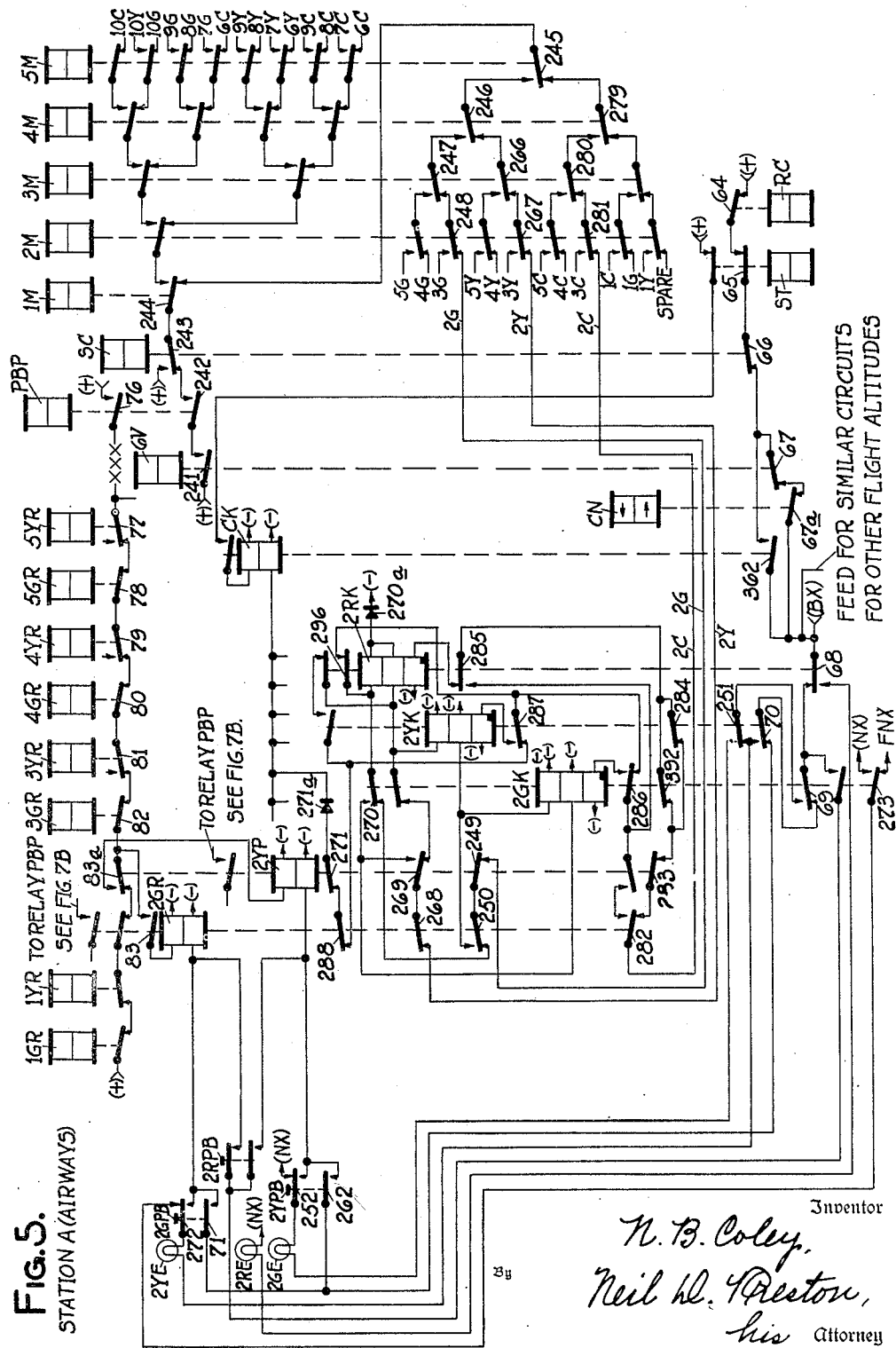

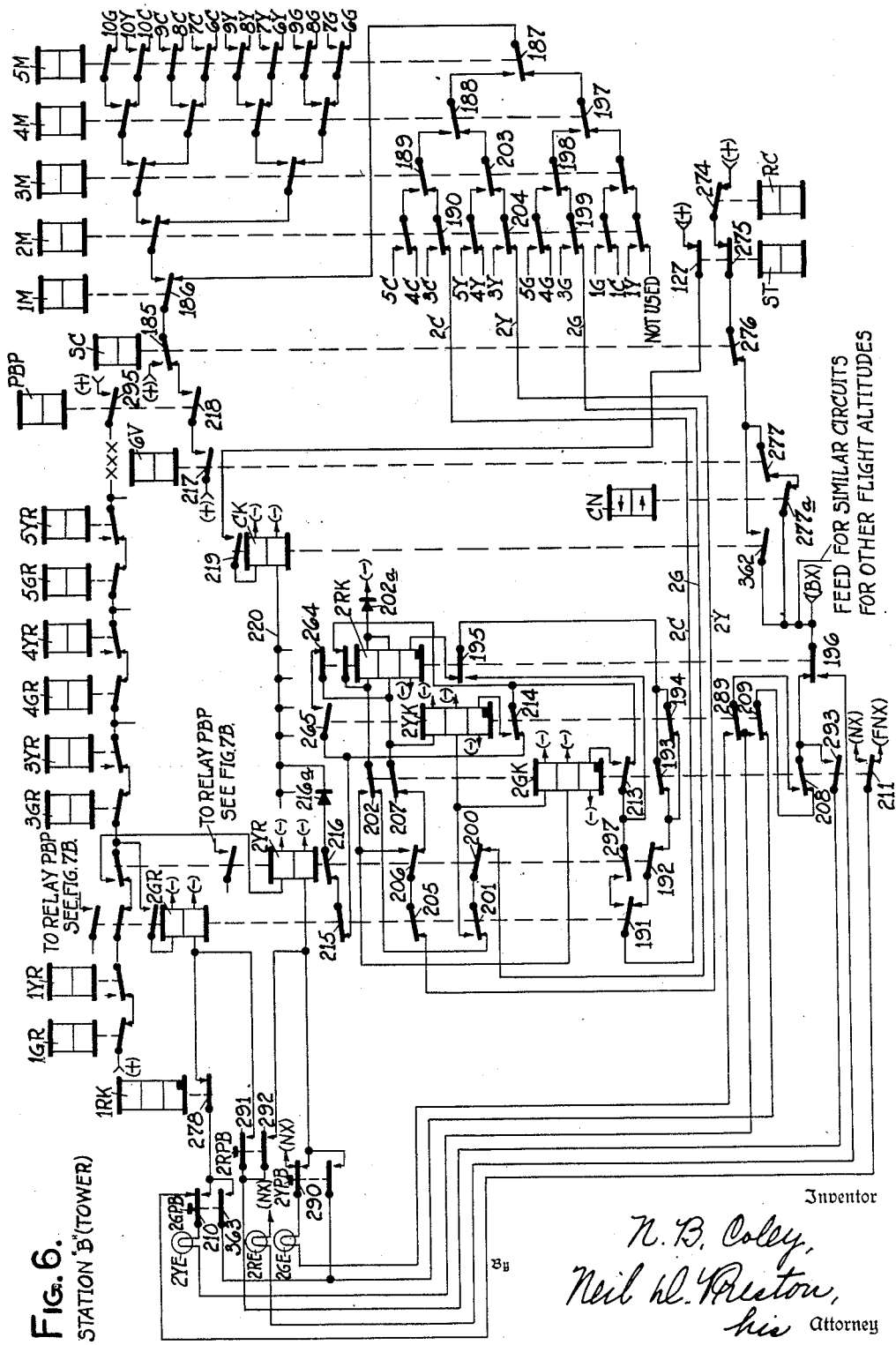

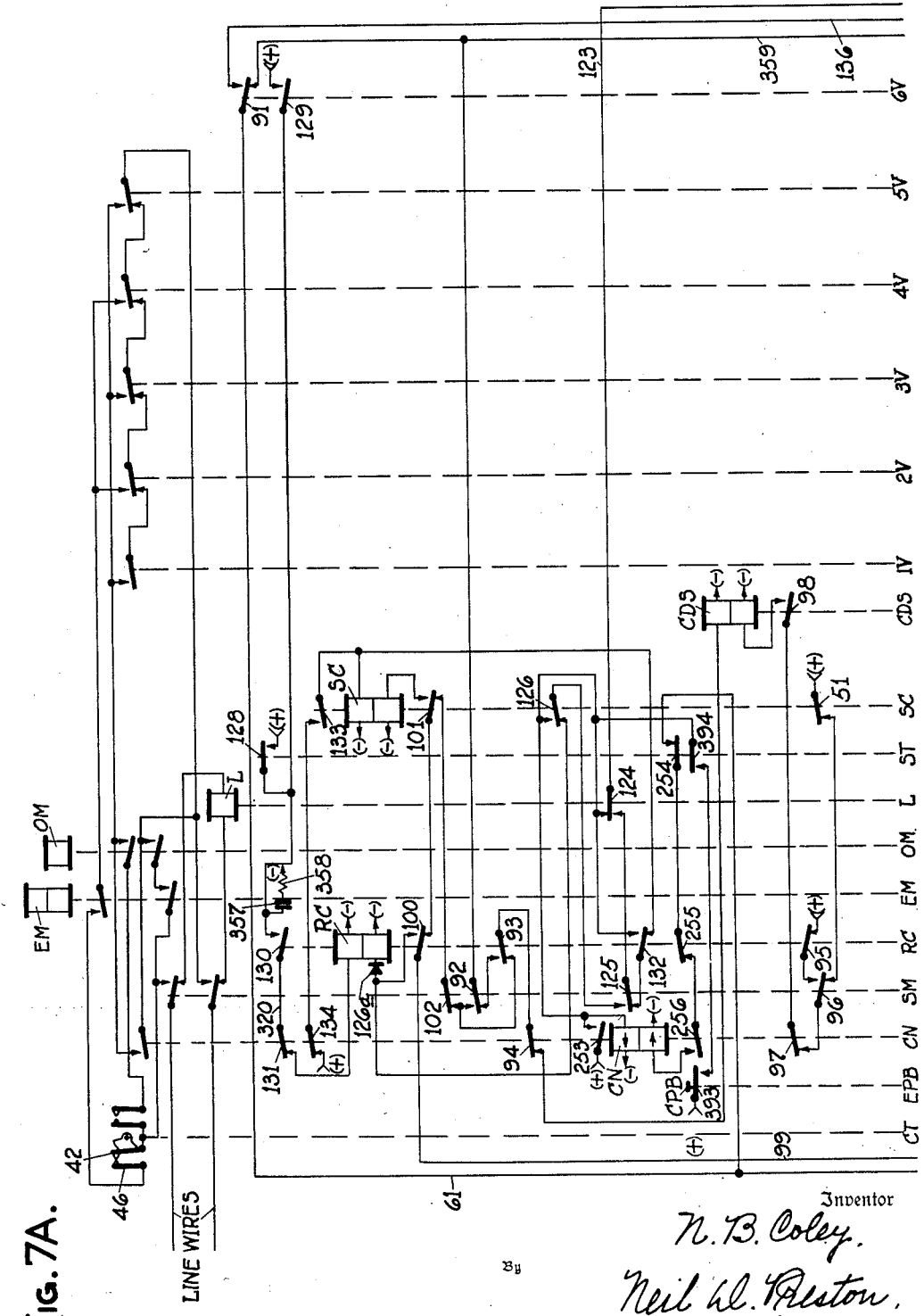

Jan. 20, 1953 N. B. COLEY 2,626,382
AIR TRAFFIC CONTROL SYSTEM
Filed April 13, 1950 14 Sheets-Sheet 10
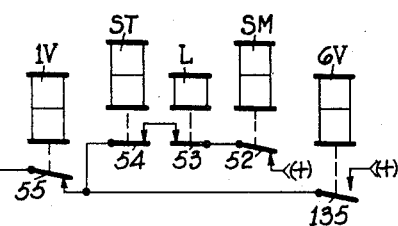
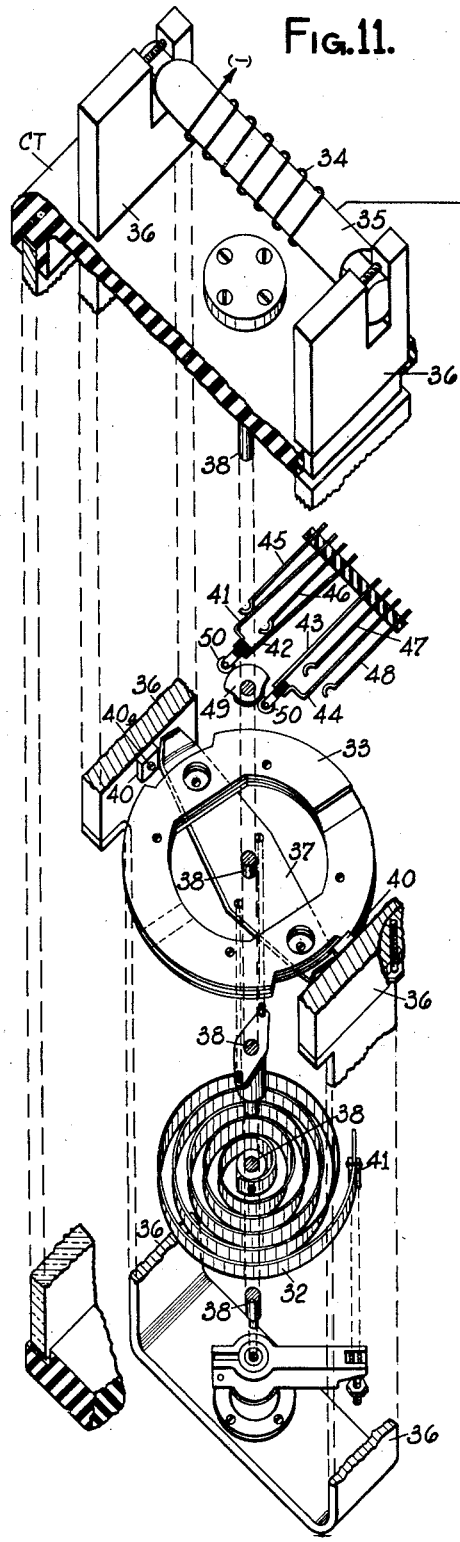
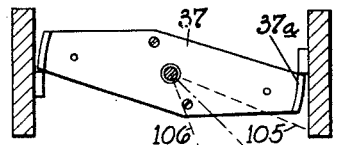
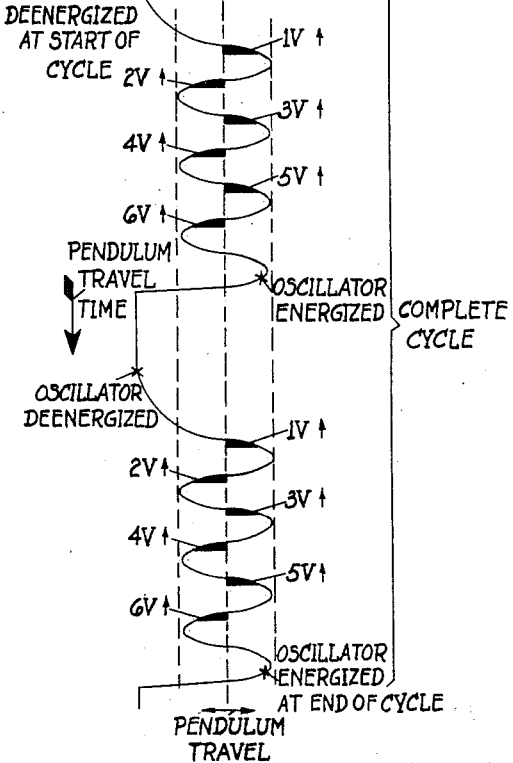
Inventor
N. B. Coley,
Neil D. Barstow,
his Attorney FOR 2ND FLIGHT ALTITUDE CLEARANCE "SPACE-SPACE-SPACE-MARK-MARK" TRANSMISSION FROM STATION A. TO STATION B.

Jan. 20, 1953 N. B. COLEY 2,626,382
AIR TRAFFIC CONTROL SYSTEM
Filed April 13, 1950 14 Sheets-Sheet 14

Inventor
N. B. Coley,
Neil D. Preston
his Attorney

Patented Jan. 20, 1953

2,626,382

UNITED STATES PATENT OFFICE 2,626,382

AIR TRAFFIC CONTROL SYSTEM

Nelson B. Coley, Rochester, N. Y., assignor to General Railway Signal Company, Rochester, N. Y.

Application April 13, 1950, Serial No. 155,720

18 Claims. (Cl. 340—26)

This invention relates to air traffic control systems, and it particularly pertains to such systems employing normally at rest code communication apparatus for communicating various indication and interlock controls relative to flight altitude reservations between remotely spaced controllers' offices.

Such a system is of particular utility in coordinating the assignment of airplane flights to respective flight altitudes by respective airways and tower approach controllers, particularly where the offices or stations of these controllers are spaced remotely from each other. An airways controller is particularly concerned with the assignment of flight altitudes for airplane flights involved in cross country flying, while an airport approach controller is particularly concerned with the landing of airplanes at an airport. Thus there must be a transfer of authority for controlling airplane flights from an airways controller to an approach controller when the airplanes involved come within a particular area, fix or stack in approach to an airport. Schemes facilitating such transfer of authority are disclosed in my prior applications Ser. No. 34,961, filed June 24, 1948, now Patent No. 2,529,596, issued November 14, 1950, and Ser. No. 93,900, filed May 18, 1949, now Patent No. 2,515,633, issued July 18, 1950, and no claim is made herein to that which is disclosed in either of these applications.

It is a requisite of systems of this character that the circuits be so organized that an open circuit, particularly by a line circuit becoming broken, or energized by an instantaneous line surge and the like, cannot cause a failure of apparatus in a manner to permit the obtaining of a false clearance indication.

An object of the present invention is to provide a normally at rest code communication system wherein a designated control at one station is transmitted over a single line circuit to the other station during the first half of a control cycle of operation, and it is checked during the last half of the cycle by retransmission of the code by the station which has received the control. Thus for a control code that is transmitted in one direction over a single line circuit during the first half of a control cycle there is a corresponding answer back code transmitted in the opposite direction during the second half of that cycle.

Another object of the present invention is to transmit a designated control by a code comprising characters in the form of "marks" and "spaces," such code being transmitted at a rate determined by an oscillating mechanism including a torsional pendulum that is normally rendered inactive by energization of an electromagnet, and rendered active by the deenergization of the electromagnet upon starting the transmission of a control cycle from the associated station.

Another object of the present invention is to employ a code oscillator at the received station comparable to that which is used to determine the rate of transmission at the other station, to be initiated in response to the control of the line circuit at the beginning of the cycle so as to establish a rate of decoding to receive the message to be the same as the rate at which the message code is transmitted from the other station.

Another object of the present invention is to momentarily energize the electromagnets of the code oscillators at both stations at a midpoint in a control cycle initiated by either station so as to condition both of the oscillators for oscillation during the last half of the cycle during which a check code is transmitted comparable to the message code transmitted during the first half of the cycle.

Another object of the present invention is to permit the transmission of a check code during a communication cycle, only provided that the control code received during the preceding control portion of that cycle has been properly executed to actuate electroresponsive means to a distinctive position predetermined as being called for by the particular code that has been received.

Another object of the present invention is to permit the transmission of a control code only provided that the designated control for transmission is valid as compared to the designation of a control wherein interlocking means has determined that such a control is invalid and cannot be executed because of a prior designated conflicting control.

Another object of the present invention is to so coordinate the code communication system connecting two stations that when the full communication capacity of the system is utilized, controls are transmitted alternately from the respective stations. In other words, the designation of controls for transmission can be made during a cycle of operation of the system, and in case controls are designated for transmission from both stations at the end of a cycle of communication, the receiving station during that cycle will be given preference for transmission during the next cycle of operation.

Other objects, purposes and characteristic features of the present invention will be in part obvious from the accompanying drawings and in part pointed out as the description of the invention progresses.

In describing the invention in detail, reference is made to the accompanying drawings, in which corresponding parts are designated by like reference characters; and in which similar parts having similar functions are designated by like letter reference characters generally having preceding numerals indicative of flight altitude association or of order of operation; and in which:

Fig. 1 is a perspective view illustrating somewhat diagrammatically the general organization provided by the present invention for facilitating the coordination of controlling operations at remotely spaced airways and approach controllers' offices (stations A and B respectively).

Fig. 2 is an elevational view in perspective of a control panel which is typical of panels provided at the respective stations as a part of the flight progress boards as illustrated in Fig. 1.

Fig. 3 illustrates by block diagram the general mode of operation of the system provided according to the present invention for the communication of a control for obtaining a typical flight altitude reservation at a given station.

Fig. 4 illustrates a line circuit which may be employed in a code communication system provided according to the present invention.

Fig. 5 illustrates a circuit organization for apparatus at an airways center (station A) for the control of indicator lamps which are provided for a particularly typical flight altitude, together with decoding means and other circuit organizations which are in some respects common to apparatus involving designation and control of indicators for all flight altitudes.

Fig. 6 illustrates a circuit organization for apparatus at an airport tower (station B) for the control of indicator lamps which are provided for a particularly typical flight altitude, together with decoding means and other circuit organizations which are in some respects common to apparatus involving designation and control of indicators for all flight altitudes.

Figure 7B:
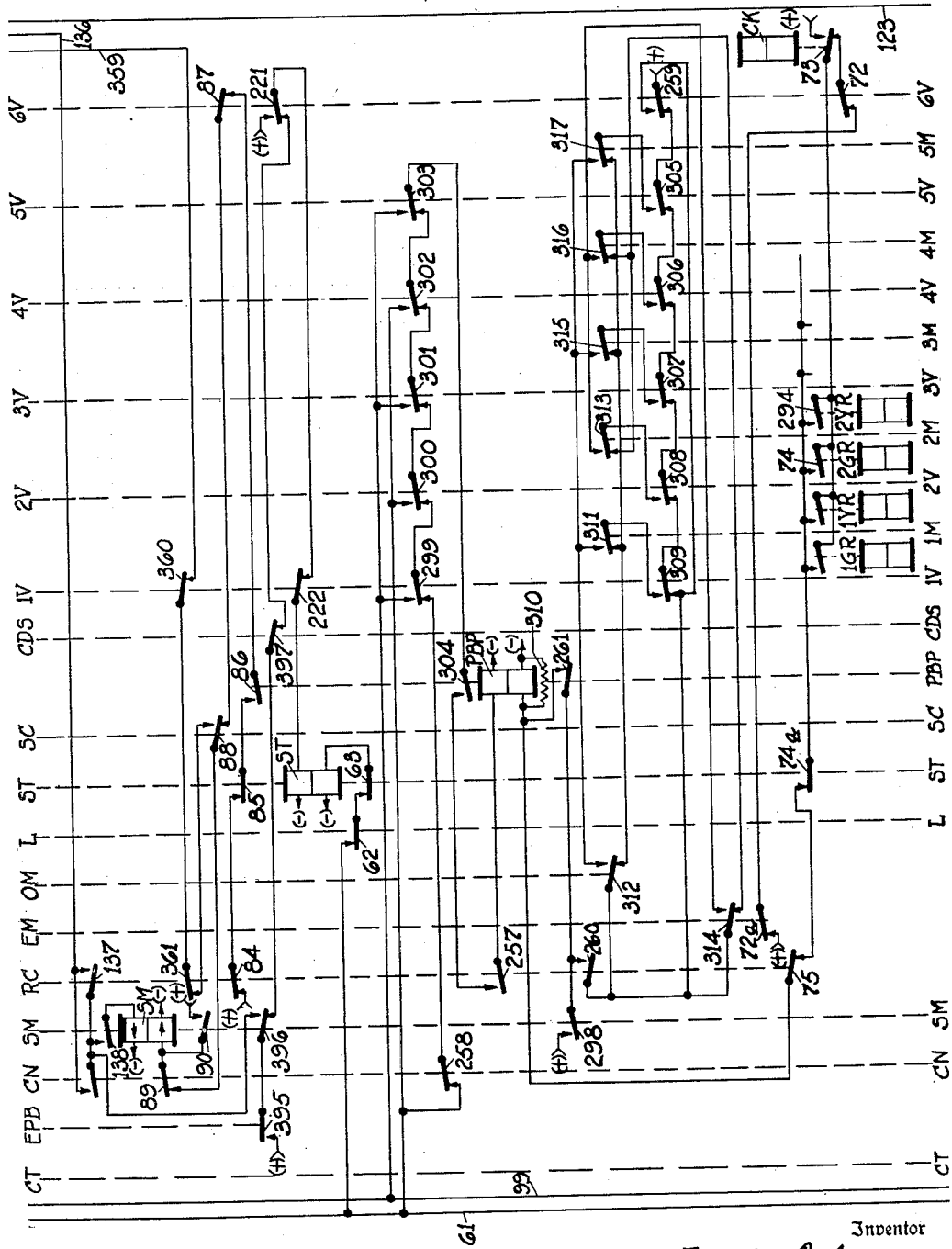
Figure 7C:
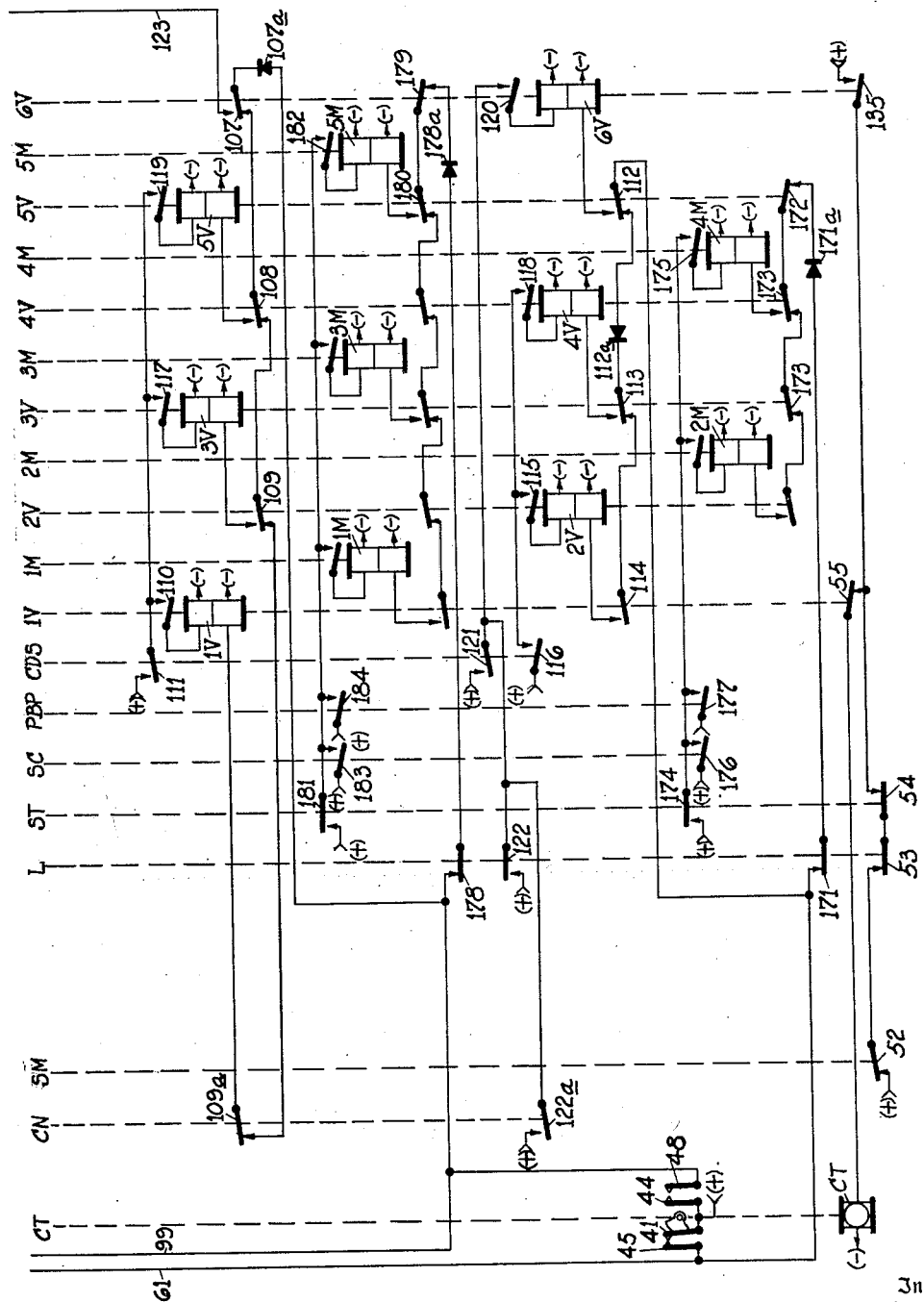

Figs. 7A, 7B and 7C when taken together in vertical alignment illustrate an organization of code communication apparatus that is provided at each station as being common to designations and the control of indications for all flight altitudes.

Figure 8:
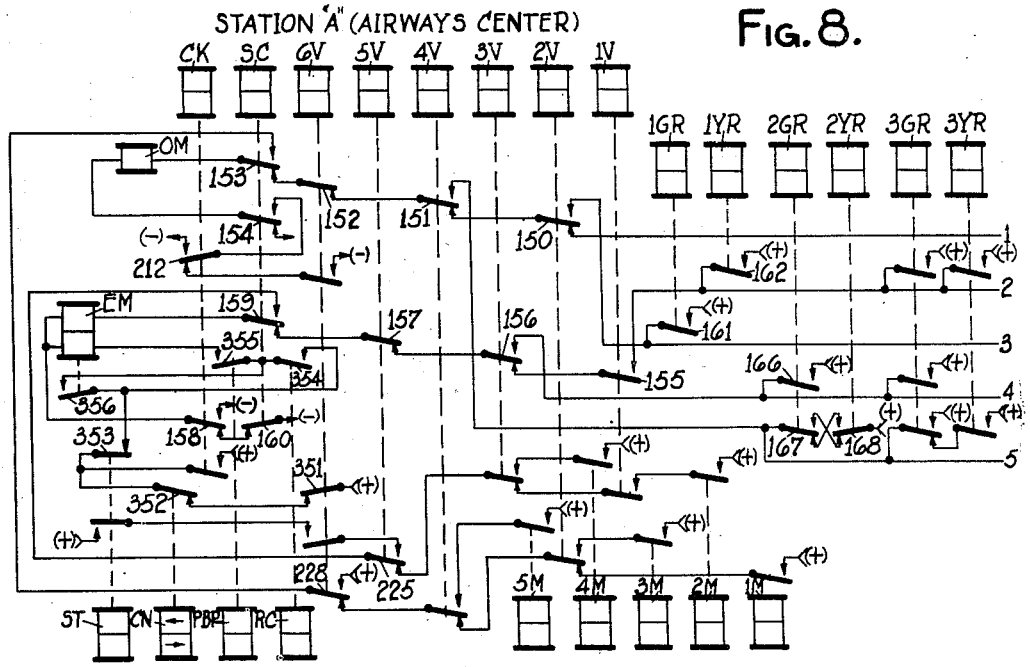

Fig. 8 illustrates code selection circuits for governing the composition of message codes and check codes that may be transmitted from the airways center (station A).

Figure 9:
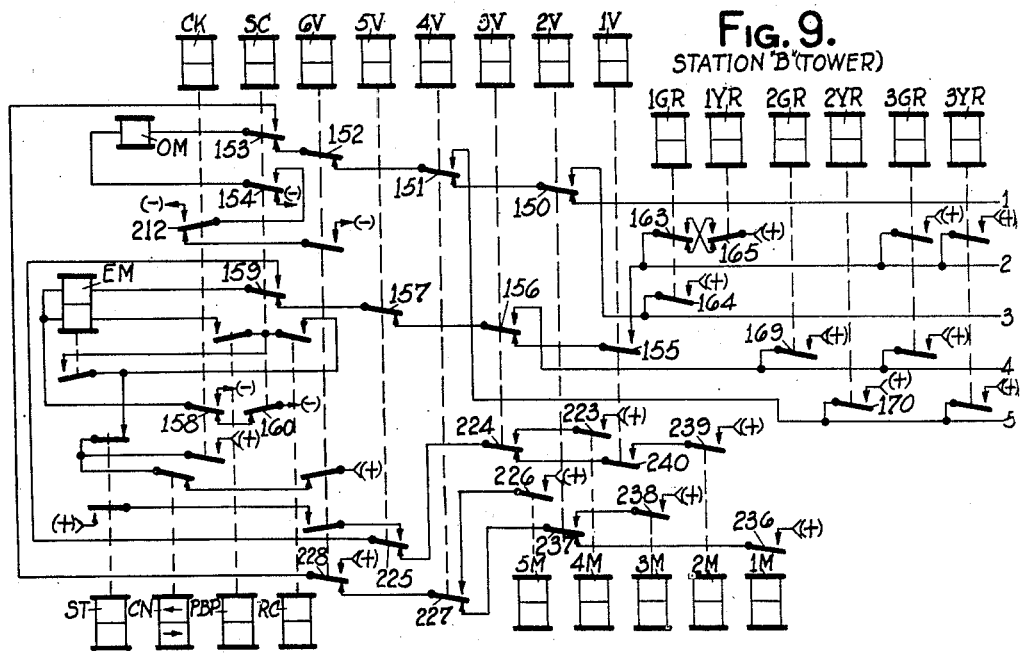

Fig. 9 illustrates code selection circuits for governing the composition of message codes and check codes that may be transmitted from the airport tower (station B).

Fig. 10 is a code chart illustrating the assignment of transmission codes for this embodiment of the present invention.

Fig. 11 illustrates somewhat diagrammatically and partly in perspective the general organization of a suitable code oscillator for use in the code communication system according to the present invention.

Fig. 12 is a plan view partially in cross-section showing the position the armature of an oscillator assumes when the oscillator is energized and illustrating diagrammatically approximate limits of oscillation of the armature when it is allowed to swing free subsequent to deenergization of the oscillator electromagnet.

Fig. 13 is a diagram illustrating pendulum travel of an oscillator during a typical communication cycle.

Figure 14A:
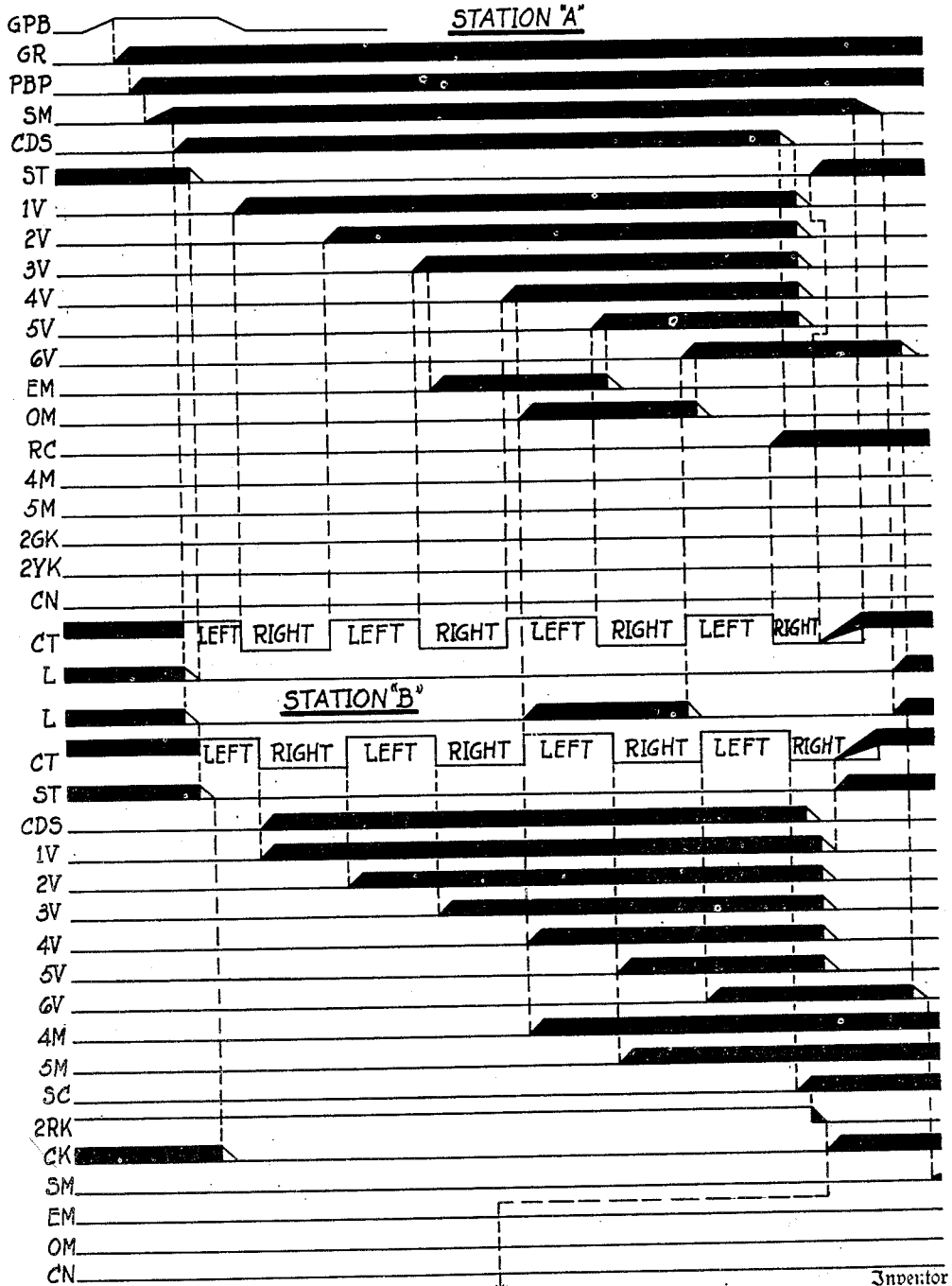
Figure 14B:
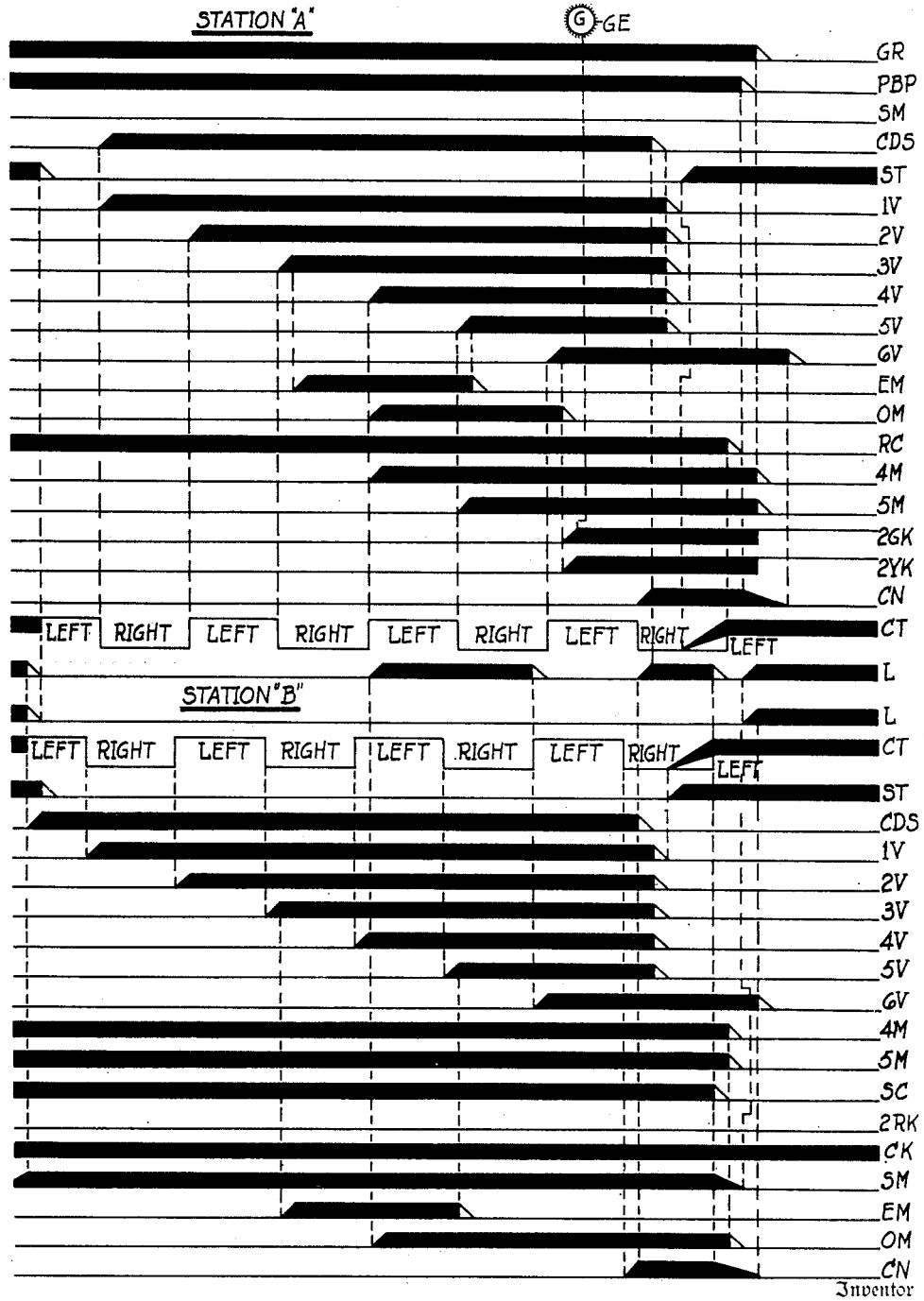

Figs. 14A and 14B when placed end to end constitute sequence charts illustrating approximate relative times of energization of the line circuit and the respective code communication relays that can be obtained during a typical cycle of operation of the communication system for the communication of a reservation control.

Figure 15:
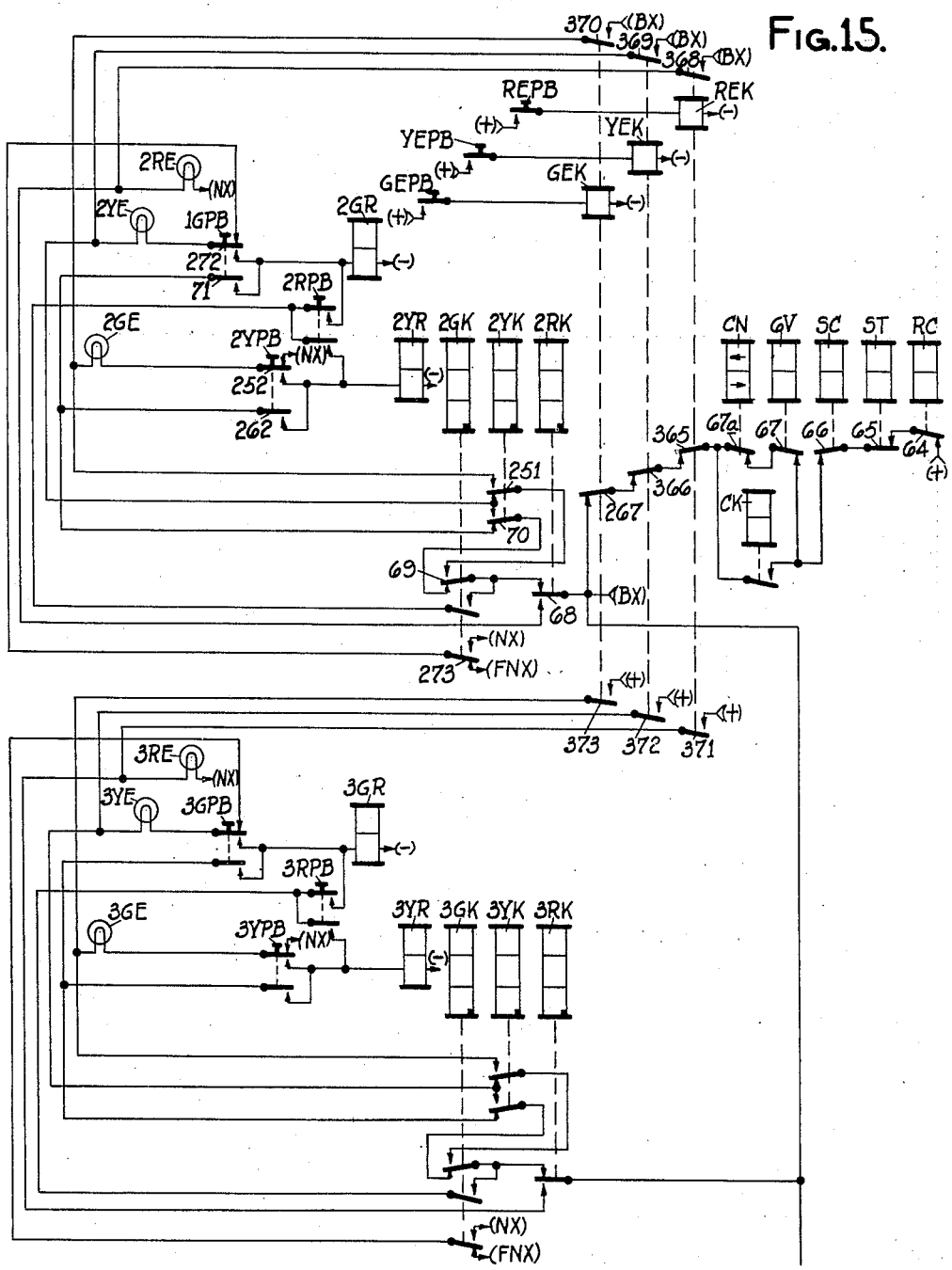

Fig. 15 illustrates a means for checking indicator lamp filaments of lamps of a particular class for all flight altitudes in response to the actuation of a single push button.

Figure 16:
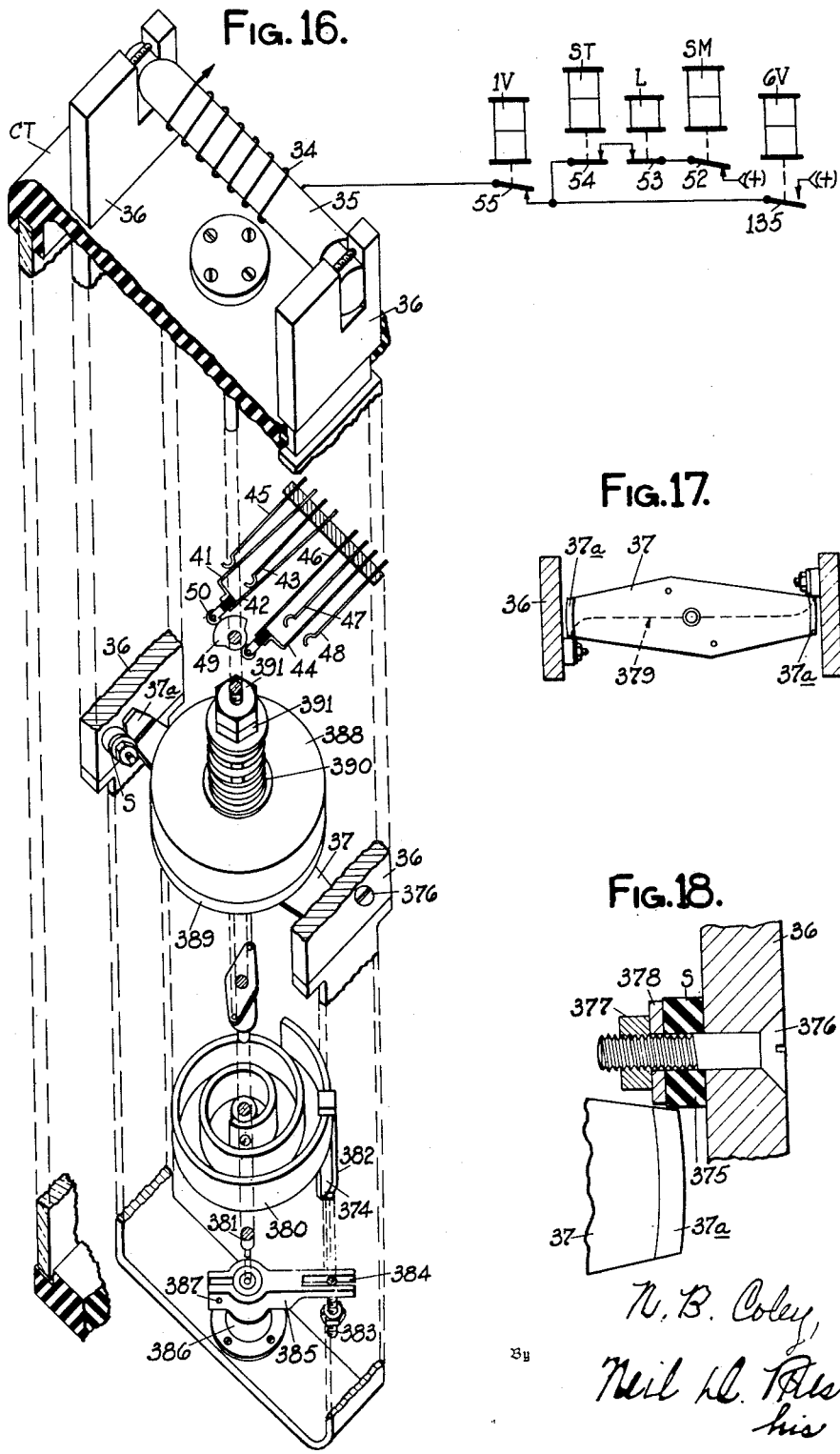

Fig. 16 illustrates somewhat diagrammatically and partly in perspective, the general organization of a suitable code oscillator modified from the oscillator of Fig. 11.

Figure 17:
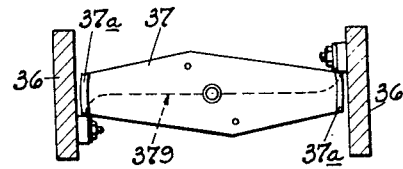
Figure 18:
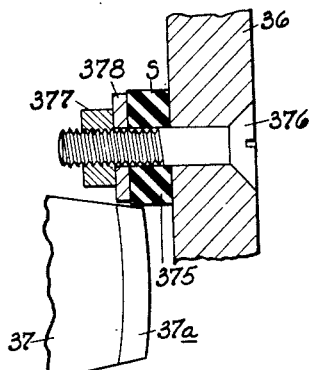

Fig. 17 is a plan view, partly in cross-section, showing the position the armature of an oscillator constructed according to Fig. 16 assumes when the oscillator is energized; and Fig. 18 is an enlarged sectional view of an oscillator stop.

The various circuit organizations are illustrated in a conventional schematic manner to more particularly facilitate an understanding of the mode of operation of the system rather than to attempt to point out the details of the construction and arrangement of components that may be provided by those skilled in the art in accordance with the requirements of practice. The symbols (+) and (—) have been used to indicate connections to the respective positive and negative terminals of suitable batteries or other sources of direct current; the symbol (F+) has been used to indicate connection to the positive terminal of a suitable source of direct current through an interrupter for providing flashing energy; and the symbols (BX) and (NX) have been used to indicate connections to the respective instantaneous positive and negative terminals of a suitable source of alternating current.

System apparatus

As illustrated in Fig. 1, identical flight progress boards 20 are provided at the respective stations A and B for keeping track of airplane flights through a particular fix or holding stack in approach to an airport. The flight progress board 20 at the airways center (station A) is provided for this fix because the airways controller governs flights to the airport, and perhaps past the airport, through this fix, under conditions where no landing is to be made. The airport approach controller must have a flight progress board 20 for this fix so that he may be clearly advised as to the airplane flights at this fix or holding stack, and it is further advisable that distinctive indications be provided to indicate what airplane flights are under authority of the airways center controller and what airplane flights have been transferred to the authority of the airport approach controller.

Each of the flight progress boards has a control panel 21 as illustrated in Fig. 2 which has three push buttons, GPB, YPB, and RPB, and three indicator lamps, GE, YE and RE, disposed thereon at positions comparable to each flight altitude that may be assigned for air traffic within the fix for which the flight progress board 21 is provided. The three lamps GE, YE and RE are provided for indicating respectively a reservation designated by the actuation of a reservation button GPB for that panel and the associated flight altitude, an indication of a reservation with a desire to transfer authority for an airplane flight at that altitude, and an indication that the associated flight altitude has been reserved by the other station. These indicator lamps are further rendered distinctive as to the indications with which they are associated by their different colors wherein a green lamp GE is used for clearance indication designated by actuation of a green push button GPB for the associated flight altitude on that panel, a yellow lamp YE is used for indicating a designation of a desire to transfer authority by actuation of a yellow push button YPB for that flight altitude, and a red lamp RE is employed for indicating that the associated flight altitude is reserved by reason of a reservation designated by the controller of the other station. A red push button RPB is provided for each flight altitude for the purpose of cancellation of a reservation that has been made for that flight altitude. It is to be understood that other indicating means, distinctive colors and different disposition of the indicator lamps and buttons for the respective flight altitudes can be employed in accordance with the requirements of practice. For example, the respective green, yellow and red indicator lamps could be contained within the associated green, yellow and red push buttons for each flight altitude.

The flight progress boards 20 illustrated are assumed to be of a type fully disclosed in a copending application, filed of even date herewith of R. W. Hewes, which has resulted in Patent No. 2,559,429, dated July 3, 1951, and reference is to be made to this application for a more detailed disclosure as to the structure of these flight progress boards. If the flight progress boards 20 are provided as illustrated in Figs. 1 and 2, and as more specifically disclosed in the above mentioned Hewes application, the flight progress strip holders 22 are individually interlocked with the cancellation buttons RPB for the respective flight altitudes so that the actuation of a cancellation button RPB in cancelling a reservation automatically retracts pins 23 for the associated flight altitude and drops the associated flight progress strip holder to the next lower flight altitude position when the flight progress control panels 21 are in use for laddering down airplanes in a stack, and landing airplanes from the lowest flight altitude. Under these conditions, when the flight progress strip holder for the lowest flight altitude is removed in accordance with the landing of an airplane, space is available for the strip holder 22 for the next higher altitude to be dropped in accordance with the designation of cancellation for the next higher flight altitude as the airplane to which that particular flight altitude is assigned has reported leaving that altitude to descend according to laddering down instructions. In this manner, flight progress strips in holders 22 can be more readily maintained in correspondence with indications on the control panel 21 of the associated flight progress board 20 for the respective flight altitudes.

It is further provided that the flight progress strip holders 22 may be released from their interlocking relationships with the cancellation buttons RPB under conditions where it is desired for some reason or other to restore the system to strictly flight progress board operation, without actuation of the control buttons and without reference to the indicator lamps on the panel 21. This disengagement of the interlock is accomplished by actuation of the respective levers 24 and 25 at the top of the panel 21 to their right-hand positions, there being two levers provided, so that the release interlocks for the selected upper or lower sections of the flight progress board 20 may be rendered ineffective in accordance with the requirements of practice. For example, if it is desired that the lower portion of the flight progress board 20 be employed in coordination with the panel 21 for the lower flight altitudes, and that the interlock between the cancellation buttons and the flight progress strip holders be maintained, the lower lever 25 of the two selection levers at the top of the associated panel may be maintained in its left-hand position, but the upper lever 24 may be actuated to its right-hand position to thereby release the flight progress strip holders 22 for the upper portion of the flight progress board 20 from their interlocks with cancellation buttons for the associated flight altitudes so that the actuation of buttons for airplane flights above a particular flight altitude need not be made in order to cause the flight progress strip holders for associated fght altitudes to be dropped down as associated airplane flights are laddered down in the stack.

With reference to Fig. 1, a relay cabinet 26, or suitable relay rack, is provided at each of the stations A and B for housing relays and other necessary communication apparatus such as is required for communication between the two stations. The relay cabinet 26 at station A is illustrated by the dotted line 27 as having wiring connections to the panel 21 of the flight progress board 20 at that station, and similarly connections are illustrated by the dotted line 28 connecting the flight progress board panel 21 at station B with the relay cabinet 26 at that station. The dotted line 29 shown connecting the relay cabinets 26 of the two stations is to be considered as indicative of a suitable single line circuit connecting these stations which can be of the character of the line circuit illustrated in Fig. 4. There is also provided at each station suitable radio communication apparatus provided according to the usual practice, for telephonic communication with respective airplanes and between offices. This equipment is shown in part in Fig. 1 by the head sets 30 provided for the controllers, and the receptacles 31 into which microphones (not shown) may be connected.

The line circuit provided according to Fig. 4 is a center feed normally energized line circuit wherein line relays L at the respective stations A and B are steadily energized in series when the system is at rest. As is illustrated in Fig. 4, the line circuit may have repeater stations as required in accordance with the distance between stations A and B, and it is also to be understood that other types of channels of communication may be employed in accordance with the requirements of practice.

The transmission and reception of messages in the system provided according to the present invention is dependent upon code oscillators CT (see Fig. 7C) operating at corresponding rates at the respective transmitting and receiving stations during transmission of a control and during the answer back portion of a complete communication cycle of operation. These oscillators are preferably of the torsional pendulum type of the general character, for example, disclosed in the patent to O. S. Field, No. 2,351,588, dated June 20, 1944. The oscillator according to the Field patent is adapted to be driven at a constant rate and to be energized for a limited period of each of its operating cycles so as to maintain its oscillations continuously at a uniform rate as long as energy is applied to the device.

For the purpose of the present invention, however, it is considered more desirable that the oscillator mechanism be normally inactive but retained in one of its extreme operated positions so that it can be started from a fixed contacting position when it is desired to initiate the stepping of code communication apparatus; and, therefore, the oscillator according to the Field patent has been modified to provide that its winding is normally steadily energized when the system is at rest. Upon setting the code communication system into operation, energy is removed from the electromagnet associated with the oscillator mechanism, and the torsional pendulum of the oscillator is thus permitted to swing free in oscillations, the amplitude and periodicity of which is determined by the characteristics of a torsional involute spring such as the spring 32 illustrated in Fig. 11, combined with the inertia of the pendulum 33 to obtain the desired frequency of oscillation.

According to the structure of the oscillator CT as is illustrated in Fig. 11, a winding 34 is provided on a core 35 of an electromagnet so as to set up a magnetic field through the vertical poles 36 of a U-shaped magnetic structure when the winding is energized, and through a centrally pivoted armature 37 which is disposed between the poles 36 and is secured to a central vertical shaft 38, which in turn is biased by the involute spring 32. The organization of the oscillator CT is thus such that the energization of the winding 34 of the electromagnet sets up a magnetic field through the armature 37 so as to urge the armature 37 in a direction to align with the magnetic field extending through it between the two oppositely disposed poles 36 of the electromagnet. Rather than permit the armature 37 to be drawn into full alignment with the poles 36, and in operation swing beyond this position because of the inertia of its associated pendulum 33, suitable stops 40, preferably of non-magnetic material such as fiber, are secured to the inner surfaces of the poles 36 of the electromagnet by non-magnetic rivets or screws 40a so as to limit the rotation of the armature 37 of the oscillator CT in response to energization of the associated electromagnet. Thus, when the electromagnet of the oscillator CT is energized, the armature 37 assumes a position as is illustrated in Figs. 11 and 12 wherein the field set up by the electromagnet urges the armature 37 against the stops 40 because the armature 37 is not permitted to rotate counter-clockwise to an extent required to become in perfect alignment with the shortest path for a magnetic field passing through the armature 37 between the respective poles 36. It is preferable that stop 40 be employed for the respective ends of the armature 37 so as to balance the stopping of the armature 37 with respect to the application of strain on the bearings of the shaft 38.

The pendulum 33 is secured to the armature 37 so as to be actuated by the torsional force applied by the involute spring 32 which has its inner end secured to the shaft 38 of the oscillator CT and has its outer end secured in a suitable adjustment clamp 41 so that adjustments in the spring tension may be made as required, to particularly balance the rates of oscillation of the code oscillators CT employed at the respective stations A and B.

It is well known that an oscillator of this character has a constant period of oscillation for the respective cycles of the oscillator, within certain limits of spring tension, when the oscillator is released from its energized position and allowed to oscillate back and forth solely because of the cooperation of the torsional spring and the inertia of the pendulum of the oscillator mechanism. The mode of operation of the oscillator CT in this respect will be hereinafter more particularly pointed out when considered more specifically the mode of operation of the system under certain typical assumed operating conditions.

In accordance with the rotary oscillations of the respective oscillators CT, respective left movable contact fingers 41 and 42 and right contact fingers 43 and 44 are selectively opened and closed against cooperating fixed fingers 45, 46, 47, and 48 respectively by a suitable actuating cam 49 which is secured on the shaft 38. This cam 49 has been illustrated in Fig. 11 as actuating rollers 50 associated with the respective left and right movable contact fingers. This cam 49 is so disposed on the shaft 38 that when the oscillator mechanism is deenergized and permitted to come to rest at a fixed neutral position with the center of the armature 37 aligned along the center line 104 (see Fig. 12), that the respective left and right hand edges of the cam 49 bear against the respective rollers 50 whereby a slight rotation of the shaft 38 is effective to close the left or righthand contacts dependent upon the direction of rotation. Thus by this adjustment, and by the contour of the cam 49 employed, the left hand contacts are maintained closed for the half of each period of oscillation to the right of the center line as viewed in Fig. 12, and the right-hand contacts are closed for the half of each period of oscillation to the left of the center line as viewed in Fig. 12.

By this contact arrangement on the oscillator CT, it is provided that throughout each communication cycle of the system the time of closure of the respective and left and right contacts for each cycle of operation of the oscillator CT during its free swing subsequent to deenergization is of the same time duration. Thus it can be said that the oscillator CT provides a series of alternate left and right contact closures constituting "on" periods of equal lengths for a series of cycles of the oscillator which can be used as standards governing the rate of code transmission and reception, such rate being constant, irrespective of voltage variations, because of the rate being determined by a free swinging pendulum which is not influenced during its operation by electrical energization of its electromagnet.

Having set up means for measuring a series of uniform "on" periods, these periods can be shortened by a fixed time interval with respect to transmission over the line circuit connecting the two stations to provide an "off" period between "on" periods for respective odd or even numbered steps of the desired time duration. This is accomplished in a manner to be hereinafter more specifically pointed out when considering the mode of operation of the cycle under typical operating conditions, the general mode of operation being that the pick up time of the respective stepping relays V is subtracted from the start of the respective on periods created by the oscillator CT with respect to transmission over the line circuit connecting the two stations.

In addition to the indicator lamps and buttons which have been described as having been provided for the respective flight altitudes of the system, a pair of push button repeater relays GR and YR (see Figs. 5 and 6) are provided at the respective stations for each flight altitude. Also, associated with each flight altitude are magnetic stick relays GK, YK, and RK, the function of which is particularly to govern the selective energization of the respective green, yellow, and red lamps GE, RE, and YE for the associated flight altitude. These relays are of the magnetic stick type wherein the relay armatures, and thus the associated contacts are maintained in the positions to which they have last been actuated by electromagnetic energization.

Inasmuch as the circuits for the parts of the communication system that are common to all flight altitudes are similar for both stations A and B, the circuits illustrated in Figs. 7A, 7B, 7C, can be considered as master unit circuits having to do with the communication of control indication and check codes for all flight altitudes, one of these master units being provided at each of the stations. Inasmuch as different codes are required to be transmitted from the respective stations A and B for similar controls under certain conditions, the code determining circuits for both stations are illustrated, the code determining circuits for transmission to station A being illustrated in Fig. 8, and the code determining circuits for transmission at station B being illustrated in Fig. 9.

Considering now the master unit apparatus, a push button repeater relay PBP (see Fig. 7B) is provided which is picked up any time that the transmission of a control is initiated by the actuation of a push button for any flight altitude at the associated station. This relay also has a stick circuit organization whereby it is checked that each code character received during the answer back portion of a cycle of operation of the communication system checks with the corresponding character of the code that was originally transmitted during the first part of the cycle.

A start relay ST is provided at each station for insuring proper start at a station which is to receive a control transmitted from the other station.

A relay SM is provided at each station for governing the transmission of a message from that station. Thus this relay is picked up during the first half of a communication cycle at the station transmitting the message, and during the last half of a communication cycle at the station transmitting the answer back code.

The sending of a check code is governed by the relay SC (see Fig. 7A) which is provided at each station and is energized only for the last half of a cycle of communication, and only at the station which receives the control transmitted during the cycle.

A relay RC is provided for use at each station in conditioning that station to receive a check code during the last half of a communication cycle, and this relay is picked up only at the station receiving the check code.

A relay CN is provided at each station for cancellation purposes under certain normal conditions of operation, and for preventing the execution of a control under conditions of abnormal transmission involving momentary interruption of the line circuit and the like.

A blank of stepping relays V (see Fig. 7C) is provided at each of the stations for counting the respective code characters communicated, this stepping bank being actuated at a rate determined by the code transmitter relay CT at that station.

Associated with the stepping relay bank at each station is a bank of message relays M, one message relay being provided for each character of the code that is employed, and that relay being energized in accordance with the reception of a mark for the corresponding code digit.

A check relay CK (see Figs. 5 and 6) is provided at each station for the purpose of checking the response of application relays GK, YK, and RK to the particular codes that are received by the message relays M. The relay CK is required to be energized at a station receiving a control at the end of the first half of a control cycle before an answer back code may be transmitted to the station transmitting the control.

A relay CDS is provided at each station for the purpose of governing the stick circuits of the stepper relays V.

The transmission of codes from each station is effected by contacts of the oscillator CT at that station cooperating with odd and even message relays OM and EM (see Figs. 7A, 8 and 9) and with contacts of the stepper relays V. The relay OM is picked up for the transmission of marks as respective odd numbered characters of the code; and similarly, the relay EM is picked up for the transmission of marks as respective even numbered characters of a code.

Having thus considered in general the organization of the system according to the present invention, consideration will now be given as to the mode of operation of the system under typical operating conditions, and further specific characteristics of the apparatus will be more particularly pointed out as the description progresses.

OPERATION

*General*

Before considering the mode of operation of the system under typical operating conditions, it is believed expedient to consider the mode of operation in general without reference to the specific circuit oragnization responsible for such mode of operation. This general mode of operation is illustrated digrammatically by the block diagram of Fig. 3 wherein a typical condition involving the transmission of a clearance control for a particular typical flight altitude from station A is considered.

Thus, if the push button GPB for designating a reservation for this typical flight altitude at station A is actuated, the code oscillator CT at that station is initiated, and in accordance therewith the stepper (relays IV to 6V inclusive; see Fig. 7C) at station A is actuated, and at the same time a message coder comprising the relays EM and OM (see Figs. 7A and 8) becomes effective to transmit a code comprising characters selected in accordance with the particular flight altitude and the particular control that has been designated. Thus during the first half of a cycle, a five digit code comprising selected marks and spaces is transmitted from station A.

In accordance with the opening of the line circuit at station A at the beginning of the cycle by the picking up of a relay SM (see Fig. 7B), the line relays (see Fig. 4) at stations A and B are dropped away, and the dropping away of the line relay at station B is effective to set the code oscillator CT at station B into operation and thereby actuate the stepper (relays IV to 6V inclusive, see Fig. 7C) at station B at a rate comparable to the rate of actuation of the stepper at station A. It will be noted that although the stepper at station B is operated at the same rate as the stepper at station A because of the physical characteristics of the code oscillators at the respective stations being the same, the oscillator at station B need not necessarily operate in synchronism with the code oscillator at station A. Thus if there is propagation time consumed, or other delays characteristic of the line circuit operation in the transmission between stations A and B, this will have no bearing upon the reception and decoding of the code at station B because its decoding apparatus (including message relays M, see Fig. 7C) is in no way dependent upon simultaneous synchronization with the transmitting apparatus at the transmitting station A.

After the particular designated control is transmitted from station A to station B during the first half of the control cycle under consideration, the decoding of the control becomes effective to energize the red lamp RE (see Fig. 6) for the typical flight altitude under consideration on the control panel at station B and thereby indicate to the controller at station B that a reservation for that flight altitude has been made by a controller at station A.

It is then checked that the relays governing the indicator lamps at station B have been properly conditioned in accordance with the code that has been received by the decoder relays M (see Fig. 7C), and subsequent to the accomplishment of this check by picking up relay CK at station B (see Fig. 6), the second half of the cycle is initiated by setting an answer back coder (comprising relays EM and OM as controlled by relays M, see Fig. 9) into operation to transmit from station B to station A a repeat character for character of the code originally transmitted during the first part of the cycle from station A. To transmit this answer back code, the code oscillator CT at station B is set into operation again, and a five digit code of selected marks and spaces is transmitted corresponding to the code which has been received during the first part of the cycle.

Upon the dropping away of the line relay L at station A in response to the initiation of transmission from station B of the second part of the cycle under consideration with reference to the block diagram of Fig. 3, the code oscillator CT at station A is initiated, and it actuates the associated stepper unit (relays IV to 6V inclusive, see Fig. 7C) and the answer back code received is decoded by the relays M at station A and checked character for character in accordance with the stick circuit organization for relay PBP at that station. If the answer back code received at station A under these conditions checks character for character with the code that was assumed to be transmitted during the first part of the cycle, the green lamp for the typical flight altitude under consideration is energized and thus it is indicated on the control panel of station A that a reservation has become effective for that particular flight altitude and a clearance can be given by the controller at that station for an airplane flight for that particular flight altitude.

It will be readily apparent from the above described general mode of operation that other controls, such as controls for transfer of authority and cancellation of altitude reservation can be similarly communicated from one station to the other. It will be readily understood as the description progresses that a similar mode of operation is effective in transmission from station B to station A.

*Normal conditions*

For the purpose of facilitating the description of the present invention, normal conditions are assumed to exist when the code communication apparatus is at rest, and when there has been no reservations designated on the panels of the respective flight progress boards. Thus under these conditions, the indicator lamps on the panels at the respective stations A and B are all deenergized.

Under the normal conditions of the system, the oscillators CT are normally energized at both stations, and in accordance with their steady energization, the left-hand contact fingers 41 and 45, and 42 and 46, of the oscillators CT (see Figs. 7A and 7C) are closed. The circuit by which the oscillator CT is energized at each station under normal conditions extends from (+), including back contact 52 of relay SM, front contact 53 of relay L, front contact 54 of relay ST, back contact 55 of relay IV, and winding of oscillator CT, to (—).

With reference to Fig. 4, the normal conditions of the line circuit connecting stations A and B is illustrated. Because of the message sending relays SM being dropped away at both stations, the line relays L at the respective stations are normally connected in series through the line circuit battery LB in a circuit extending from the positive terminal of the battery LB including back contact 56 of relay SM at station B, winding of relay L at station B, back contact 57 of relay SM at station B, back contact 58 of relay SM at station A, winding of relay L at station A, and back contact 59 of relay SM at station A, to the negative terminal of the line battery LB. Suitable repeater stations 60 are provided in the line circuit as required in accordance with the distance between the two stations.

With reference to Fig. 7B, the start relay ST at each station is normally maintained energized by its stick circuit including the left-hand contact fingers 41 and 45 (see Fig. 7C) of the oscillator CT, wire 61, front contact 62 of relay L, front contact 63 of relay ST and the lower winding of relay ST.

The magnetic stick relays GK, YK, and RK at each station (see Figs. 5 and 6) for the respective flight altitudes are all deenergized under normal conditions, but because of their magnetic stick characteristics, they necessarily assume their positions to which they have been last energized. Thus in accordance with the assumed normal conditions where there are no reservations set up on the boards, the relays GK and YK for the respective flight altitudes at each station assume their knocked down positions, while the relays RK for the respective flight altitudes at each station are in their picked up positions in accordance with it being assumed that the last controls communicated for the associated flight altitudes were cancellation controls so as to energize the respective lower windings of relays RK. Thus although all windings of the relays RK are normally deenergized, the relays RK are maintained in their picked up positions under the assumed normal conditions of the system by their permanent magnets.

Initiation of a cycle

Initiation of a cycle of operation of the communication system is effected in accordance with the actuation of a button on the panel 21 of the flight progress board 20 at either station for any flight altitude, provided that the control designated is valid in that it does not conflict with the predetermined desired mode of operation for obtaining clearances, designations of transfer, cancellations, and the like.

To consider the mode of operation for the initiation of a cycle under a typical operating condition, it will be assumed that designation is made at the airways station A for a reservation for a flight at the second flight altitude (2,000 ft.) by actuation of the green push button 2GPB (see Fig. 5) at station A at a time when that flight altitude has not been reserved by a controller at station B. The actuation of this button provides for the picking up of the relay 2GR by energization of a circuit extending from (+), including back contact 64 of relay RC, front contact 65 of relay ST, back contact 66 of relay SC, back contact 67 of relay 6V, back contact 67a of relay CN, front contact 68 of relay 2RK, back contact 69 of relay 2GK, back contact 70 of relay 2YK, contact 71 of push button 2GPB in its depressed position and lower winding of relay 2GR, to (—). The inclusion of back contacts 64, 66, 67, and 67a of relays RC, SC, 6V and CN in this circuit, and front contact 65 of relay ST provides that a relay GK or YK can be energized in response to actuation of an associated button only when the communication system is at rest.

The picking up of relay 2GR under these conditions for the initiation of a cycle closes a pick up circuit for the relay PBP (see Fig. 7B) extending from (+), including back contact 72a of relay EM, back contact 72 of relay 6V, back contact 73 of relay CK, front contact 74 of relay 2GR, front contact 74a of relay ST, back contact 75 of relay RC, and lower winding of relay PBP, to (—). In a similar manner relay PBP can be picked up in response to designation of any other control for any flight altitude at that station. The manner in which the relay PBP is maintained picked up throughout a control cycle will be more specifically considered as the description progresses.

Upon the picking up of relay PBP, a stick circuit is established for the relay 2GR (see Fig. 5) to maintain this relay picked up until completion of the cycle. This stick circuit for the relay 2GR extends from (+), including front contact 76 of relay PBP, contacts of relays GR and YK for flight altitudes other than those illustrated as required and as indicated in the circuit by XXX, back contact 77 of relay 5YR, back contact 78 of relay 5GR, back contact 79 of relay 4YR, back contact 80 of relay 4GR, back contact 81 of relay 3YR, back contact 82 of relay 3GR, front contact 83 of relay 2GR, and upper winding of relay 2GR, to (—).

Upon the picking up of the push button repeater relay PBP as has been described, a pick up circuit is closed for the relay SM (see Fig. 7B) so as to deenergize the code oscillator CT and render it active, and also so as to open the line circuit and thereby render the code oscillator CT active at station B by the dropping of the line relay L at that station. The circuit by which the relay SM is picked up under these conditions extends from (+), including back contact 84 of relay RC, front contact 85 of relay ST, front contact 86 of relay PBP, back contact 87 of relay 6V, back contact 88 of relay SC, back contact 89 of relay CN, and lower winding of relay SM, to (—). The picking up of relay SM in response to energization of this circuit closes an obvious stick circuit at front contact 90 of relay SM to maintain that relay energized until a circuit for the upper winding of that relay is energized with the opposite polarity.

The picking up of relay SM opens the circuit for the oscillator CT at station A at back contact 52 (see Fig. 7C) and thus initiates this oscillator. Relay SM in picking up also opens the line circuit at back contacts 58 and 59 (see Fig. 4) so that the line relays L at both stations which are normally energized in series are deenergized.

The dropping away of the relay L at station B during the start of transmission from station A under the above assumed conditions renders the code oscillator CT active at that station by opening the circuit for that relay at front contact 53 (see Fig. 7C) of relay L. Also at both stations A and B, the relay ST (see Fig. 7B) is dropped away because of the opening of its circuit at front contact 62 of the line relay L at that station.

At the transmitting station (station A) the relay CDS (see Fig. 7A) is picked up at the beginning of the cycle in accordance with the picking up of the relay SM. The relay CDS is energized at this time by a circuit extending from (+), including the left hand contact fingers 41 and 45 of oscillator CT at station A, wire 61, back contact 91 of relay 6V, front contact 92 of relay SM, back contact 93 of relay RC, back contact 94 of relay CN, and upper winding of relay CDS, to (—). This relay when picked up is maintained picked up throughout the first half of the control cycle by a stick circuit extending from (+), including back contact 95 of relay RC, front contact 96 of relay SM, back contact 97 of relay CN, front contact 98 of relay CDS, and lower winding of relay CDS, to (—).

At the receiving station (station B) for the typical cycle under consideration, the picking up of the relay CDS is dependent upon the closure of the right-hand contact fingers 44 and 48 of the oscillator CT at that station during the first cycle of operation of that oscillator. The circuit by which the relay CDS is picked up under this condition extends from (+), including right-hand contact fingers 44 and 48 (see Fig. 7C) of the oscillator CT at station B, wire 99, back contact 100 of relay RC, back contact 101 of relay SC, back contact 102 of relay SM, back contact 93 of relay RC, back contact 94 of relay CN, and upper winding of relay CDS, to (—). A stick circuit is closed for the relay CDS at station B upon the picking up of that relay to maintain that relay picked up until the end of the first half of the cycle of operation of the communication system under consideration. The stick circuit for the relay CDS at station B extends from (+), including back contact 51 of relay SC, back contact 96 of relay SM, back contact 97 of relay CN, front contact 98 of relay CDS, and lower winding of relay CDS, to (—).

Oscillator operation

It has been pointed out that the code oscillators CT (see Fig. 7C) at the respective stations are both initiated at the beginning of a communication cycle by their respective deenergization, the oscillator CT at the transmitting station A being initiated by the picking up of the relay SM, and the oscillator CT at the receiving station B being initiated by the dropping away of the line relay L at that station. The oscillator CT at each station is therefore set into oscillatory motion at a rate determined by the mass of the pendulum 33 (see Fig. 11) in combination with the resiliency of the involute spring 32 by which the torsional pendulum 33 is driven.

With reference to Fig. 13, the oscillatory movement of a typical code oscillator CT is illustrated by a curve for a complete communication cycle of operation of the system, and it is indicated on this curve at what times respective stepping relays V of the stepping relay bank are energized. It is thus illustrated in Fig. 13 that the oscillators CT make four complete cycles of operation during each half of the communication cycle, the oscillators CT being momentarily energized at the midpoint in the communication cycle to permit the restoration of the relays of the stepping relay banks and permit the condition of the system for the answer back portion of the cycle. During this answer back portion of the cycle the stepping proceeds as in the first half of the cycle in that there are four cycles of operation of the oscillator CT.

The diagram of pendulum travel of an oscillator CT according to Fig. 13 illustrates that some time is consumed in the initiation of the oscillator CT subsequent to its deenergization. This is obviously because of the time required for the flux in the electromagnet to decay and release its attraction of the armature of the oscillator against the stops 40 (see Fig. 11). Because of some retardation by the magnetic field under the above described condition, the armature 37 tends to accelerate slowly at the start and thus some of the torsional force of the pendulum 33 and spring 32 is dissipated so that the first excursion of the pendulum 33 will restore the armature 37 at an appreciable distance short of touching the stop 40 from which the armature 37 had been released at the beginning of the oscillation cycle. It has been found, however, that the oscillator CT will oscillate through four cycles of operation when once initiated without an appreciable variation in the extent of travel for each excursion, the times consumed for each of the four exursions being constant in accordance with the general principles of operation of torsional pendulums.

A preferred adjustment for the left and right contacts of the oscillator CT is so that when the oscillator is set into free oscillation as has been described, the respective left and right contacts are respectively opened and closed in turn as the pendulum 33 swings through its center position of neutral bias. It is therefore provided that by the actuation of a suitable cam 49 (see Fig. 11) on the shaft 38 of the oscillator CT, respective left and right groups of contact fingers can be alternately opened and closed, with the closure time of each contact group being for the time of travel of the pendulum 33 from center to its extreme operation position and back again to center. This center position is the position the armature 37 assumes when in alignment with its center line 104 as is illustrated in Fig. 12, and this is considered as the neutral position of the oscillator wherein there is no spring bias applied to rotate the pendulum 33 and the armature 37 in one direction or the other. Although the amount of travel of the armature 37 and the pendulum 33 during free swing oscillation will vary in accordance with the rate of coding as required according to different conditions to be encountered in practice, typical operating limits for the armature 37 are illustrated in Fig. 12 wherein the armature swings freely between the dotted lines 105 and 106 which indicate the approximate limits of swing to the respective sides of the center line 104. Whenever the right-hand end 37a of the armature is above the center line 104 as viewed in Fig. 12, the left contact fingers 41 and 45, and 42 and 46 (see Fig. 11) are closed, and similarly whenever the right-hand end 37a of the armature 37 is below the center line as viewed in Fig. 12, the above mentioned contact fingers are opened and the contact fingers 43 and 47, and 44 and 48 are closed.

With reference to Fig. 13, a curve is plotted of pendulum travel against time, and it will be readily understood that this curve is indicative of the travel of the contact actuating cam 49, the armature 37, or any other part secured to the shaft 38 to rotate therewith. It is illustrated in Fig. 13 that subsequent to the initiation of the oscillator CT by the deenergization of its winding, the swing to each extreme position of operation for the first three cycles of operation of the oscillator is effective to pick up a stepping relay. Thus the relays for the odd numbered steps 1V, 3V and 5V are picked up in response to the closure of the right-hand contacts of the oscillator CT as viewed in Fig. 11, and the actuation of the oscillator to its extreme positions in the other direction picks up the stepper relays 2V, 4V and 6V for the even numbered steps. The respective pick up circuits for these stepping relays are closed as the operating mechanism of the oscillator CT passes through its center position 104 (see Fig. 12), and the times represented by the shaded areas on the curve according to Fig. 13 are representative of the pick up times of the respective stepping relays subsequent to their energization as the oscillator mechanism passes through its center position. It is illustrated in the curve according to Fig. 13 that the extent of oscillation of the mechanism of the oscillator CT decreases only a small amount as the mechanism operates without energization through its respective cycles, but the times consumed in the respective cycles are always the same, and thus the oscillator CT is effective by its free swinging operation to set up a fixed code rate wherein the times of closure of the respective left and right contacts for the respective cycles of operation of the oscillator CT are all of the same duration. The rates of the oscillators CT at the respective stations A and B can be adjusted to be exactly the same, and thus the stepping will always be at the same rate at the respective stations, irrespective of voltage regulation and other factors which could cause changes in rate if the oscillators CT were power driven for each of their oscillations.

Inasmuch as the rate of stepping is determined by the code oscillators CT, the adjustment of the oscillator code rate is necessarily made in accordance with the time of operation that is required for the stepping relays and other relays that must be operated successively during each step. It has been found that for one embodiment of the present invention, a code rate of approximately 630 pulses per minute is satisfactory.

The pick up time of the stepper relays V is used to measure the "off" time of code transmitted under various conditions to be hereinafter pointed out and is also used in the stick circuit control of the relay PBP at the respective stations.

Stepping

To consider specifically the circuit organization for picking up the relay IV (see Fig. 7C) at the transmitting station A under the assumed conditions for code transmission, the closure of the right-hand contact fingers 44 and 48 of the oscillator CT is effective to energize the lower winding of the stepper relay IV by a circuit extending from (+), including contact fingers 44 and 48 of oscillator CT, rectifier unit 107a, back contact 107 of relay 6V, back contact 108 of relay 4V, back contact 109 of relay 2V, back contact 109a of relay CN, and lower winding of relay IV, to (−). This relay when picked up is maintained energized for the first half of the communication cycle under consideration through its front contact 110 and front contact 111 of relay CDS.

The picking up of the first stepper relay IV conditions a circuit so that upon the subsequent closure of the left-hand contact fingers 41 and 45 of the oscillator CT, the relay 2V is picked up by the energization of a circuit extending from (+), including left-hand contact fingers 41 and 45 of the oscillator CT, back contact 112 of relay 5V, rectifier unit 112a, back contact 113 of relay 3V, front contact 114 of relay IV, and lower winding of relay 2V, to (−). This relay when picked up is maintained energized until the end of the first half of the communication cycle by a stick circuit including, front contact 115 of relay 2V, and front contact 116 of relay CDS.

Upon the subsequent actuation of the oscillator so as to again close the right-hand contact fingers 44 and 48, the stepper relay 3V is picked up by the energization of a circuit extending from (+), including right-hand contact fingers 44 and 48 of oscillator CT, rectifier unit 107a, back contact 107 of relay 6V, back contact 108 of relay 4V, front contact 109 of relay 2V, and lower winding of relay 3V, to (−). This relay is maintained picked up by a stick circuit including its front contact 117 and front contact 111 of relay CDS.

The stepper relay 4V is picked up when the oscillator CT completes its second cycle of operation by the closure of the left-hand contact fingers 41 and 45 of the oscillator CT. The circuit for the energization of relay 4V under these conditions extends from (+), including left-hand contact fingers 41 and 45 of oscillator CT, back contact 112 of relay 5V, rectifier unit 112a, front contact 113 of relay 3V, and lower winding of relay 4V, to (−). This relay is maintained picked up until the end of the first half of the communication cycle upon the closure of its front contact 118 through front contact 116 of relay CDS.

When the oscillator CT shifts for the third time to close its right-hand contact fingers 44 and 48, the stepper relay 5V is picked up by the energization of a circuit from (+), including right-hand contact fingers 44 and 48 of oscillator CT, rectifier unit 107a, back contact 107 of relay 6V, front contact 108 of relay 4V, and lower winding of relay 5V, to (−). Relay 5V when picked up is maintained energized for the remainder of the first half of the communication cycle by a stick circuit including its front contact 119 and front contact 111 of relay CDS.

The last step relay 6V is picked up upon the completion of the third cycle of operation of the oscillator CT when the left-hand contact fingers 41 and 45 are closed to energize a circuit extending from (+), including left-hand contact fingers 41 and 45 of the oscillator CT, front contact 112 of relay 5V, and lower winding of relay 6V, to (−). Relay 6V is maintained picked up until the termination of the first half of the communication cycle by a stick circuit including its front contact 120 and front contact 121 of relay CDS. Back contact 122 of the line relay L, and front contact 122a of relay CN, are connected in multiple with front contact 121 of relay CDS to delay the drop away of relay 6V for reasons to be more readily apparent as the description progresses.

Having thus considered the mode of operation in picking up the stepping relays in accordance with the actuation of the oscillator CT at the transmitting station A for a communication cycle initiated at that station, it is to be understood that a similar mode of operation is effective at the receiving station B for the communication cycle under consideration in accordance with the actuation of the oscillator CT at that station.

Upon completion of the first half of the communication cycle, the transmission station A is conditioned for the reception of the check code by the picking up of relay RC (see Fig. 7A) which is maintained picked up for the remainder of the cycle of operation. This relay is picked up subsequent to the picking up of the last step relay 6V when the right-hand oscillator contact fingers 44 and 48 (see Fig. 7C) are next closed. The circuit by which the relay RC is picked up at the transmitting station A under these conditions extends from (+), including right-hand contact fingers 44 and 48 of oscillator CT, rectifier unit 107a, front contact 107 of relay 6V, wire 123, back contact 124 of relay L, front contact 125 of relay SM, back contact 126 of relay SC, rectifier unit 126a, and lower winding of relay RC, to (−). This relay when picked up is maintained energized by a stick circuit extending through its front contact 100, rectifier unit 126a, and wire 99 directly from the right-hand contact fingers 44 and 48 of the oscillator CT, and it is also maintained picked up by a stick circuit for its upper winding including front contact 129 of relay 6V connected in multiple with back contact 128 of relay ST, front contact 130 of relay RC and back contact 131 of relay CN. By these stick circuits relay RC is maintained picked up until the opening of right-hand contact fingers 44 and 48 during the last excursion of the oscillator CT of the communication cycle under consideration.

Relay RC in picking up opens the stick circuit for the relay CDS at the transmitting station A at back contact 95 (see Fig. 7A), the pick up circuit for relay CDS being maintained open at this time by the back contact 91 of relay 6V being open. Thus the relay CDS is dropped away at this time at station A, and the dropping away of this relay opens the stick circuits for the stepping relays at front contacts 111, 121 and 116 (see Fig. 7C) so as to cause these relays, except for relay 6V, to be dropped away.

The relay 6V, however, has an auxiliary stick circuit provided through back contact 122 of relay L and front contact 122a of relay CN, so that the relay 6V is maintained picked up subsequent to the dropping away of the other stepper relays V until the relay SM at station A is dropped away to close the line circuit and thus provide for the energization of relay L at that station. Because of relay 6V being maintained picked up subsequent to the drop away of the first stepper relay IV, the oscillator CT at the transmitting station A is energized through front contact 135 and thus it is actuated to its normal position with its left-hand contact fingers 41 and 45 and 42 and 46 (see Fig. 11) closed, and it is maintained in this position until it is subsequently deenergized for initiating the stepping for the second half of the communication cycle under consideration.

When the oscillator CT at station A, subsequent to its energization as has been described, closes its left-hand contact fingers 41 and 45, a circuit is closed for the energization of the upper winding of relay SM (see Fig. 7B) with a polarity to oppose the polarity of energization of the lower winding of that relay and thus neutralize the flux in the electromagnetic structure so as to cause the relay SM to be dropped away. The circuit for energizing the relay SM under these conditions extends from (+), including left-hand contact fingers 41 and 45 (see Fig. 7C) of oscillator CT, wire 61, front contact 91 of relay 6V (see Fig. 7A), wire 136, front contact 137 of relay RC, front contact 138 of relay SM and upper winding of relay SM, to (—). With reference to the line circuit as illustrated in Fig. 4, the closure of the back contacts 58 and 59 of relay SM provides for the energization of the line relays L at both stations A and B by a circuit which has been described when considering the normal conditions of the system.

The dropping away of the line relay L at station A occurs in response to the subsequent opening of the line circuit at station B as the station A becomes the receiving station for the second half of the cycle, and the transmission is by station B. Therefore it is station B that initiates the operation of the oscillator CT at station A during the second half of the cycle by opening the line circuit and thus dropping the relay L at station A to initiate the oscillator CT at that station. The oscillator CT when initiated at station A under the above assumed conditions is operable to pick up the stepper relays successively by a mode of operation that has been specifically described when considering the operation of the stepper relay during the first half of the cycle.

For the particular cycle of communication under consideration, the stepper relays V at the receiving station B are dropped away at the end of the first half of the cycle in accordance with the picking up of the relay SC (see Fig. 7A) for conditioning the apparatus at station B for transmission of the answer back code. The relay SC is picked up under these conditions when the oscillator CT at station B closes the right-hand contact fingers 44 and 48 for the fourth time during the cycle. Thus, with the last step relay 6V picked up, the relay SC is picked up by the energization of a circuit extending from (+), including right-hand contact fingers 44 and 48 (see Fig. 7C) of the oscillator CT, rectifier unit 107a, front contact 107 of relay 6V, wire 123, back contact 124 of relay L (see Fig. 7A), back contact 125 of relay SM, back contact 132 of relay RC and upper winding of relay SC, to (—). This relay when picked up is maintained energized by a stick circuit including its front contact 133 and back contact 134 of relay CN. It is further provided that the relay SC is maintained energized for an extended period of time at the end of the communication cycle by a stick circuit for its lower winding including the contact fingers 44 and 48 (see Fig. 7C) of the oscillator CT, wire 99, back contact 100 of relay RC (see Fig. 7A) and front contact 101 of relay SC.

The picking up of relay SC at station B deenergizes relay CDS at that station by opening its stick circuit at back contact 51, and the dropping away of relay CDS provides for the restoration of the stepper relays V in a manner comparable to that which has been described for the restoration of the stepper relays at station A at the end of the first half of the communication cycle under consideration. The last step relay 6V is delayed in its dropping away as has been described with reference to the stepper relay 6V at station A until the picking up of the line relay L. Thus at a midpoint in the communication cycle, the oscillator CT at station B is energized through front contact 135 of relay 6V and through back contact 55 of relay IV.

It has been pointed out that the dropping away of the relay SM at station A at the end of the first half of the communication cycle under consideration closes the line circuit, and thus line relays L at both stations A and B are energized upon the dropping away of the relay SM at station A, and such energization continues until the relay SM at station B is picked up for transmission of the answer back half of the cycle. This relay is picked up in response to the dropping away of the last step relay 6V, such relay being dropped away at each station in accordance with the picking up of the line relay L at that station to open the stick circuits for relays 6V at back contacts 122 of the respective line relays L.

With reference to Fig. 4, the picking up of the relay SM at station B opens the stick circuit for the line relays L at both stations at back contacts 56 and 57 to cause those relays to be dropped away. The dropping away of the relay L at station A deenergizes the oscillator CT at that station by the opening of front contact 53, while the oscillator CT at station B is deenergized upon the picking up of the relay SM by the opening of back contact 52.

At station B, relay CDS is picked up in response to the dropping away of the relay L at that station during initiation of the answer back portion of the communication cycle, the circuit for the energization of the relay CDS being the same as that which has been described for the energization of the corresponding relay CDS at that station A at the beginning of the communication cycle.

With the relay CDS picked up at station B and the oscillator CT deenergized at that station, the stepping progresses in a manner comparable to that which has been described specifically when considering the mode of operation of the stepping at station A for the first half of the communication cycle.

*Message transmission*

Message transmission for this embodiment of the present invention is by Baudot code using five code characters, each of which is selected as a "mark" or a "space," in accordance with the code that is to be transmitted. A mark is characterized by a sustained period of energization of the line circuit that is used for transmission during the particular period with which that character is associated, and a space is characterized by lack of energization of the line circuit at a corresponding time. Thus, according to the code chart of Fig. 10, different combinations of marks and spaces are set up for reservation, transfer of authority, and cancellation controls to be transmitted for the respective flight altitudes.

According to the code chart of Fig. 10, for the ten flight altitudes under consideration for this embodiment of the present invention, thirty distinctive codes are employed. Thus, for transmission from station A to station B there are ten codes provided for reservation designation at station A and ten codes provided for concellation designation at station A. These same codes are used for transmission from station B, but for the opposite purposes. In other words, the same codes can be used for transmission from both stations for reservation and cancellation controls, provided that they are not used for the same purposes.

Transfer of authority control codes which are used in governing the yellow indicator lamps YE for the respective flight altitudes of each board are the same for transmission from each station, thus only ten distinctive codes are required to be assigned for the ten flight altitutdes for transfer of authority control purposes.

The code characters are set up for transmission, in response to designation of a control by actuation of a push button for a particular flight altitude, by the selective energization of the relays GR and YR belonging to the particular flight altitude that has been designated at that station. If a green push button GPB for a particular flight altitude is actuated to designate a reservation control for transmission, the relay GR for that flight altitude is energized, but the relay YR for that flight altitude remains deenergized; and inversely, if the yellow push button YPB is depressed for designation of a transfer of authority, the relay YR for that flight altitude is energized and the relay GR for that flight altitude remains deenergized. For designation of a cancellation control by actuation of the red button RPB for a given flight altitude, both relays GR and YR for that flight altitude are picked up. It is thus provided that by these distinctive combinations of energization of the relays GR and YR for the three different types of controls, the code characters for transmission can be selected.

The selection of the code characters for transmission is thus provided by selections of the relays GR and YR for the respective flight altitudes in the circuits for the relays EM and OM (see Figs. 8 and 9). These relays EM and OM at the respective stations are used in the control of the line circuit as illustrated in Figs. 4 and 7A so as to provide for the transmission of marks for the respective odd code characters, provided that the relay OM is energized, and providing for the transmission of marks for the even code characters provided that the relay EM is energized for the respective even characters of the code.

In the control circuits for the relays EM and OM of Figs. 8 and 9 for the respective stations A and B, wires 1 to 5 inclusive are provided as representative of the respective channels of communication because of their selective connection through stepping contacts to the relays OM and EM in a manner to provide that these wire numbers are indicative of the respective code characters to be transmitted. It is thus provided that if energy is applied to a particular one of these five wires during a communication cycle, the corresponding numbered period of the Baudot code transmitted will be a mark, and if no energy is applied to a particular one of these wires during a communication cycle, the code character transmitted for the corresponding period of the code is a space.

The first character of a code is transmitted from station A when the oscillator CT at the transmitting station is making its first half cycle of operation so as to first close its right-hand contact fingers 43 and 47 (see Fig. 4), and if relay OM is picked up at this time to close front contact 139, a shunt is applied across the line wires 140 and 141 of the line circuit. The shunt across the line wires 140 and 141 actually is not closed until the first step relay IV is picked up, subsequent to the closure of the right-hand contact fingers 44 and 48 of the oscillator CT. Thus, as is represented in the diagram according to Fig. 13, the duration of the first character to be transmitted, provided that such character is a mark, is dependent upon the time of closure of the contact fingers 44 and 48 (an entire one half cycle of operation of the oscillator CT), minus the pick up time of the relay IV.

With reference to Fig. 4, a shunt can be applied across the wires 140 and 141 upon the picking up of the relay IV (if the first character is selected to be a mark) until the opening of the oscillator contact fingers 43 and 47 when the oscillator swings through center to complete its first half cycle of operation. This shunt extends from wire 140 through front contact 59 of relay SM, contact fingers 43 and 47 of oscillator CT, front contact 139 of relay OM, front contact 142 of relay IV, back contacts 143, 144, 145 and 146 of stepper relays 2V, 3V, 4V, and 5V respectively and front contact 58 of relay SM to wire 141.

Similarly as the oscillator completes its first excursion so as to close the left-hand contact fingers 42 and 46, it is provided that the second character transmitted is a mark if the front contact 147 of relay EM is closed so as to apply a shunt through the left-hand contact fingers 42 and 46 of the oscillator CT, through front contact 143 and through the front contacts 58 and 59 of the relay SM, across the line wires 140 and 141 at that station. Under these conditions, according to the line circuit of Fig. 4, the relay L at the receiving station B is energized for a period of time comparable to the duration of the mark.

For conditions where codes are employed wherein a space always precedes and follows a mark in transmission, the duration of that mark is comparable to a complete half cycle of the transmitting oscillator CT, minus the pick up time of one of the stepping relays. However, if successive marks are transmitted, the line circuit is maintained steadily energized for transmission of the successive marks, and it is maintained closed while shifting from an odd to an even mark or vice versa by reason of a shunt across the line wires 140 and 141 through front contacts 148 and 149 of relays EM and OM in series and front contacts 58 and 59 of the relay SM, thus shunting out the selection through the contact fingers of the transmitting oscillator CT and the contacts of the stepping relay V to maintain the line circuit closed as the communication system progresses in its operation from one step to the next.

Having thus considered the manner in which the respective odd and even mark relays OM and EM provide for the transmission of the marks of the respective codes for the first two characters, it should be readily apparent that a similar mode of operation can be effected for subsequent steps in accordance with shunting the line wires 140 and 141 through front contacts of the stepping relays V belonging to those steps. Consideration will now be given to the specific circuit organization for the selective energization of the relays OM and EM to provide for their energization during the proper times for transmission of the codes according to the code chart of Fig. 10.

It will be noted that the relay OM can be energized for a mark as a first character of a code provided that energy is applied to wire No. 1 of either Fig. 8 or 9 (dependent upon which station is transmitting) through back contact 150 or relay 2V, back contact 151 of relay 4V, back contact 152 of relay 6V, and back contacts 153 and 154 of relay SC. Thus, if the first character of a code is to be a mark as would be required according to the code chart of Fig. 10 for the flight altitudes from 6 to 10 inclusive, the relay OM would be energized upon designation of a control for one of these flight altitudes, and would remain energized until the picking up of the second step relay 2V to open the circuit for the relay OM at back contact 150. By the inclusion in the circuits of the relays OM and EM selections through back contacts 153 and 154 of the relay SC, it is provided that energy applied to the respective channel wires Nos. 1 to 5 inclusive of Figs. 8 and 9 can be effective for controlling the relays OM and EM only during transmission of a designated control from the station at which the control is designated.

If the second character of a control code to be transmitted is to be a mark, the channel wire No. 2 is energized, and energy is applied, through front contact 155 of relay 1V, back contact 156 of relay 3V, back contact 157 of relay 5V, back contact 158 of relay CK, and back contacts 159 and 160 of relay SC, respectively. The relay EM when energized under these conditions is maintained energized until the picking up of the relay 3V during the third step opens the circuit connecting the relay EM to the channel wire No. 2 at back contact 156.

Channel wire No. 3 is connected to the relay OM upon the picking up of relay 2V so that energy applied to this channel wire is effective to energize the relay OM, through front contact 150 of relay 2V, back contact 151 of relay 4V, back contact 152 of relay 6V, and back contacts 153 and 154 of relay SC, respectively. The termination of this period of energization of the relay OM is made upon the picking up of the relay 4V to disconnect the channel wire 3 at back contact 151.

The energization of the channel wire 4 for a mark during the fourth character of the code transmitted can be effective to energize the relay EM upon the picking up of the third step relay 3V because of the connection of this channel wire through, front contact 156 of relay 3V, back contact 157 of relay 5V, back contact 159 of relay SC, winding of relay EM, back contact 158 of relay CK, and back contact 160 of relay SC. The termination of the energization of relay EM for the fourth character of a code transmitted is provided by the opening of back contact 157 of relay 5V during the fifth step.

The channel wire No. 5 if energized provides that the relay OM is energized for transmission of a mark as the fifth character of the code, the relay OM being energized under these conditions through, front contact 151 of relay 4V, back contact 152 of relay 6V, and back contacts 153 and 154 of relay SC. The picking up of relay 6V disconnects the channel wire No. 5 from the relay OM, and thus prevents further energization of this relay during the first half of the cycle. Relay EM has already been rendered inactive for the remainder of the first half of the cycle by the opening of its circuit at back contact 157 of relay 5V.

It has been pointed out that the relays GR and YR (see (Figs. 5 and 6) for the respective flight altitudes are used in different combinations for the selection of a code to be transmitted, the relay GR being picked up for a reservation code, the relay YR being picked up for a transfer of authority code, and the relays GR and YR being picked up together for a cancellation code. Thus, with reference to the code chart of Fig. 10, for the first flight altitude, it is required that the energization of relay GR cause the energization of channel wire No. 3 at station A for a reservation code, and thus the front contact 161 of relay 1GR (see Fig. 8) applies energy to the channel wire 3 under these conditions.

If the designated control is for transfer of authority, the second character of the code must be a mark, and thus the picking up of the relay 1YR at station A must apply energy through its front contact 162 to the channel wire No. 2 to provide for the transmission of a mark under these conditions.

If the control designated for transmission for the first flight altitude from station A is a cancellation control, then, according to the code chart, the second and third characters of the code must both be marks, and in accordance with the relays 1GR and 1YR being both picked up, energy is provided to both channel wires 2 and 3 through the front contacts 161 and 162 of these relays respectively.

To consider the selection of codes for transmission from station B for the first flight altitude, it will be noted that the code for reservation control requires marks as the second and third characters of the code, and thus energy is applied through front contacts 163 and 164 of the relay 1GR to channels 2 and 3, respectively. For the transfer of authority control transmission from this station, only the second character of the code need be a mark, and thus the picking up of relay 1YR for such transmission applies energy through front contact 165 to the channel wire 2 only. For the transmission of a cancellation control from station B, for the first flight altitude, the relays 1GR and 1YR are both picked up, and it is required according to the code chart of Fig. 10 that only the third character of the code should be a mark under these conditions. Thus it is provided, by the energization of channel wire 2 through front contact 163 of relay 1GR only provided that back contact 165 of relay 1YR is closed, and through front contact 165 of relay 1YR only provided the back contact 163 of relay 1GR is closed, that the energization of these relays contemporaneously results in there being no energy applied to the channel wire 2, and energy is applied only to the channel wire 3 through front contact 164 of relay 1GR to provide that only the third character of the code transmitted is a mark to satisfy the requirements of code assignment for cancellation transmission from station B according to the code chart of Fig. 10. In a similar manner, selection is made for transmission of the codes for the other flight altitudes according to the assignment of the codes for the respective controls which may be assigned according to the code chart of Fig. 10.

To consider another example of code selection for transmission, consideration will be given specifically to the manner of selection for the codes to be transmitted for the second flight altitude under various conditions, as the circuits in general in this embodiment of the present invention are more specifically illustrated for this flight altitude. Therefore, considering the codes for transmission from station A, with reference to Fig. 8, the picking up of relay 2GR in response to designation of a reservation control applies energy to channels 4 and 5 through front contacts 166 and 167 respectively, energy being applied to channel 5 through back contact 168 of relay 2YR.

If it is a transfer of authority control that is designated by actuation of the yellow button 2YPB for the second flight altitude at station A, energy is applied to the channel wire No. 5 so that the fifth character of the code transmitted is a mark through front contact 168 of relay 2YR and back contact 167 of relay 2GR.

According to the circuit organization that has been described with respect to the selection of a first flight altitude code for transmission from station B for cancellation, it will be apparent that the circuit organization at station A for the control of application of energy to the channel wire 5 for a cancellation code for the second flight altitude provides that no energy is applied to that channel wire when both relays 2GR and 2YR are picked up, and thus in response to designation of a cancellation control for the second flight altitude at station A by actuation of the button 2RPB at that station, only the channel wire No. 4 is energized (through front contact 166 of relay 2GR) to provide a mark only as the fourth character of the code as is called for by the code chart of Fig. 10.

For transmission from station B, the codes for the respective reservation, transfer of authority, and cancellation purposes are provided for the second flight altitude in accordance with principles of selection that have been heretofore pointed out so that the channel wire 4 is energized by the closure of front contact 169 of relay 2GR and the channel wire 5 is energized by the closure of front contact 170 of relay 2YR. Thus it is provided that for a reservation code, only the fourth character is a mark; for a transfer of authority code only the fifth character is a mark; and for cancellation code, the fourth and fifth characters are both marks.

Although only the specific code selections are shown for the first three flight altitudes, it is to be understood that selections are made for the other flight altitudes that may be included for consideration in an air traffic control system of the character described in accordance with principles of selection that have been pointed out.

From the foregoing description relative to the circuit organization and the mode of operation involved in the selection of codes for transmission, it will be readily apparent that, for the typical cycle of operation being specifically considered, the reservation code "space-space-space-mark-mark" is transmitted in response to the actuation of the green button GPB (see Figs. 2 and 5) at station A for designating a reservation for the second flight altitude. Thus subsequent to the dropping of the line relay L at both stations upon the picking up of the relay SM at station A for initiation of the cycle as has been heretofore described, the line circuit is maintained open for the first three successive characters of the code because of these characters being spaces.

The mark for the fourth character of the code is transmitted by the closing of the line circuit at station A, and thus the relay L at the receiving station B is picked up. Under these conditions the relay EM is picked up during the transmission of the preceding character so that the shunt across the line wires 140 and 141 (see Fig. 4) is effected upon the picking up of relay 4V at station A. This shunt is applied at station A from wire 140 through front contact 59 of relay SM, the left-hand contact fingers 42 and 46 of the oscillator CT, front contact 147 of relay EM, front contact 145 of relay 4V, back contact 146 of relay 5V and front contact 58 of the message sending relay SM, to line wire 141. In accordance with the circuit organization for the relay OM which has been described, this relay becomes picked up to cause the fifth character of the code to be a mark upon the picking up of relay 4V. Thus the relay OM is picked up to determine that the fifth character is a mark during transmission of the fourth character and a shunt is maintained across the line wires through front contacts 148 and 149 of relays EM and OM in series and through front contacts 58 and 59 of the message sending relay SM during the shift of the oscillator pendulum through its center position. The relay EM at station A is maintained picked up until its circuit is opened by the picking up of the fifth step relay 5V when the right-hand contact fingers 44 and 48 (see Fig. 7C) of the oscillator CT are closed, and at this time, because of the closure of the right-hand contact fingers 43 and 47 (see Fig. 4) of the oscillator CT with the relay OM picked up and relay 5V picked up, the shunt is maintained across the line wires 140 and 141 by the opening of the right-hand contact fingers 43 and 47 of the oscillator CT. It is believed that from the specific example that has been given for the transmission of a particular designated control, that the mode of operation for the transmission of other messages will be readily apparent.

*Message reception*

Assuming that a message to reserve the second flight altitude is transmitted from station A as has been heretofore described, consideration will now be given to the means for receiving the message at station B.

The relays M (see Fig. 7C) for the respective digits of the five character code are picked up during the reception of a code in correspondence with the marks received, and they are maintained energized until the end of the communication cycle. Thus for the reception of the code under consideration, the relays 1M, 2M, and 3M remain deenergized during the periods of transmission for the first three characters of the code which are spaces, and the relays 4M and 5M are picked up during the subsequent transmission of marks for the respective fourth and fifth characters. The circuit by which the relay 4M at station B is picked up under these conditions extends from (+), including left-hand contact fingers 41 and 45 of oscillator CT, front contact 171 of relay L, rectifier unit 171a, back contact 172 of relay 5V, front contact 173 of relay 4V, and lower winding of relay 4M, to (−). The relay 4M is maintained picked up during the first half of the communication cycle under consideration by a stick circuit extending from (+), including back contact 174 of relay ST, front contact 175 of relay 4M, and upper winding of relay 4M, to (−).

The inclusion of front contacts 176 and 177 of relay SC and PBP in multiple with back contact 174 of relay ST provides means of maintaining relays M picked up during the answer back portion of a communication cycle at the transmitting and receiving stations respectively.

When the oscillator CT at station B shifts to close its right-hand contact fingers 44 and 48 for the third time during the control cycle, the relay 5M is picked up subsequent to the picking up of relay 5V because of the line circuit being energized during the fifth period of the code so as to cause the relay L to be picked up. The pick up circuit for the relay 5M extends from (+), including right-hand contact fingers 44 and 48 of oscillator CT, front contact 178 of relay L, rectifier 178a, back contact 179 of relay 6V, front contact 180 of relay 5V, and lower winding of relay 5M, to (—). This relay is maintained picked up throughout the remainder of the first half of the communication cycle by a stick circuit, including back contact 181 of relay ST, front contact 182 of relay 5M, and upper winding of relay 5M. With reference to Fig. 7B, a pick up circuit is closed for the relay ST after the relay 6V has been picked up. This circuit extends from (+), including front contact 221 of relay 6V, back contact 222 of relay IV and upper winding of relay ST, to (—). This pick up circuit is maintained energized until the dropping away of the relay 6V, and by that time, the oscillator CT at station B has been energized and actuated to close its left-hand contact fingers 41 and 45 (see Fig. 7C) so as to provide stick circuit energization for the relay ST. The line relays L are both picked up under these conditions as has been pointed out when considering the mode of operation of the stepping, and thus the front contact 62 of relay L (see Fig. 7B) is closed to complete this stick circuit.

Subsequent to the picking up of the last step relay 6V, upon the closure of the right-hand contact fingers 44 and 48 of the oscillator CT for the fourth time during the first part of a communication cycle, the relay SC (see Fig. 7A) is picked up at the receiving station to initiate the conditioning of the apparatus at that station for the transmission of an answer back, or check code. The circuit for the energization of this relay has been described when considering the mode of operation of the stepping.

Relay SC when picked up provides stick energy for the stick circuits of the relay M (see Fig. 7C) of the message relay bank at station B by the closure of front contacts 176 and 183 so that these relays are maintained picked up throughout the transmission of the answer back code during the second half of the communication cycle.

Upon the picking up of the relay SC at station B subsequent to the reception of the control code under consideration, an execution circuit is closed as shown in Fig. 6 for energizing the relay 2RK with a polarity to actuate its contacts to their dropped away positions. This is accomplished by energization of the lower winding of relay 2RK through a circuit extending from (+), including front contact 185 of relay SC, back contact 186 of relay 1M, front contact 187 of relay 5M, front contact 188 of relay 4M, back contact 189 of relay 3M, back contact 190 of relay 2M, wire 2C, back contact 191 of relay 2GR, back contact 192 of relay 2YR, back contacts 193 and 194 of relays 2GK and 2YK respectively connected in multiple, front contact 195 of relay 2RK and lower winding of relay 2RK, to (—). The energization of this relay is of a polarity to actuate the contacts of relay 2RK to their dropped away positions, and thus the circuit just described is opened at front contact 195 under these conditions.

Upon the dropping away of the indication control relay 2RK, the red lamp 2RE (see Figs. 2 and 6) for the second flight altitude on the panel 21 at station B becomes energized. The circuit for energization of the lamp 2RE extends from (BX), including back contact 196 of relay 2RK and lamp 2RE, to (NX). Although energization of the indicator lamps has been indicated as being by alternating current it will be readily apparent that direct current can as well be used if such is the requirements of practice. Alternate current energization has been indicated, because, for purposes of economy and other considerations, it has been the usual practice to use alternating current for indicator lamp energization, while direct current energy is generally required for relay operation.

It has been thus provided, that the red lamp 2RE is energized on the tower controllers' panel 21 at station B as an indication that the second flight altitude has been reserved by the airways controller at station A for an airplane flight under his supervision.

The reception of other messages is accomplished in much the same manner as that which has been described, except that in accordance with the designation of the other controls for transmission, different codes are transmitted, and thus different combinations of message relays M are energized upon receiving different codes.

To consider specifically the reception of a different message from that which has been considered, it will be assumed that at a time subsequent to the transmission of the message that has been considered, a message is designated for transmission at station A to cancel the reservation which has been made at a prior time for the second flight altitude. Thus, with reference to the code chart of Fig. 10, a cancellation code is transmitted from station A comprising all spaces as code characters except for the fourth character which is a mark. Upon the reception of this code at station B, the relay 4M (see Fig. 7C) is picked up by the energization of a circuit that has been described, and upon execution of the code at station B at the end of the first half of the communication cycle under consideration, the relay 2RK (see Fig. 6) at station B is energized with a polarity to cause the picking up of that relay. Thus with the relay 4M picked up, the picking up of the relay SC by energization in a manner which has been described establishes a circuit for the energization of the upper winding of relay 2RK extending from (+), including front contact 185 of relay SC, back contact 186 of relay 1M, back contact 187 of relay 5M, front contact 197 of relay 4M, back contact 198 of relay 3M, back contact 199 of relay 2M, wire 2G, back contact 200 of relay 2YR, back contact 201 of relay 2GR, back contact 202 of relay 2GK, upper winding of relay 2RK, and rectifier unit 202a, to (—). The polarity of energization is such as to cause the picking up of relay 2RK, and the picking up of that relay opens the circuit at back contact 196 by which the red lamp 2RE has been energized in accordance with the reservation that is assumed to have been designated at a prior time for the second flight altitude. Thus in this manner the transmission of a cancellation control from the other station can be effective to extinguish the red lamp RE for any particular flight altitude under consideration.

Another control that can be communicated from station A to station B during a communication cycle is a control for indicating the desire to transfer authority of an airplane flight at a particular selected flight altitude from a controller at station A to a controller at station B.

Thus, considering the typical second flight altitude, if a control is communicated from station A to station B for the transfer of authority, the code transmitted as indicated by the code chart of Fig. 10 comprises all spaces except for the fifth character of the code which is a mark. Upon receiving this message at station B, the relay 5M (see Fig. 7C) is energized by a circuit which has been described, and the other relays M at station B remain in their deenergized positions during the execution of the code at the end of the first half of the communication cycle under consideration.

When the relay SC (see Fig. 7A) is picked up after reception of the code under these conditions, the relays 2YK and 2RK (see Fig. 6) are both energized in a circuit extending from (+), through front contact 185 of relay SC, back contact 186 of relay 1M, front contact 187 of relay 5M, back contacts 188, 203 and 204 of relays 4M, 3M and 2M, respectively, wire 2Y, back contact 205 of relay 2GR, back contact 206 of relay 2YR, back contact 207 of relay 2GK, and upper winding of relay 2YK connected in multiple with the center winding of relay 2RK, to (−).

In response to the picking up of relay 2YK, with relay 2GK in its dropped away position, the yellow lamp 2YE at station B is energized with flashing energy by a circuit extending from (BX), including front contact 196 of relay 2RK, back contact 208 of relay 2GK, front contact 209 of relay 2YK, lamp 2YE, normally closed contact 210 of the push button 2GPB and back contact 211, to (FNX). The symbol (FNX) is used to indicate the connection through a suitable flasher to the instantaneous negative source of alternating current for the energization of the lamp 2YE.

Having thus considered the reception of the three distinctive types of controls that can be communicated over the communication system from one station to the other for a typical flight altitude, it will be readily apparent that a similar mode of operation and a similar mode of organization is involved in the reception of similar messages for other flight altitudes.

Answer back transmission

After having received a control during the first half of a communication cycle and selectively energized relays M (see Fig. 7C) for the respective marks that have been received during transmission of the control code, the system is conditioned for the transmission of an answer back code by restoration of the stepper relays V and the control of other relays as has been specifically considered when describing the stepping operation. That is, the mode of operation has been considered for a specific cycle of operation initiated at station A wherein the closure of the right-hand contact fingers 44 and 48 (see Fig. 7C) of the oscillator CT at station A for the fourth time in the cycle causes the picking up of the relay RC (see Fig. 7A) at that station; and it has been pointed out that the picking up of this relay RC causes restoration of the relay CDS and the stepper relays V at station A.

A similar mode of operation at the end of the first half of the communication cycle is effective at the receiving station B, except that it is the relay SC (see Fig. 7A) rather than the relay RC that is picked up upon the closure of the right-hand contact fingers 44 and 48 (see Fig. 7C) of the oscillator CT at station B for the fourth time during the cycle. Thus the relay SC is picked up at the receiving station to condition that station to send a check code, and at substantially the same time the relay RC is picked up at the station A to condition station A to receive the check code.

As the system enters the second half of the communication cycle under consideration, the message sending relay SM is picked up at station B to open the line circuit and thus initiate the oscillators at the respective stations in a manner that has been heretofore described.

In accordance with the picking up of the relay SM at station B, the line circuit is opened by the shifting of the contacts 56 and 57 (see Fig. 4) of relay SM at that station, and because of the first three characters of the typical code that has been under consideration being spaces, the odd message transmitter relay OM is not picked up at this time, and thus the picking up of the relay SM at station B at the beginning of the second half of the communication cycle under consideration opens the line circuit so as to cause the line relays L at both stations to be dropped away. The code oscillator CT at station B is maintained energized, subsequent to the dropping away of the last relay 6V, by a circuit that has been described when considering the normal conditions of the system, and this circuit is opened to cause the oscillator CT to be set into operation upon the picking up of relay SM by the opening of back contact 52 (see Fig. 7C). Thus the stepping is initiated at station B, and the transmission of marks and spaces is effected by the selective energization of the relays OM and EM (see Fig. 9) for the respective characters in much the same manner as the energization of these relays governs the original transmission of a message during the first part of a communication cycle.

One difference, however, in the communication of the answer back code is that the relays OM and EM can be energized for transmitting a mark in an answer back code only provided that a checking relay CK is picked up at that station to indicate that the magnetic stick relays have been conditioned in correspondence with the message code that has been received at that station during the first part of the communication cycle. Thus with reference to the circuits for the relays OM and EM for station B, it will be noted that these relays, in order to be active during the answer back portion of the cycle, must have front contacts 158 and 212 of the check relay CK closed. If the relay CK were not picked up at the receiving station B because of improper response of the relays GK, YK and RK to the codes received, a code comprising all spaces would be transmitted, and this code would be interpreted at the other station as a false check because no code having all spaces is used for a control.

It has been pointed out that the energization of a relay CK to permit the transmission of a valid answer back code during the last half of a communication cycle is dependent upon the response of the magnetic stick relays GK, YK and RK in correspondence with the code that is received for the control of these relays. Thus, for example, considering the reception of the code as described for a reservation designated at station A for the second flight altitude, the relay CK (see Fig. 6) at station B requires the relay 2RK to be in its dropped away position in correspondence with the code "space-space-space-mark-mark." It is therefore provided that upon actuation of the relay 2RK to its dropped away position as has been described, the lower winding of the check relay CK is energized by a circuit extending from (+), including front contact 185 of relay SC, back contact 186 of relay 1M, front contact 187 of relay 5M, front contact 188 of relay 4M, back contact 189 of relay 3M, back contact 190 of relay 2M, wire 2C, back contact 191 of relay 2GR, back contact 192 of relay 2YR, back contacts 193 and 194 of relays 2GK and 2YK, respectively connected in multiple, back contact 195 of relay 2RK, back contact 213 of relay 2GK, back contact 214 of relay 2YK, back contact 215 of relay 2GR, back contact 216 of relay 2YR, rectifier unit 216a, and lower winding of relay CK, to (−). This circuit remains closed until the relay SC is dropped away at the end of the cycle, but because it is desirable to maintain the relay CK picked up until all other relays have been restored to their normal conditions, a stick circuit is provided for that relay that is closed upon the picking up of the relay ST and is maintained energized until this relay ST becomes dropped away at the start of another communication cycle. The stick circuit for relay CK extends from (+), including front contact 127 of relay ST, front contact 219 of relay CK, and upper winding of relay CK, to (−). This relay CK is common to all flight altitudes, and thus it is indicated that wires are connected for other flight altitudes to the pick up bus 220 for this relay, such wires being assumed to include contact selections for other respective flight altitudes comparable to those which are illustrated and described for the control of the relay CK in accordance with controls relative to the second flight altitude.

With reference to Fig. 9, the picking up of relay CK at station B as has been described applies negative energy to the circuits for the relays OM and EM at front contacts 212 and 158 respectively, and thus provides that these relays OM and EM can be governed in accordance with the respective marks that have been transmitted during the first half of the communication cycle under consideration. It will be noted that the picking up of the relay SC at station B for sending the check code opens the circuits for the relays OM and EM which are connected to the respective channel wires 1, 2, 3, 4 and 5 whose energization is governed by the relays GR and YR, and selects through front contacts 153 and 159 the control of the relays OM and EM in accordance with the respective message relays which have been energized during the first portion of the communication cycle. Thus for the typical cycle of operation under consideration, the relays 4M and 5M have been considered as being energized in accordance with the last two characters of the code communicated being marks. The closure of front contact 223 of relay 4M provides for the energization of the relay EM upon the picking up of the third step relay 3V to condition the transmitter at station B for closing the line circuit and thus energizing the relay L at station A when the code oscillator CT at station B subsequently closes its left-hand contacts. This is for the closure of the left-hand contacts for the oscillator CT upon completion of the second excursion of the oscillator pendulum during the answer back portion of the cycle. The circuit by which relay EM is energized upon the picking up of relay 3V during the answer back portion of the cycle under consideration extends from (+), including front contact 223 of relay 4M, front contact 224 of relay 3V, back contact 225 of relay 5V, front contact 159 of relay SC, upper winding of relay EM, and front contact 158 of relay CK, to (−).

Upon the picking up of relay 4V during the answer back portion of the cycle, the relay OM becomes energized in accordance with the message relay 5M being in its picked up position. The circuit for energization for relay OM under these conditions extends from (+), including front contact 226 of relay 5M, front contact 227 of relay 4V, back contact 228 of relay 6V, front contact 153 of relay SC, winding of relay OM, front contact 154 of relay SC, and front contact 212 of relay CK, to (−).

Thus upon the picking up of the relay OM prior to the deenergization of the relay EM (relay EM being deenergized by the opening of back contact 225 of relay 5V), a shunt is maintained across the line wires at station B so as to maintain the line relay L at station A steadily energized for the interval in shifting from the fourth to the fifth characters of the code.

Having thus considered the manner in which the relays EM and OM are selectively energized for transmitting the respective fourth and fifth characters as answer back code marks, consideration will now be given as to the conditions under which the line circuit (see Fig. 4) becomes closed so as to energize the line relay L at station A for these characters of the code. In accordance with the relay EM being picked up for the fourth character of the code, the line circuit is closed upon the picking up of relay 4V for this fourth character because of the connection of wire 141 through front contact 57 of relay SM, back contact 229 of relay 5V, front contact 230 of relay 4V, front contact 231 of relay EM, left-hand contact fingers 42 and 46 of the oscillator CT at station B and front contact 56 of relay SM to the line wire 232 which is connected to the positive terminal of the line battery LB. Thus the line relay L at station A becomes energized for the fourth character of the code in accordance with the closure of front contact 230 of the stepper relay 4V at station B. If it were to be assumed that the next code character would be a space rather than a mark, the mark used as the fourth character would be terminated by the opening of the left-hand contact fingers 42 and 46 of the oscillator CT at station B as the pendulum of that oscillator passes through center so as to open these contact fingers and close the right-hand contact fingers 43 and 47.

Because of the fourth and fifth characters being marks for the assumed cycle of communication, the picking up of the relay OM as has been described for determining that the fifth character is a mark is effective to close a shunt from line wire 141 through front contact 57 of relay SM, front contact 233 of relay OM, front contact 234 of relay EM and front contact 56 of relay SM, to wire 232. As has been described, the line circuit is thus maintained closed during the shifting of the oscillator CT at station B from the closure of its left-hand contact fingers 42 and 46 to the closure of its right-hand contact fingers 43 and 47. Upon picking up of relay 5V in response to the closure of the right-hand contact fingers 43 and 47 of the oscillator CT at station B, a shunt is applied across the right-hand end of the line circuit to maintain the relay L at station A energized for the duration of the fifth code character. This shunt extends from wire 141 through front contact 57 of relay SM, front contact 229 of relay 5V, front contact 235 of relay OM, right-hand contact fingers 43 and 47 of oscillator CT and front contact 56 of relay SM to wire 232 of the line circuit. Thus the line circuit is maintained closed until the opening of the right-hand contact fingers 43 and 47 when the oscillator CT opens these contact fingers for the third time during the answer back portion of the communication cycle of operation under consideration.

It is believed that it should be readily apparent from the above described typical condition of answer back code transmission that other code characters are transmitted in correspondence with different combinations of energization of the message relays M by a similar mode of operation, the relays M acting upon the energization of the respective odd and even relays OM and EM (see Fig. 9) for the associated periods of transmission in the five digit code. Thus if the first digit of the code to be transmitted is a mark, the relay 1M is picked up, and the closure of its front contact 236 establishes a pick up circuit for the relay OM upon the picking up of the relay SC at the beginning of the answer back half of the cycle, energization being accomplished through back contacts 237, 227, and 228 of relays 2V, 4V, and 6V, respectively so that the energization of relay OM for transmission of the first character is terminated by the picking up of relay 2V during the stepping, and the closure of front contact 237 of relay 2V provides that the relay OM can be energized through front contacts 238 and 237 of relays 3M and 2V and back contacts 227 and 228 of relays 4V and 6V, if the third character of the code is to be a mark.

Similarly in the control of the relay EM, if a second digit of the code is to be a mark in accordance with the relay 2M being picked up, the relay EM is energized through front contact 239 of relay 2M, front contact 240 of relay 1V, and back contacts 224 and 225 of relays 3V and 5V. The initial energization of the line circuit is always in accordance with the actuation of a stepper relay, and the termination of a character is in accordance with the opening of the particular contact fingers of the oscillator that have been closed when the pulse is initiated, except where adjoining characters of the code are marks, and under such conditions, energization is maintained during the cross-over time of the oscillator CT as has been heretofore described.

*Reception of answer back code*

It has been heretofore pointed out that the oscillator CT at station A is energized at the end of the first half of a communication cycle for transmission of a control from that station to station B, and the energization of the oscillator at station A is maintained until the opening of the line circuit at station B by the picking up of the relay SM at station B as has been described. When the line relay L is dropped away at station A under these conditions, the circuit by which the oscillator CT at that station has been maintained energized is opened at front contact 53 (see Fig. 7C), and thus the oscillator CT is rendered active to initiate the stepping and the decoding of the answer back code that is to be received. The dropping away of the relay L at station A at this time is also effective to deenergize the relay ST (see Fig. 7B) by opening its stick circuit at front contact 62; thus and cause this relay to be dropped away. The normal pick up circuit for relay ST is open at this time at front contact 221 of relay 6V.

Considering the reception of the answer back code "space-space-space-mark-mark," this code provides for the picking up of the relays 4M and 5M (see Fig. 7C) at station A during the respective fourth and fifth periods of the code by the energization of circuits for these relays at station A identical to the circuits that have been described as being effective for the picking up of corresponding relays 4M and 5M at station B during the reception of the control code during the first part of the communication cycle. These relays 4M and 5M at station A are maintained picked up by their stick circuits which are energized through front contacts 184 and 177 of relay PBP.

Upon the picking up of the relay 6V at station A after reception of the answer back code, an execution circuit is closed to cause the picking up of the magnetic stick relay 2GK (see Fig. 5). This circuit extends from (+), including front contact 241 of relay 6V, front contact 242 of relay PBP, back contact 243 of relay SC, back contact 244 of relay 1M, front contact 245 of relay 5M, front contact 246 of relay 4M, back contact 247 of relay 3M, back contact 248 of relay 2M, wire 2G, back contact 249 of relay 2YR, front contact 250 of relay 2GR, and upper winding of relay 2GK, to (−). Connected in multiple with the upper winding of relay 2GK, is the center winding of relay 2YK, so that both relays 2GK and 2YK are picked up at this time.

Upon considering the circuit that has just been described for the energization of relays 2YK and 2GK it will be noted that these relays can be picked up only provided that the relay 2GR is picked up at that station. Inasmuch as it was the picking up of relay 2GR that determined the code to be transmitted during the first part of the communication cycle, it is also provided that the same code must come back by answer back transmission and the execution circuit be fed through a front contact 250 of relay 2GR as a means of determining that the answer back code checks with the code that was originally selected by the relay 2GR for transmission. If the answer back code were not in correspondence with the code selected for transmission by the relay 2GR, energy would feed through the fan of execution contacts of the relays M through a different channel and to relays GK, YK and RK of another flight altitude, and because of their being no relay GR picked up for the other flight altitude, the energization of the relay GK and YK for that flight altitude could not be effected because of their circuit being open at a front contact corresponding to the front contact 250 of relay 2GR. It is furthermore provided, as will be hereinafter considered, that execution of a code which does not check is prevented by the dropping away of relay PBP to open front contact 242 in a manner to be hereinafter considered.

The energization of the green lamp 2GE in accordance with the picking up of the relays 2GK and 2YK at station A is effected through a circuit extending from (BX), including front contact 68 of relay 2RK, front contact 69 of relay 2GK, front contact 251 of relay 2YK, lamp 2GE and normally closed contact 252 of button 2YPB, to (NX). Thus the energization of this lamp is an indication to the controller at station A that his designated reservation for the second flight altitude has become effective, and that a control has been received at station B for energization of the red lamp RE at that station to indicate to the controller at station B that the second flight altitude has been reserved under the authority of the controller at station A, the energization of the green lamp 2GE at station A being an indication to the operator at that station of the integrity of the communication as having been completed.

Clear out

After operation has been maintained through a communication cycle as has been described for the transmission of a control code during the first part of the cycle, and an answer back code during the last part of the cycle, the system enters a clear out period wherein the apparatus at both stations is restored to its normal inactive condition, such clear out being initiated by the closure of the right-hand contact fingers 44 and 48 (see Fig. 7C) of the oscillators CT at both stations for the fourth time during the last half of the communication cycle. Thus if it is assumed that a communication cycle is transmitted from station A to station B for obtaining clearance for the second flight altitude as has been heretofore described, and as has been illustrated in the sequence chart of Figs. 14A and 14B, the restoration of the stepping relays to their deenergized positions at both stations is effected by the respective associated code oscillators CT upon the closure of their right-hand contacts for the fourth time during the last half of the communication cycle.

Therefore the closing of the right-hand contact fingers 44 and 48 (see Fig. 7C) of the oscillator CT at each station causes the picking up of the relay CN (see Fig. 7A) at that station for initiating the clear-out period. At station A the relay CN is picked up by the energization of a circuit extending from (+), including right-hand contact fingers 44 and 48 (see Fig. 7C) of oscillator CT, rectifier unit 107a, front contact 107 of relay 6V, wire 123, back contact 124 of relay L, back contact 125 of relay SM, front contact 132 of relay RC, and upper winding of relay CN, to (—). At station B, the relay CN is picked up by the energization of a circuit extending from (+), including right-hand contact fingers 44 and 48 (see Fig. 7C), rectifier unit 107a of oscillator CT, front contact 107 of relay 6V, wire 123, back contact 124 of relay L, front contact 125 of relay SM, front contact 126 of relay SC, and upper winding of relay CN, to (—). The relay CN at each station has a stick circuit wherein it is maintained energized directly through its front contact 253 until it is knocked down by energization of the lower winding of the relay with the opposite polarity.

The relay CN at each station is maintained energized at the end of the cycle until the oscillator CT at that station closes its left-hand contacts for the last time during the cycle. At that time such relay CN is knocked down by the energization of its lower winding with opposing polarity. The circuit for energization of relay CN under these conditions extend from (+), including left-hand contact fingers 41 and 45 (see Fig. 7C) of oscillator CT, wire 61, front contact 254 of relay ST (see Fig. 7A), back contact 255 of relay RC, front contact 256 of relay CN, and lower winding of relay CN, to (—).

At each station, the picking up of relay CN opens the stick circuit for the relay CDS at back contact 97, and thus the relay CDS at that station is dropped away because its pick-up circuit has been opened at back contact 91 of the last step relay 6V, which is in its picked up position at this time.

In response to the dropping away of the relay CDS, the stepper relays 1V to 5V inclusive are dropped away at the associated station because of the opening of front contacts 111 and 116 (see Fig. 7C), the last step relay 6V being maintained picked up for a time as has been heretofore considered as being accomplished by the closure of back contact 122 of the line relay L, and the front contact 122a of relay CN, in the stick circuit for relay 6V.

During the clear-out period, the dropping away of the first step relay 1V closes a pick-up circuit for the normally energized start relay ST (see Fig. 7B) at that station, this pick-up circuit including front contact 221 of relay 6V and back contact 222 of relay 1V. The stick circuit by which the relay ST is normally maintained picked up which has been described when considering the normal conditions of the system, is established prior to the dropping away of the relay 6V which opens the pick-up circuit which has been described for relay ST at front contact 221. Thus the relay ST is maintained steadily energized at each station subsequent to its being picked up by the dropping away of the first step relay 1V at the end of a communication cycle.

The relay 1V (see Fig. 7C) at each station in dropping away also provides for the energization of the oscillator CT at that station so as to actuate its armature 37 (see Fig. 11) against the stops 40 and thus lock the armature in a position which has been described as normal for the oscillator CT, wherein the lefthand contact fingers 42 and 46, and 41 and 45 are maintained closed. This energization of the oscillator CT at each station occurs at a time when the right-hand contact finger 43 and 47, and 44 and 48 are closed for the fourth time during the second half of the communication cycle, and thus the time of energization is such that a fourth excursion of the oscillator pendulum 33 is maintained by a substantially uniform motion providing a curve for the last excursion of a form as illustrated in Fig. 13, comparable to the curves for the other excursions of the communication cycle except that energization causes the armature 37 of the oscillator to be actuated against the stops 40 and thus to be drawn beyond the range of normal free swing oscillations to restore the armature 37 to its normal position.

When the oscillator mechanism passes through center upon completing its fourth excursion during the last part of the communication cycle under consideration, the relay RC (see Fig. 7A) at station A is dropped away upon the opening of the right-hand contact fingers 44 and 48 (see Fig. 7C) of the oscillator CT, the circuit for the upper winding of relay RC having been opened by the picking up of the relay CN to open back contact 131 (see Fig. 7A).

At station B, the passing of the mechanism of the oscillator CT through center at the end of the fourth excursion during the last half of the cycle causes the dropping away of the relays SC and SM. The relay SC is dropped away because of the opening of the right-hand contact fingers 44 and 48 (see Fig. 7C) of the oscillator CT at station B inasmuch as the circuit for its upper winding is opened at that time at back contact 134 of the relay CN.

The dropping away of the relay SM (see Fig. 7B) at station B is accomplished by the energization of the upper winding of that relay with a polarity opposing the energization of the stick circuit for the lower winding.

The circuit has been described by which the relays CN at the respective stations A and B are knocked down when the left-hand contact fingers 41 and 45 (see Fig. 7C) are closed for the last time during a communication cycle. It is preferable that the relays CN be made slow in dropping away as by use of a high resistance knock down winding, so as to allow time for the restoration of message relays M and other relays to be restored before termination of the cycle.

At station A, in response to the dropping away of the relay RC as has been described, relay PBP (see Fig. 7B) is dropped away because the stick circuit for its upper winding is open at front contact 257 of relay RC. The pick up circuit for the lower winding of relay PBP is open at this time at back contact 72 of relay 6V, and the dropping away of relay RC opens a stick circuit for the lower winding of the relay PBP by which it has been last maintained energized extending from (+), including front contact 259 of relay 6V, front contact 260 of relay RC, front contact 261 of relay PBP, and lower winding of relay PBP, to (—). Thus the relay PBP becomes dropped away, and the dropping away of this relay opens the stick circuit for the push button repeater relay GR (see Fig. 5) at station A at front contact 76 so as to cause that relay to be dropped away.

At the same time that energy is removed from the push button repeater relay GR by the dropping away of relay PBP, the execution circuit that has been heretofore described for governing the energization of the relays 2GK and 2YK is opened at front contact 242 so that the relays M that have been picked up during the cycle can subsequently be restored to their normally deenergized condition. Thus it is provided at station A that the relays 4M and 5M (see Fig. 7C), which have been considered as being picked up during the cycle, are dropped away by the opening of their stick circuits at front contacts 177 and 184 respectively, the relay SC having been in its dropped away position at station A throughout the cycle so as to maintain front contacts 176 and 183 open, and the relay ST being picked up at this time so as to open back contacts 174 and 181 in the stick circuits for the relays M.

To complete the restoration to normal conditions of the communication apparatus at station A at the end of the communication cycle under consideration, the last step relay 6V is deenergized by the opening of its stick circuit upon the dropping away of relay CN at front contact 122a (see Fig. 7C).

At station B, the last step relay 6V is also restored by the opening of a similar stick circuit.

Transfer of authority

The mode of operation as it has been heretofore described has been more particularly limited to a consideration of the communication during a typical cycle of operation of a flight reservation control designated at the airways control center (station A) for the second flight altitude wherein a green lamp 2GE is energized on the panel 21 at the airways center (because the control has been designated at that office), and it has been described how a red indicator 2RE is energized on the panel 21 at the tower station B to indicate to the tower approach controller that an airplane flight is approaching the tower under the supervision of an airways controller at the second flight altitude.

This particular procedure in designating a reservation by an airways controller at station A is considered as the proper procedure when the airplane flight to be assigned to the particular flight altitude reserved is to be for a through flight with respect to the fix under consideration, rather than the airplane being landed at the airport for which the station B is provided. In other words, a reservation when designated as has been described sets up a green indication on the airways controller's board, and a red indication on the approach controller's board, indicating to both controllers that the reservation has been made for a through flight maintained under the supervision of the airways controller, rather than it being required that the authority for the flight be transferred from the airways to the approach controller, as is the case when the airplane is to be landed at station B.

To consider now the provisions made for the transfer of authority under conditions where an airplane is to be landed at station B, it will be assumed that a controller at station A designates his desire to transfer authority by reserving the second flight altitude by the actuation of the yellow button 2YPB (see Fig. 2) rather than by actuation of the green button 2GPB as was the case as heretofore described. The actuation of this button 2YPB establishes a reservation through the communication system in a manner comparable to that which has been described, except that a different code is employed, and thus the control is distinctively decoded at the respective stations to energize yellow indicator lamps 2YE at both stations A and B rather than energize the green and red lamps 2GE and 2RE at stations A and B respectively as has been heretofore specifically considered. It is further provided that the yellow indication set up on the approach controller's board at station B is distinctive from that provided on the airways controller's board in that the yellow indicator lamp 2YE at station B is energized with flashing energy, while the yellow lamp 2YE on the board at station A is steadily energized. In other words flashing energization of the yellow indicator lamp YE for any particular flight altitude is considered as an indication of the reservation having been made by the other station as a designation for the transfer of authority for the particular associated airplane flight. After the controller at station B has contacted the airplane flight under consideration, the transfer is consummated by the actuation of the green button 2GPB on the board 21 at station B having the flashing yellow light, and thus this flashing light is extinguished and the green lamp 2GE is steadily energized to indicate that the reservation is now under the control of the controller at station B, and it is at this station that the reservation must be subsequently cancelled when the airplane has cleared that flight altitude. At station A, the yellow lamp 2YE is extinguished and the red lamp 2RE is illuminated to indicate to the airways controller that the transfer of authority has been consummated.

To consider specifically the means by which the above described general mode of operation is accomplished, it will be assumed that an airways controller desires to establish a reservation for a second flight altitude for an airplane flight to be landed at the airport at station B requiring the transfer of authority for the flight from the airways controller to the approach controller at station B. Under these conditions, the airways controller actuates the push button 2YPB (see Fig. 2) on the panel 2I at station A at a time when the communication system is available for the transmission of the control.

With reference to Fig. 5, the actuation of the push button 2YPB at station at A at this time establishes a pick up circuit for the relay 2YR extending from (+), including back contacts 64 of relay RC, front contact 65 of relay ST, back contact 66 of relay SC, back contact 67 of relay 6V, back contact 67a of relay CN, front contact 68 of relay 2RK, back contact 69 of relay 2GK, back contact 70 of relay 2YK, back contact 262 of push button 2YPB, and winding of relay 2YR, to (—). The relay 2YR when picked up is maintained picked up until the end of the cycle through a front contact 83 in a manner comparable to that which has been described for maintaining the relay 2GR picked up throughout a communication cycle.

When considering in detail the operation of the system for message transmission, the mode of operation in selecting codes for transmission has been considered, and thus it will be readily apparent from the description as it has been set forth that a code is transmitted in response to the picking up of relay 2YR having the code characters (see Fig. 10) "space-space-space-space-mark."

When this code is received at station B at the end of the first half of the communication cycle under consideration, the relay 2YK at station B (see Fig. 6) is picked up, and the relay 2GK at station B remains in its dropped away position. Under these conditions, the energization of the lamp 2YE is selected as being from flashing energy because of the closure of back contact 211 of relay 2GK. The relay 2YK is energized during the execution period by a circuit extending from (+), including front contact 185 of relay SC, back contact 186 of relay 1M, front contact 187 of relay 5M, back contacts 188, 203 and 204 of relays 4M, 3M and 2M respectively, wire 2Y, back contacts 205, 206 and 207 of relays 2GR, 2YR and 2GK respectively, and upper winding of relay 2YK, to (—). When relay 2YK is picked up under these conditions, a circuit is closed for the energization of the lamp 2YE with flashing energy extending from (BX), including front contact 196 of relay 2RK, back contact 208 of relay 2GK, front contact 209 of relay 2YK, lamp 2YE, normally closed contact 210 of the push button 2GPB, and back contact 211 of relay 2GK, to (FNX). Thus, the lamp 2YE is energizing with flashing energy at the end of the first half of the communication cycle upon execution of the code received at station B.

Considering the correspondence check by the check relay CK at station B to insure that the relays 2GK, 2YK and 2RK are properly conditioned in response to the code that has been received, the relay CK is picked up by the energization of a circuit extending from (+), including front contact 185 of relay SC, back contact 186 of relay 1M, front contact 187 of relay 5M, back contacts 188, 203 and 204 of relays 4M, 3M and 2M respectively, wire 2Y, back contacts 205, 206 and 207 of relays 2GR, 2YR and 2GK respectively, front contact 264 of relay 2RK, front contact 265 of relay 2YK, back contact 215 of relay 2GR, back contact 216 of relay 2YR, rectifier unit 216a, pick up bus 220, and lower winding of relay CK, to (—). It has been pointed out that it is necessary that the relay CK be picked up in order to permit the transmission of the answer back code during the second half of a communication cycle. This relay CK is maintained picked up at station B during transmission of the second half of the communication cycle by the energization of a stick circuit that has been heretofore considered.

Thus, as the communication cycle progresses, the code "space - space - space - space - mark" is transmitted from station A to station B during the last half of the cycle as an answer back code, and the reception of this code at station A causes the picking up of the relay 5M for the mark occurring as the fifth digit of that code. With reference to Fig. 5, an execution circuit is closed upon the picking up of the last step relay 6V at the end of the communication cycle under consideration which provides for the picking up of the relay 2GK at station A and for the energization of the upper winding of the relay 2RK which is assumed to be already in its picked up position at this time. The circuit for energization of the relay 2GK extends from (+), including front contact 241 of relay 6V, front contact 242 of relay PBP, back contact 243 of relay SC, back contact 244 of relay 1M, front contact 245 of relay 5M, back contacts 246, 266 and 267 of relays 4M, 3M and 2M respectively, wire 2Y, back contact 268 of relay 2GR, front contact 269 of relay 2YR, and center winding of relay 2GK, to (—). Upon the picking up of the relay 2GK, the closure of front contact 270 applied energy from this circuit to the upper winding of relay 2RK, but energy cannot be fed through to pick up the check relay CK as the pick up circuit for this relay is maintained open at back contact 271 of relay 2YR.

The yellow lamp 2YE on the panel 21 at station A is steadily energized in response to the picking up of the relay 2GK under the above described conditions by a circuit extending from (BX), including front contact 68 of relay 2RK, front contacts 69 of relay 2GK, back contact 251 of relay 2YK, lamp 2YE, normally closed contact 272 of the push button 2GPB, and front contact 273 of relay 2GK, to (NX). Thus, it is provided that the yellow lamp 2YE is steadily energized at station A for the second flight altitude and the lamp 2YE at station B is energized with flashing energy to indicate the desire of the airways controller to transfer authority to the approach controller at station B for the particular airplane flight for which reservation has been made.

It will be readily apparent that restoration at the end of the communication cycle is accomplished in a manner comparable to that which has been heretofore described specifically when considering a cycle of operation involving the communication of a reservation designated by actuation of the green push button 2GPB.

Having observed the flashing yellow light at the tower station B, the controller at that station has been advised that an airplane flight has been assigned to the second flight altitude by a controller at station A, and that authority for the flight is to be transferred to the controller at station B for governing the landing of the airplane at the tower station. Thus, the controller at station B proceeds to contact the airplane and inform the pilot that station B has taken over authority for his flight so as to govern his approach to the airport at station B. Subsequent to this contact with the airplane which has been called for by viewing the flashing yellow lamp 2YE on the approach controller's board, the approach controller then proceeds to designate by the actuation of the green button 2GPB on his board that contact has been made with the airplane and that he has taken over authority for the flight.

The actuation of this button is effective to extinguish the flashing yellow lamp 2YE on the approach controller's panel 21 (at station B) and steadily energize the green lamp 2GE for the second flight altitude on that panel. This designation is effective at the airways station A to extinguish the yellow lamp 2YE which has been described as being steadily energized on the board 21 at that station, and to provide for the steady energization of the red lamp 2RE on panel 21 at station A as an indication that a reservation has been designated at the approach control station B for an airplane flight to be maintained under the authority of the approach controller at station B.

To consider more specifically the circuit means provided for accomplishing the above described mode of operation, it will be assumed that under the conditions that have been described wherein a steady yellow aspect has been provided for the second flight altitude at station A and a flashing yellow aspect has been provided for the second flight altitude at station B, that the airplane assigned to the second flight altitude has been contacted as has been described and thus the controller at station B actuates his green push button 2GPB (see Fig. 6).

The actuation of this push button 2GPB closes a circuit for the lower winding of the relay 2GR, such circuit extending through the filament of the lamp 2YE at station B to check the integrity of this lamp. This check is made so as to insure that the controller at station B is aware of the fact that an airplane has been assigned to that flight altitude as compared to false information that might be provided by the lamp 2YE being burned out. In other words, it is provided that upon designation of a reservation for any particular flight altitude the integrity of an indicator lamp which should be illuminated at that time is checked, and thus if the lamp that should be illuminated is burned out, the control that has been designated is not obtained and in that manner attention is called to the controller of a failure in the apparatus belonging to that particular flight altitude. This condition, and the manner in which a check may be readily made on the integrity of all of the lamp circuits to see if they are burned out will be hereinafter more specifically considered.

The circuit by which the relay 2GR (see Fig. 6) is energized under the above described conditions extends from (+), including back contact 274 of relay RC, front contact 275 of relay ST, back contact 276 of relay SC, back contact 277 of relay 6V, back contact 277a of relay CN, front contact 196 of relay 2RK, back contact 208 of relay 2GK, front contact 209 of relay 2YK, lamp 2YE, contact 210 of push button 2GPB in its depressed position, front contact 273 of relay 1RK, and lower winding of relay 2GR, to (—). In accordance with the picking up of this relay, a communication cycle is initiated, and this relay 2GR is maintained picked up throughout the cycle by a stick circuit comparable to that which has been described for the corresponding relay 2GR (see Fig. 5) at station A under the conditions involving a reservation designation at that station.

In accordance with the transmission of the reservation control under the above described conditions from station B to station A, with reference to Fig. 10, the code "space-space-space-mark-space" is transmitted. The reception of this code at station A causes the picking up of the relay 4M corresponding to the mark as the fourth character of this code, and upon the picking up of the relay SC (see Fig. 5) at station A at the end of the first half of the communication cycle, an execution circuit is closed which is effective to energize the magnetic stick relays 2GK, 2YK and 2RK at station A with a polarity to actuate their contacts to their dropped away positions.

Relay 2RK is knocked down by the execution circuit extending from (+), including front contact 243 of relay SC, back contact 244 of relay 1M, back contact 245 of relay 5M, front contact 279 of relay 4M, back contact 280 of relay 3M, back contact 281 of relay 2M, wire 2C, back contact 282 of relay 2GR, back contact 283 of relay 2YR, back contact 284 of relay 2YK, front contact 285 of relay 2RK, and lower winding of relay 2RK, to (—). The energization of this circuit causes the relay 2RK to actuate its contacts to their dropped away positions and thus open the circuit that has been described at front contact 285. Immediately upon closure of back contact 285 energy feeds through the contact selections of the execution circuit as they have been described and through back contact 285 of relay 2RK, front contact 286 of relay 2GK, and lower winding of relay 2GK, to (—). The energization of relay 2GK with this polarity causes that relay to actuate its contacts to their dropped away positions and thus open the restoration circuit for that relay at front contact 286. With the relays 2GK, 2YK and 2RK all in their dropped away positions, the red lamp 2RE is steadily energized by a circuit extending from (BX), including back contact 68 of relay 2RK, and lamp 2RE, to (NX).

The relay CK checks that the relays 2GK and 2RK have been actuated to their dropped away positions in accordance with the particular code that has been received by its pick up circuit which extends from (+), including front contact 243 of relay SC, back contact 244 of relay 1M, back contact 245 of relay 5M, front contact 279 of relay 4M, back contacts 280 and 281 of relays 3M and 2M respectively, wire 2C, back contacts 282 and 283 of relays 2GR and 2YR respectively, back contact 284 of relay 2YK, back contact 285 of relay 2RK, back contact 286 of relay 2GK, back contact 287 of relay 2YK, back contact 288 of relay 2GR, back contact 271 of relay 2YR, rectifier unit 271a, and lower winding of relay CK, to (—). This relay when picked up is maintained picked up until the end of the communication cycle by a stick circuit which has been described for the corresponding relay CK at station B (see Fig. 6).

Thus in accordance with the relay CK having been picked up at station A, the answer back code is transmitted during the second half of the communication cycle from station A to station B, and the reception of this code at station B provides for the picking up of the relay 4M at that station. The picking up of the last step relay 6V at the end of the communication cycle under consideration closes an execution circuit for the energization of the relays 2GK and 2YK. Relay 2YK at station B has already been considered as being picked up at this time, so the relay 2GK is the only relay that actually changes in its position. The circuit for the energization of relay 2GK extends from (+), including front contact 217 of relay 6V, front contact 218 of relay PBP, back contact 185 of relay SC, back contact 186 of relay IM, back contact 187 of relay 5M, front contact 197 of relay 4M, back contact 198 of relay 3M, back contact 199 of relay 2M, back contact of relay 200 of relay 2YR, front contact 201 of relay 2GR, and upper winding of relay 2GK, to (—). This relay when picked up de-energizes the circuit that has been described for the energization of the yellow lamp 2YE by opening its circuit at back contact 208, and a circuit is established for the steady energization of the green lamp 2GE extending from (BX), including front contact 196 of relay 2RK, front contact 208 of relay 2GK, front contact 289 of relay 2YK, and lamp 2GE and normally closed contact 290 of push button 2YPB, to (NX).

Cancellation

Having considered specifically how reservations are made, and how transfer of authority indications are set up, consideration will now be given as to the mode of operation of the system in the communication of a typical cancellation control. In general, it is provided that cancellation for a flight altitude that has been reserved can be made only by the particular station which has made the reservation. In other words, a reservation that has been made by the controller at station A cannot be cancelled by the controller at station B. If there has been transfer of authority, however, by the specific mode of operation that has been considered, even though the controller at station A was the one to originally designate the reservation, the controller at station B in taking over authority for the flight had actually designated the fact that he has taken over the flight by actuation of the green push button GPB for the flight altitude involved, and thus authority for the reservation had been transferred from the controller at station A to the controller at station B. Under these conditions, the reservation has been transferred to the authority of the controller at station B, and thus it is this controller and this controller only that has authority to cancel reservation for that flight altitude.

To consider specifically the mode of operation of the system for a cancellation control, it will be assumed that the controller at station B has taken over authority for an airplane flight at the second flight altitude and thus has the green lamp 2GE (see Fig. 6) illuminated on his board, and the red lamp 2RE (see Fig. 5) has been illuminated on the board at station A. After the airplane has reported leaving this second flight altitude such as in landing at the airport, the controller at station B can designate a cancellation for the second flight altitude by actuation of the push button 2RPB on his panel 21 (see Figs. 2 and 6). Assuming the communication system is at rest at the time when this button is actuated, the relays 2GR and 2YR are both picked up at station B through respective contacts 291 and 292 of the push button 2RPB in its depressed position, front contact 293 of relay 2GK, front contact 196 of relay 2RK, back contact 277a of relay CN, back contact 277 of relay 6V, back contact 276 of relay SC, front contact 275 of relay ST, back contact 274 of relay RC. By the inclusion of front contact 293 of relay 2GK in this circuit, it is provided that there can be no cycle of operation initiated for transmission of a cancellation control unless the control is valid. In other words, it has been pointed out that cancellation can be rendered effective only by designation at the station having last made the reservation; and thus the relay GK for the flight altitude involved would be picked up under these conditions for governing the energization of the green lamp GE. Therefore it is a requisite for the initiation of a cycle of operation for transmission of a cancellation control that the relay GK for the altitude involved be picked up, otherwise, the cycle of operation cannot be initiated.

Relays 2GR and 2YR in picking up cause the picking up of the relay PBP (see Fig. 7B) upon the closure of front contact 74 of relay 2GR and front contact 294 of relay 2YR so that the relay PBP is picked up to initiate a communication cycle in the same manner as has been heretofore described for the initiation of a cycle of operation for the communication of a reservation control. This relay PBP when picked up provides stick circuit energization for the relays 2GR and 2YR (see Fig. 6) through its front contact 295 in a manner comparable to that which has been heretofore specifically described for corresponding relays at station A (see Fig. 5).

When considering specifically the means provided in the control of the relays OM and EM, it has been pointed out that the joint energization of relays 2GR and 2YR is effective to cause the transmission from station B to station A of a cancellation code comprising the characters "space-space-space-mark-mark" as is called for in chart of transmission codes illustrated in Fig. 10.

In accordance with the reception of this code during the first part of the cancellation communication cycle at station A, the relays 4M and 5M (see Fig. 7C) are picked up, and thus upon the picking up of the relay SC (see Fig. 7A) at the end of the first half of the communication cycle as has been heretofore described, an execution circuit (see Fig. 5) is closed for the energization of the relay 2RK with a polarity to actuate the contacts of this relay to their picked up positions. This execution circuit extends from (+), including front contact 243 of relay SC, back contact 244 of relay IM, front contacts 245 and 246 of relays 5M and 4M respectively, back contacts 247 and 248 of relays 3M and 2M respectively, wire 2G, back contacts 249 and 250 of relays 2YR and 2GR respectively, back contact 270 of relay 2GK, upper winding of relay 2RK, and rectifier unit 270a, to (—).

When the relay 2RK is restored to its picked up position as has been described, the opening of its back contact 68 extinguishes the red lamp 2RE which has been energized for the second flight altitude under the assumed conditions. The relay CK checks that the relay 2RK has been picked up in accordance with the cancellation code that has been received, and this is in accordance with the energization of a correspondence check circuit which is closed upon the picking up of relay 2RK and extends from (+), including front contact 243 of relay SC, back contact 244 of relay IM, front contacts 245 and 246 of relays 4M and 5M respectively, back contacts 247 and 248 of relays 3M and 2M respectively, wire 2G, back contacts 249 and 250 of relays 2YR and 2GR respectively, back contact 270 of relay 2GK, front contact 296 of relay 2RK, back contact 287 of relay 2YK, back contacts 288 and 271 of relays 2GR and 2YR, rectifier unit 271a, and lower winding of relay CK, to (—).

After checking the response to the relay 2RK at station A with the cancellation code that is received during the first half of the communication cycle, the apparatus at station A is conditioned for the transmission of an answer back code comprising the characters "space-space-space-mark-mark," such answer back code being transmitted by a mode of operation comparable to that which has been heretofore described for answer back transmission, the marks of the code being transmitted as selected by the relays 4M and 5M at station A, and due to the relay CK being picked up, to indicate that execution of the code received during the first half of the cycle has been properly made.

With reference to Fig. 6, the reception of the answer back code at station B causes the picking up of the relays 4M and 5M at that station and thus upon completion of the reception of the code, and the picking up of the last step relay 6V, an execution circuit is closed to energize the relays 2YK and 2GK with a polarity to actuate their contacts to knocked down, or dropped away, positions. The execution circuit is closed for the lower winding of relay 2GK upon the picking up of relay 6V, extending from (+), including front contact 217 of relay 6V, front contact 218 of relay PBP, back contact 185 of relay SC, back contact 186 of relay 1M, front contacts 187 and 188 of relays 5M and 4M respectively, back contacts 189 and 190 of relays 3M and 2M respectively, wire 2C, front contacts 191 and 297 of relays 2GR and 2YR, respectively, front contact 213 of relay 2GK and lower winding of relay 2GK, to (—). The energization of relay 2GK by this circuit causes the contacts of that relay to be actuated to their dropped away positions and thus opens the circuit that has been described at front contact 213. The closure of back contact 213 connects the execution circuit through a front contact 214 of relay 2YK to the lower winding of that relay and thus causes the contacts of the relay 2YK to be actuated to their dropped away positions. It will be noted that relay CK is not picked up during the execution period because its circuit is held open at back contacts 215 and 216 of relays 2GR and 2YR which are maintained picked up during the execution portion of the last half of the communication cycle under consideration. The dropping away of the relays 2YK and 2GK opens the circuit that has been described for the energization of the green lamp 2GE at station B at front contacts 289 and 208 of relays 2YK and 2GK, respectively, thus causing the extinguishing of the green lamp for the second flight altitude to complete the cancellation of the reservation for this flight altitude.

Having thus considered specifically the mode of operation during a communication cycle of operation for the cancellation of a specific reservation for a particular flight altitude, it should be readily apparent that a similar mode of operation is effective for the cancellation of any other reservation for any other flight altitude.

*Correspondence check of answer back code*

From the mode of operation of the typical cycles of operation that have been heretofore considered, it will be readily apparent that unless the answer back code is received at the station at which a reservation, transfer of authority, or cancellation control has been designated, there can be no energization, or deenergization, of an indicator lamp at the station at which the control has been designated. The nature of the organization is such that if a reservation control has been designated, only the relay GR for the corresponding flight altitude is picked up at the station at which the control has been designated, and because of a relay GR being required to be picked up for the energization of a green lamp for the corresponding flight altitude, it will be readily apparent that if the answer back code received were out of correspondence with the code originally transmitted, there could be no energization of a green lamp GE for any other flight altitude because each of the other flight altitudes would have its control relay GR in its deenergized position. Thus, under these conditions, the reception of a wrong answer back code, if permitted to be executed, could do no more than to energize a red lamp RE for a flight altitude other than the flight altitude for which the reservation had been designated. This obviously would not set up a dangerous condition, but if the red lamp erroneously energized were not readily recognized by the controller at that station, it could unnecessarily tie up a flight altitude so that it would not be used until some subsequent time when it would be obvious that the particular red lamp involved had been erroneously energized.

It has been provided, however, by means of the specific nature of the control for the push button repeater relay PBP at each station, that rather than permit a wrong answer back code to be executed at the end of an answer back transmission, execution of the code is prevented, and thus there can be no red lamps energized for other flight altitudes as would be possible under the conditions heretofore described. It is therefore provided by the relay PBP that each character of the answer back code is checked at the time of its reception with the character that had been selected for transmission during the first part of the communication cycle, and in this way, the respective code characters are checked and the communication cycle is terminated without the code being executed in case any character of the answer back code does not check so that any code received during the answer back portion of the cycle which does not check with the code transmitted is rejected, and cannot cause the energization of any indicator lamp on the control panel at the station receiving the answer back code.

To consider more specifically the circuit structure provided to effect the above described mode of operation, it will be assumed that a communication cycle which has been heretofore typically considered is transmitted wherein a reservation is designated at station A for the second flight altitude. When the answer back code is transmitted during this cycle of operation in a manner which has been heretofore described, the relays OM and EM at the station A which is receiving the answer back code are actuated in accordance with the code which has been selected for transmission during the first part of the cycle by the energization of the same circuits that have been heretofore described as being effective to govern the energization of these relays so as to effect transmission of the code "space-space-space-mark-mark." Therefore, with reference to the sequence chart of Figs. 14A and 14B, it will be noted that the relays OM and EM are picked up at station A during the second half of the cycle under conditions corresponding to that wherein these relays have been specifically considered as being picked up during the first half of the cycle at that station.

Considering now the circuits for the control of the push button repeater relay PBP (see Fig. 7B), it will be noted that this relay when picked up upon initiation of the cycle as has been heretofore described, is maintained steadily energized during the first half of the cycle by a stick circuit including front contact 298 of relay SM, front contact 261 of relay PBP, and lower winding of relay PBP. This stick circuit is maintained closed until the dropping away of the relay SM at the end of the first half of the communication cycle at station A, which takes place subsequent to the energization of the oscillator CT at that station, and subsequent to the actuation of that oscillator to close its left-hand contacts for the last time during the first half of the cycle. Thus, the oscillator CT at station A has its left-hand contact fingers 41 and 45 maintained steadily closed as long as energy is applied to the electromagnet of that oscillator; and in accordance with the closure of these left-hand contact fingers 41 and 45, the upper winding of the push button repeater relay PBP is energized by a stick circuit which is closed prior to the dropping away of the relay SM. This stick circuit for the upper winding of relay PBP extends from (+), including left-hand contact fingers 41 and 45 of oscillator CT (see Fig. 7C), wire 61, back contact 258 of relay CN (see Fig. 7B), back contacts 299, 300, 301, 302 and 303 of relays 1V, 2V, 3V, 4V and 5V, respectively, front contact 304 of relay PBP, front contact 257 of relay RC, and upper winding of relay PBP, to (—). This stick circuit is maintained closed until the oscillator CT at station A is deenergized at the beginning of the second half of the communication cycle and until the pendulum of the oscillator subsequently swings through its center position so as to open the left-hand contact fingers 41 and 45 (see Fig. 7C) and thus deenergize the stick circuit that has just been described for the upper winding of the relay PBP at station A.

At the time of the deenergization of the upper winding of the relay PBP as has been described, however, stick circuit energization is provided for the lower winding by a circuit extending from (+), including back contacts 259, 305, 306, 307, 308 and 309 of relays 6V, 5V, 4V, 3V, 2V and 1V, respectively, front contact 260 of relay RC, front contact 261 of relay PBP, and lower winding of relay PBP, to (—).

Immediately upon the opening of the left-hand contact fingers 41 and 45 of the oscillator CT (see Fig. 7C) at station A under the above described conditions to deenergize the stick circuit for the upper winding of relay PBP, the right-hand contact fingers 44 and 48 are closed, but the closure of these fingers cannot apply energy directly to the stick circuit for the upper winding of relay PBP because it is required that the relay 1V be picked up first to close its front contact 299 (see Fig. 7B). In considering the mode of operation of the stepping relays 1V to 6V inclusive, it has been pointed out that the odd numbered stepping relays are picked up in response to the closure of the right-hand contact fingers for respective oscillations of the oscillator CT, and that the even numbered stepper relays are picked up upon the closure of the left-hand contact fingers of the oscillator CT during its respective oscillations. Thus, when the pendulum of the oscillator CT at station A swings through its center position for its initial cycle of operation during the last half of the communication cycle, immediately upon the opening of the left-hand contact fingers 41 and 45, the right-hand contact fingers 44 and 48 are closed, and the closure of these fingers provides a pick up circuit for the first stepper relay 1V. The upper winding of the relay PBP is thus deenergized during the pick up time of the relay 1V because it is required that the front contact 299 of relay 1V (see Fig. 7B) be closed as a requisite for the energization of the upper winding of relay PBP through the right-hand contact fingers 44 and 48 of the oscillator CT.

During the time that is required for the magnetic flux in the relay 1V to build up to a point where the armature of that relay is actuated, the stick circuit that has been described for the lower winding of relay PBP is maintained closed, and thus the relay PBP is maintained picked up, and when the contacts of the stepper relay 1V are actually shifted in response to the flux building up in the magnetic structure of that relay, the stick circuit that has been described for the lower winding of relay PBP is opened at back contact 309 of relay 1V, but a new stick circuit is established for the upper winding of that relay upon the shifting of contact 299 of relay 1V. The circuit through front contact 299 of relay 1V extends from (+), including right-hand contact fingers 44 and 48 of oscillator CT (see Fig. 7C), wire 99, front contact 299 of relay 1V, back contacts 300, 301, 302 and 303 of relays 2V, 3V, 4V and 5V, respectively, front contact 304 of relay PBP, front contact 257 of relay RC, and upper winding of relay PBP, to (—). It will be noted that momentarily both stick circuits for the relay PBP are simultaneously opened for the crossover time of the contacts of the stepper relay 1V. In other words, according to the normal adjustment of the contact fingers of the stepper relays, the stick circuit for the lower winding of relay PBP is opened at back contact 309 just prior to the closure of the front contact 299 of relay 1V, unless make before break contact adjustment for these contacts is provided. It will be readily apparent that such make before break contact adjustment can be employed if such is the requirements of practice, but the crossover time involved for most relays of the character suitable for use as the stepper relays V is less than 10 per cent of the pick up time of the relay, and thus if the pick up time of the relay is 25 milliseconds, the crossover time of the contacts when the armature of the relay is actually actuated to its picked up position may be approximately 2 milliseconds. This crossover time is so slight that the relay PBP could tolerate the 2 milliseconds time interruption of its energization without being dropped away in most cases, but to insure that it will be maintained picked up for this crossover time, the resistor 310 is shunted across the lower winding of the relay as an indication that the relay PBP is preferably adjusted to have sufficiently slow dropping away characteristics to insure that it will be maintained picked up during the crossover time of the stepper contacts as has been described. Thus, the resistor 310 is of such a value as to delay the dropping away of the relay PBP under the conditions that have been considered, only to an extent comparable to the crossover time of the contacts of the stepper relays, and if it is found desirable in practice to adjust the contacts of the stepper relays in a make before break manner, obviously this resistor 310 would not be required.

From the above described mode of operation of the relay PBP it will readily apparent that the upper winding of that relay is maintained energized continuously at station A under the assumed conditions except for the pick up times of the respective stepper relays V, the interruption in its energization occurring whenever the oscillator CT shifts through center because each time this oscillator shifts through its center position, one pair of contact fingers is opened and the other pair of contact fingers is closed. Therefore, inasmuch as the stick circuit for the upper winding of relay PBP is dependent upon the closure of the right-hand contact fingers 44 and 48 through front contacts of the odd numbered stepper relays V as the stepping progresses, and energy is provided by the left-hand contact fingers 41 and 45 of the oscillator CT only when the front contact fingers of the even numbered contact fingers of the stepper relay V are closed the upper winding of relay PBP is successively energized and deenergized as the stepping progresses it being energized upon the picking up of each stepper relay and deenergizd upon the shifting of the oscillator through its center position.

The first character of the answer back code is received during the first closure of the right-hand contact fingers of the oscillator CT at station A, and in accordance with this code character being a space for the typical cycle of operation which has been considered, the relay OM at station A is in its dropped away position at this time, and there is no energization of the line relay L at station A, so therefore the pick up circuit for the message decoding relay 1M (see Fig. 7C) is opened at front contact 178 of relay L. Therefore the relays 1M and OM are in their dropped away positions during the reception of the first character of the code, if the character is a space, in correspondence with the character originally called for by the code selections set up by the push button repeater relay GR in the circuits for the relays OM and EM.

To check this correspondence condition between the relays OM and 1M, the lower winding of the relay PBP is energized upon the picking up of the relay 1V by a stick circuit extending from (+), including back contacts 259, 305, 306, 307 and 308 of relays 6V, 5V, 4V, 3V and 2V, respectively, front contact 309 of relay 1V, back contact 311 of relay 1M, back contact 312 of relay OM, front contact 260 of relay RC, front contact 261 of relay PBP, and lower winding of relay PBP, to (—). Thus, this stick circuit is maintained energized subsequent to the opening of the stick circuit for the upper winding of relay PBP as the oscillator CT at station A shifts through its center position to open its right-hand contacts fingers 44 and 48 (see Fig. 7C) and close its left-hand contact fingers 41 and 45. If the code received should not check with the code called for by the line circuit being energized for the first character so that the relay 1M would be picked up during the reception of the first character of the answer back code while the relay OM would be deenergized, the correspondence check circuit that has been described would be opened at back contact 311 of relay 1M, so that the lower winding of relay PBP would be deenergized at the time when the oscillator CT at station A would shift through its center position and thus cause deenergization of both windings of that relay for the period of time required to pick up the second step relay 2V.

The relay PBP is a relatively quick acting relay which will drop away in less than the pick up time of the stepper relays 1V, minus the crossover time of the contacts of those relays, and therefore if there should be an out of correspondence condition existing as has been considered, the relay PBP would have time to drop away before the picking up of the relay 2V to establish stick circuit energization of the upper winding of relay PBP by closure of front contact 300, irrespective of the slight slow drop away characteristics effected by the resistor 310 shunted across the lower winding of the relay PBP. To consider, for example, a typical condition of the relative timing of the operations of the relays involved under these conditions, the pick up time of the stepper relays may be 25 milliseconds, the crossover time of the contacts of the stepper relays may be 2 milliseconds, and the drop-away time of the relay PBP, including the slow action provided by the resistor 310 can be 10 milliseconds, thus insuring that where an out of correspondence condition exists, the relay PBP will have plenty of time to drop away during the time of pick up of a stepper relay, prior to the actual picking up of the stepper relay involved. In other words, the drop away time of the relay PBP is measured against the pick up time of the stepper relay, and if the pick up time of the stepper relays is substantially twice the drop away time of the relay PBP, the relay PBP will be certain to have time to drop away upon checking an out of correspondence condition prior to the picking up of the next step relay V.

To consider the manner in which the second character of the code is checked, because of this character also being a space, the relay EM at station A is deenergized at the time for the reception of this second character, and because of the line relay L at station A being in its deenergized position at the time of reception of the second character, the relay 2M remains dropped away and thus the correspondence check is to see that the relay 2M (in its deenergized position) is in correspondence with the relay EM (deenergized) at this time. If there is correspondence, the lower winding of relay PBP is energized at this time when the upper winding is deenergized during the interval in which the relay 3V is being picked up. The stick circuit for the lower winding of relay PBP under these conditions extends from (+), including back contacts 259, 305, 306 and 307 of relay 6V, 5V, 4V and 3V, respectively, front contact 308 of relay 2V, back contact 313 of relay 2M, back contact 314 of relay EM, front contact 260 of relay RC, front contact 261 of relay PBP, and lower winding of relay PBP, to (—). If there were not correspondence between the relays 2M and EM in this circuit, obviously the lower winding of the relay PBP would be deenergized for the interval corresponding to the pick up time of the stepper relay 3V so that the relay PBP would be dropped away.

Inasmuch as the third character of the code is also a space, a correspondence check is made in a manner similar to that which has been described for the check of the first character of the code wherein the back contact 315 of relay 3M is checked in correspondence with the back contact 312 of relay OM during the pick up time of the fourth step relay 4V. It is thus provided that the relay PBP is dropped away upon the reception of the third character in case this character is not a space as has been predetermined by the code selected in the control of the relay OM.

Because of the fourth character of the answer back code being required to be a mark to correspond with the relay EM being picked up at the time of reception of the character, the correspondence check upon reception of the fourth character is through front contact 316 of relay 4M in correspondence with front contact 314 of relay EM. This is the condition under which the lower winding of the relay PBP is maintained energized to cover the pick up time of the stepper relay 5V, and if for some reason the message decoding relay 4M were not picked up during this period of the code, there would be lack of correspondence between the contact 316 of relay 4M, and the contact 314 of relay EM, and therefore the relay PBP would be dropped away during the pick up time of the stepper relay 5V.

Upon reception of the fifth character of the code, which is considered to be a mark, the relay 5M is picked up, and correspondence is checked in the stick circuit for the lower winding of relay PBP between front contact 317 of relay 5M, and front contact 312 of relay OM. If for some reason relay 5M should not be picked up in correspondence with the relay OM, the relay PBP would be dropped away during the picking up of the last step relay 6V. When the relay 6V is picked up, the relay PBP is maintained picked up for the execution period, assuming that the stick circuits have been properly closed for correspondence for each of the respective characters, by the energization of a circuit including, front contact 259 of relay 6V, front contact 266 of relay RC, and front contact 261 of relay PBP. When considering the mode of operating during clear out at the end of a cycle, it has been pointed out that it is the dropping away of the relay RC that causes the dropping away of relay PBP by opening front contact 260, the circuit for the upper winding being open at back contact 258 of relay CN.

From the above described mode of operation of the relay PBP, it has been pointed out that this relay is dropped away during the reception of any code character which does not correspond with the code characters originally selected for transmission during the first half of the cycle, and by being dropped away under these conditions it cannot again be picked up during lhe cycle because of its pick up circuit being open at back contact 75 of relay RC until after the relay 6V is picked up to open back contact 72 and thus prevent the closure of the pick up circuit until the particular push button repeater relays GR or YR for the flight altitude have been dropped away at the end of the cycle to maintain the pick up circuit for the relay PBP open. It is thus provided that if the relay PBP is dropped away because of an out of correspondence condition of any code character in the answer back code, it is dropped away prior to the execution period at the completion of reception of the code, and thus, with reference to Fig. 5, the opening of front contact 242 of relay PBP at station A prevents an execution at the end of the cycle to change the positions of the indications control relays GK, YK and RK at that station for any flight altitude.

Simultaneous starts

If it is considered that at a time when the system is at rest, controllers at both stations A and B initiate the transmission of a control by actuation of a push button at exactly the same time, it is possible that both stations A and B will simultaneously enter cycles of operation for the transmission of their respective controls. If both stations are transmitting under these conditions, the relay SM are picked up at both stations, and with reference to the line circuit of Fig. 4, under these conditions, the relays L at both stations remain steadily deenergized so that as far as the respective stations are concerned, the code communicated is formed of all spaces, which code is not employed in the system for governing the energization of any indicator lamp. Thus, during time of execution, no execution circuit is closed, and thus no erroneous control can result.

It will be readily apparent from the line circuit of Fig. 4 that, under these conditions, wherein the relays SM are picked up at both stations contemporaneously, if the line circuit is closed by both stations for the transmission of a code character at the same time, there is a short circuit across the line battery LB, and obviously the line battery LB includes such resistance as is required to prevent damage to the line circuit control equipment by reason of being overloaded under these conditions. If a conventional primary or storage battery is employed as the battery LB, an external limiting resistor (not shown) may be used in series with such battery LB to prevent excessive energization of the line circuit under the specific abnormal condition which has been considered. If the source of energy is electronic, the regulation obtained by the electronic apparatus may be such to sufficiently limit the flow of current.

The picking up of relay RC (see Fig. 7A) at the end of the first half of the communication cycle at each station would cause restoration under the above described conditions of the stepper relays and condition its associated station for reception of an answer back code the same as if only one station were transmitting. Inasmuch as each station would be conditioned to receive the answer back code, and neither station conditioned to transmit the answer back code, there would be no relay SM picked up at either station for the last half of the cycle and therefore there would be no initiation of the second half of the cycle, as the oscillators at both stations would be maintained steadily energized through the same circuit which is steadily energized when the system is at rest.

Therefore when the relays SM are dropped away at both stations at the end of the first half of the cycle wherein it is assumed that both stations have transmitted, the line circuit becomes steadily energized, and its energization causes the dropping away of the last step relay 6V at the respective stations. That is, with reference to Fig. 7C, the picking up the line relay L at each station, by opening back contact 122 removes stick circuit energy for the relay 6V at that station, the relay CDS having been dropped away in response to the picking up of the relay RC at that station, and the relay CN being in its dropped away position.

Upon the dropping away of the first step relay 1V, prior to the dropping away of the last step relay 6V, the relay ST (see Fig. 7B at each station has been picked up by the energization of a circuit which has been described, and thus a circuit is conditioned for energization upon the dropping away of the last step relay 6V for the lower winding of the relay EM. With reference to Fig. 8, the relay EM at station A has its lower winding energized under these conditions by a circuit extending from (+), including back contact 351 of relay 6V, back contact 352 of relay CN, front contact 353 of relay ST, front contact 354 of relay RC, front contact 355 of relay PBP, lower winding of relay EM, back contact 158 of relay CK, and back contact 160 of relay SC, to (—). When relay EM is picked up, a stick circuit is closed at front contact 356 to shunt front contact 354 of relay RC out of the circuit that has just been described. In a similar manner, the relay EM is picked up at station B (see Fig. 9).

Upon the dropping away of the last step relays 6V at both stations, the circuits are opened for the relays RC (see Fig. 7A) at these respective stations by the opening of front contact 129, the stick circuits for these relays RC being opened at this time because of the right-hand contacts of the oscillators CT at the associated stations being open. Thus, the dropping away of the relays RC at both stations is effected, and this drop away is made slow by reason of the condenser 357 being shunted across the upper winding of each relay RC through a resistor 358, the condenser 357 and the resistor 358 being connected in series with the front contact 130 of relay RC, and with back contact 131 of relay CN.

Energization of the relay EM and deenergization of the relay RC at a transmitting station is effective as has just been described for each cycle transmitted, but before the relay RC has time to be dropped away at the midpoint in a cycle under normal transmission, the dropping away of the last step relay 6A at the receiving station (rendered effective by the energization of the line circuit) is effective to pick up the relay SM at the receiving station. This circuit extends from (+), including contact fingers 41 and 45 of oscillator CT (see Fig. 7C) at the receiving station, wire 61, back contact 91 of relay 6V (see Fig. 7A, wire 359, back contact 360 of relay 1V, back contact 361 of relay RC, front contact 88 of relay SC, back contact 89 of relay CN, and lower winding of relay SM, to (—). The closure of the stick contact 90 applies energy directly to this lower winding so as to maintain the relay SM at the receiving station picked up until the upper winding is energized with reversed polarity at the end of the cycle.

If both stations have been conditioned as transmitting stations as has been described, however, the relay SM can be picked up at neither station because of their being no relay SC picked up to condition either station as a receiver for the last half of the cycle. Therefore, there is a failure of the last half of the cycle to be initiated and the relay RC times out so as to be dropped away.

The dropping away of the relay RC at each station, causes the dropping away of the push button repeater relay PBP at that station by opening stick circuits for its respective upper and lower windings at front contacts 257 and 260 (see Fig. 7B) respectively. The relay PBP in dropping away at station A opens the stick circuit for relay GR or YR (see Fig. 5) that has been picked up by the opening of front contact 76, and similarly at station B, the stick circuits for the push button repeater relays GR and YR are opened at front contact 295 (see Fig. 6) by the dropping away of the relay PBP at station B.

Because of the inclusion of back contact 72a of relay EM (see Fig. 7B) in the pick up circuit for the relay PBP at each station under the conditions considered, the closure of back contact 75 of relay RC cannot cause the picking up again of the relay PBP before the push button repeater relays GR and/or YR have time to be dropped away to further open the pick up circuit for the relay PBP at the associated station. It will be noted that the circuit for the energization of the lower winding of relay EM at each station under these conditions is opened by the dropping away of the push button repeater relay PBP at that station (contact 355 of Fig. 8), however, before this relay has time to be dropped away to close the back contact 72a (see Fig. 7B), the relays GR and/or YR are dropped away at that station to further open the pick up circuit for the associated push button repeater relay PBP so that it cannot again be picked up at this time. Therefore, complete restoration to normal conditions is accomplished for both stations subsequent to the simultaneous starts, without requiring manual cancellation. Obviously this restoration to normal is not completed by the dropping away of relays GR or YR if the buttons are still maintained in their depressed positions, but the above mode of operation will be repated through successive first half cycles until one of the controllers restores his push button to permit the other station to gain control.

*Garbled transmission*

The organization of the system is such that although a momentary interruption of the line circuit may set the apparatus into operation at the respective stations for the reception of a code, there is little possibility of the code transmitted under these conditions ever being executed. If the line interruption is of substantial length, such as being long enough to permit the completion of a half cycle of operation of the communication system, the code received will comprise all spaces, and therefore, inasmuch as the code comprising all spaces is not used, there will be no control executed. If, however, a receiving cycle is started by a line circuit interruption of short duration so as to cause the line circuit to be again closed before reception time has been completed for the fifth code character, the energization of the line relays L for the last half of the cycle will cause marks to be received, and therefore permit the reception of a code that could be executed, except that execution is prevented by reason of requiring an off period of substantial length to follow the five characters that are received in order that execution of these five characters may be made to govern indication control relays.

Thus, under the condition of momentary line circuit interruption being considered, the line circuit is energized prior to the completion of the stepping, and therefore subsequent to the picking up of the last step relay 6V at a station that is rendered active because of the line interruption, the relay CN (see Fig. 7A) at that station is picked up when the code oscillator CT closes its right-hand contacts for the fourth time. The circuit for the energization of the relay CN under these conditions extends from (+), including contact fingers 44 and 48 of oscillator CT (see Fig. 7C) in their right-hand positions, rectifier unit 107a, front contact 107 of relay 6V, wire 123, front contact 124 of relay L (see Fig. 7A), and winding of relay CN, to (—). The picking up of relay CN closes an obvious stick circuit at front contact 253 to maintain that relay energized until clear out of the communication system is effected. Because of the circuit for relay SC being open at back contacts 124 of relay L, the relay SC cannot be picked up to close its front contact 243 (see Fig. 5) at station A, for example, to execute controls under conditions where the line circuit is energized for a period during the cycle subsequent to the operation of the steppers, and before clear out for the first half of the cycle has been rendered effective. The picking up of the relay CN under these conditions is effective to cause restoration of the apparatus at the associated station which has been considered as being conditioned for reception of controls in a manner comparable to that which has been specifically described when considering the clear out at the end of the cycle for a station that has been receiving. That is, relay CDS is dropped away by the picking up of relay CN by the opening of back contacts 94 and 97, and the dropping away of this relay causes the dropping away of the stepper relays, except for the last step relay 6V which is held by front contact 122a of relay CN (see Fig. 7C). Upon the dropping of relay IV prior to the dropping of relay 6V, the relay ST is picked up, and the picking up of that relay, with the oscillator CT locked up with its left-hand contacts closed, closes a circuit for the energization of the lower winding of relay CN to cause the dropping away of that relay. This circuit extends from (+), including left-hand contact fingers 41 and 45 of oscillator CT (see Fig. 7C), wire 61, front contact 254 of relay ST (see Fig. 7A), back contact 255 of relay RC, front contact 256 of relay CN, and lower winding of relay CN, to (—). Thus, the relay CN is knocked down, and the dropping away of that relay removes stick energy from the last step relay 6V at front contact 122a (see Fig. 7C) to complete restoration after receiving during a half cycle of the communication system in which no control has been executed, as has been heretofore described.

*Alternate transmission*

The condition which has been considered with respect to simultaneous starts, is assuming that the simultaneous starts are initiated when the system is at rest, so that the apparatus at both stations becomes simultaneously initiated into a cycle of operation for the transmission of a designated control. The condition now to be considered is the condition where controls are manually designated at both stations A and B during the operation of a communication cycle which has been initiated at a prior time for transmission of a prior designated control from station A. Under these conditions, there is no condition of simultaneous start because of the communication system being already in operation, and the pick up circuits for the push button controlled relays GR and YR at the respective stations are opened because of the cycle being in progress. This is because, at station A, for example, one or the oher of the contacts 64, 65, 66, 67 or 67a (see Fig. 5) is open while the cycle of operation is in progress.

The consideration is therefore, if the buttons which have been actuated during a communication cycle are held down until the end of the cycle at both stations A and B, as to which station will be given priority to initiate the transmission of its designated control during the next cycle of operation of the communication system. From the standpoint of the desired mode of operation, it is preferable that arrangement is made for alternate transmission, in that a station that is the receiver for a communication cycle in operation when subsequent controls are designated has priority for the initiation of the next control cycle. Thus, it is provided that a station receiving during a communication cycle that is in progress has its circuits conditioned for the relays GR and YR for the respective flight altitudes at that station so that one of these relays can be picked up for the initiation of a subsequent cycle of operation in response to manual designation before the circuits are conditioned at the station that has been transmitting to permit the initiation of a second cycle of operation of the communication system. This priority of control is provided at the station A and B by the inclusion of a front contact 362 of relay CK (see Figs. 5 and 6) in multiple with a back contact of the last step relay 6V at these stations. Thus, it is provided that in order for a relay GR or YR to be picked up in response to manual designation at station A, for example, the front contact 362 of relay CK at that station, or the back contact 67 of relay 6V in series with back contact 67a of relay CN must be closed. According to the sequence chart of Figs. 14A and 14B, at the end of a typical cycle of communication, it is indicated that the check relay CK is maintained picked up throughout the last half of the communication cycle at the receiving station (station B) for the control being communicated, and rather than this relay CK being dropped away at the end of the cycle, it is maintained picked up by energization of a stick circuit which has been described, through front contact 127 of relay ST (see Fig. 6), until the initiation of the next cycle of operation of the communication system, during which the relay ST at station B is dropped away, irrespective of which station has designated a control for transmission during that cycle.

Considering specifically the start at station B under the above described conditions, it will be assumed that the cycle in progress is for the transmission of a control for a flight altitude other than the flight altitude 2 for which the circuits are more specifically illustrated, and it will be assumed that during the operation of the cycle, a controller at station B actuates the green push button 2GPB for designation of a reservation for the second flight altitude which is considered as being available at this time. In response to the actuation of this push button, the relay 2GR (see Fig. 6) at station B can be picked up upon the dropping of the relay SC during the clear out at the end of the cycle of communication in progress. The dropping away of the relay SC is illustrated in the sequence chart of Fig. 14B as being rendered effective by the shifting of the code oscillator CT at the station B to close its left-hand contacts for the last time during the cycle. It will be noted that the relay ST is illustrated in the sequence chart of Fig. 14B as being in its picked up position at this time, and the relay RC is in its deenergized position because it is not picked up at the receiving station during a cycle of operation.

Therefore, the relay 2GR (see Fig. 6) can become energized upon the dropping away of the relay SC during the clear out period at the end of the communication cycle at station B by the energization of a circuit extending from (+), including back contact 274 of relay RC, front contact 275 of relay ST, back contact 276 of relay SC, front contact 362 of relay CK, front contact 196 of relay 2RK, back contact 208 of relay 2GK, back contact 209 of relay 2YK, contact 363 of button 2GPB in its depressed position, front contact 278 of relay IRK, and lower winding of relay 2GR, to (—). The picking up of this relay is effective to cause the picking up of relay PBP (see Fig. 7B) in a manner which has been heretofore described when considering the initiation of a communication cycle. Upon the picking up of relay PBP at station B, a circuit is conditioned for the picking up of the relay SM at that station, but this relay SM cannot be picked up until the dropping away of the last step relay 6V to close back contact 87.

To consider for a moment the conditions at station A responsive to the actuation of a push button at that station during that same cycle of operation, it will be noted that by reason of there being no relay CK picked up at station A under these conditions, it is required that the back contact 67 of the last step relay 6V at station A (see Fig. 5) be closed, together with back contact 67a of relay CN in order for a control relay GR or YR to be picked up.

It will thus be seen, from the detailed consideration that has been given so far, that the push button controlled relay 2GR at station B has been picked up, and the push button repeater relay PBP has been subsequently picked up, all prior to the dropping away of the last step relay 6V; while at station A, the dropping away of the last step relay 6V is required to be effective before any relay can be picked up in response to the actuation of a push button for any given flight altitude. Inasmuch as the last step relay 6V at the respective stations A and B are dropped away substantially at the same time where there is no line propagation time considered, the dropping away of the relay 6V at the transmitting station (station A) being actually delayed with respect to the dropping away of the corresponding relay 6V at the receiving station (station B) by the drop away time of relay RC as is indicated in the sequence chart of Fig. 14B.

The station B, in order to initiate a cycle of operation and lock out transmission by station A must further be able to pick up its relay SM so as to open the line circuit and thereby cause the release successively of the line relay L at station A and the relay ST at that station. The pick up circuit for the relay SM at station B is closed upon the dropping away of the last step relay 6V. Thus, the closure of back contact 87 of relay 6V (see Fig. 7B) causes the picking up of relay SM at station B by the energization of a circuit which has been described. This relay is slow in picking up for reasons to be more readily apparent with respect to operation at station A. The picking up of relay SM at station B is effective by opening its back contacts 56 and 57 (see Fig. 4) to open the line circuit and thus cause the dropping away of the line relay L at station A. This line relay L at station A, dropping away, opens the stick circuit for relay ST at front contact 62 (see Fig. 7B) so that the relay ST at station A in turn becomes dropped away.

Considering now what can be accomplished at station A in attempting to establish that station as a transmitting station, it will be readily apparent that the dropping away of the last step relay 6V can be effective to provide for the energization of a relay GR or YR (see Fig. 5) for the particular flight altitude that is designated by the actuation of a push button at station A. The picking up of this relay requires the front contact 65 of relay ST to be closed, but, for the condition under consideration, this relay ST has not yet had time to be dropped away by reason of initiation of the cycle at station B. Therefore, the picking up of the relay GR or YR for the particular flight altitude for which a control is designated at station A becomes effective to pick up the relay PBP (see Fig. 7B) according to the general mode of operation that has been heretofore described for initiating the transmission of a control, and the relay PBP when picked up at station A closes a circuit for the relay SM at that station as the next step in initiation of transmission from station A. In other words, the apparatus at station A tends to follow the same sequence of operation as the apparatus at station B in attempting to initiate a cycle of operation, but because of the apparatus at station B being started ahead of the apparatus at station A by reason of the check relay CK being up at station B, the station B is sufficiently ahead in its operation to initiate a cycle to cause the dropping of the line relay at station A and the subsequent dropping away of the relay ST at that station in sufficient time so as to cause the relay PBP at station A to be dropped by the opening of front contact 74a (see Fig. 7B) so that the relay PBP at station A is dripped away before the slow pick up relay SM at that station has time to be picked up. The relay PBP at station A is dropped away under these conditions because both of its stick circuits are open at front contacts 257 and 260, respectively, of relay RC, and of course the relay SM at station A has not had time to be picked up to provide stick energy at front contact 298. Therefore, the relay SM is prevented from being picked up at station A, the relay PBP drops away, and the relay GR or YR that has been picked up in response to actuation of the push button at station A has its stick circuit opened at front contact 76 of relay PBP (see Fig. 5) so that this push button control relay is dropped away, if the associated push button is restored prior to the communication system becoming available for transmission from station A.

*Integrity of indicator lamps*

Conditions have been heretofore considered under which it may be desirable to actuate a green push button GPB for a particular flight altitude at a time when the yellow indicator lamp YE for that flight altitude is energized. This is a condition where it is desired to designate consummation of transfer of authority from the controller at the airways station A to the approach controller at station B.

If the yellow lamp YE should be burned out under the above described conditions, it will be readily understood that the controller at station B could consider that the associated flight altitude is not reserved, and misinterpret the clearance indication obtained upon actuation of a green push button GPB as indicating clearance that can be given for another airplane flight. Thus, it is provided that upon designation of the reservation by actuation of the push button GPB under the above described conditions for the flight altitude being considered, that the integrity of the yellow lamp YE for that flight altitude is checked in series with the winding of the associated green repeater relay GR. Thus, for the specific flight altitude illustrated in Fig. 6, for example, the yellow lamp 2YE has its filament checked in the energizing circuit for the relay 2GR. It is therefore provided that if the controller at station B actuates the push button 2GPB at a time when the yellow lamp 2YE should be illuminated but is burned out, there is no initiation of a communication cycle, because the relay 2GR cannot be picked up.

More specifically, at a time when the yellow lamp 2YE (see Fig. 6) is energized, the indication control relay 2YK is picked up, and relay 2GK is dropped away, or vice versa, dependent upon at which station a transfer of authority type of reservation has been designated. The actuation of the push button 2GPB, under conditions where the relay 2YK is picked up and relay 2GK is dropped away, closes a pick up circuit, for the energization of the lower winding of relay 2GR through the filament of lamp 2YE, extending from (+), including back contact 274 of relay RC, front contact 275 of relay ST, back contact 276 of relay SC, back contact 277 of relay 6V, back contact 277a of relay CN, front contact 196 of relay 2RK, back contact 208 of relay 2GK, front contact 289 of relay 2YK, lamp 2YE, contact 210 of push button 2GPB in its depressed position, front contact 278 of relay 1RK, and lower winding of relay 2GR, to (—). Thus, the energization of relay 2GR is dependent upon the integrity of the filament of the lamp 2YE, and no cycle of operation of the communication system is initiated under these conditions if the lamp 2YE is burned out.

It will be readily understood that a similar mode of operation is effective in case the lamp 2YE is conditioned for energization by the relay 2GK being picked up and the relay 2YK being dropped away. Under these conditions the relay 2GR is energized in response to the actuation of the push button 2GPB by a circuit extending from (+), including back contact 274 of relay RC, front contact 275 of relay ST, back contact 276 of relay SC, back contact 277 of relay 6V, back contact 277a of relay CN, front contact 196 of relay 2RK, front contact 208 of relay 2GK, back contact 289 of relay 2YK, lamp 2YE, contact 210 of push button 2GPB in its depressed position, front contact 278 of relay 1RK, and lower winding of relay 2GK, to (—).

In a similar manner the integrity of the lamp 2GE, for example, is check upon the actuation of the push button 2YPB for designation of a transfer of authority type of reservation to be set up for the energization of yellow lamps at the respective stations. It will thus be obvious that the relay 2YR cannot be picked up to initiate a cycle of operation of the communication system at a time when the magnetic stick indication control relays are conditioned for the energization of the green lamp 2GE, unless the filament of this lamp is intact. The circuit by which the relay 2YR must be picked up under these conditions extends from (+), including back contact 274 of relay RC, front contact 275 of relay ST, back contact 276 of relay SC, back contact 277 of relay 6V, back contact 277a of relay CN, front contact 196 of relay 2RK, front contact 208 of relay 2GK, front contact 289 of relay 2YK, lamp 2GE, contact 290 of button 2YPB, in its depressed position, and lower winding of relay 2YK, to (—). Thus, if the filament of the lamp 2GE is burned out, the relay 2YR is not picked up to initiate a communication cycle in response to the actuation of the push button 2YPB. Obviously the resistance of the winding of the relay 2YR is such as to prevent the illumination of the lamp 2GE because of pick up energy being applied through its filament.

The integrity of the red lamp RE for each flight altitude has no bearing upon the safety of the system in that it would be impossible to obtain a yellow or green clearance indication for a particular flight altitude that had been reserved at the other station, and thus should have energized a red lamp RE. In other words, the failure of a red lamp RE to indicate that a reservation has been made by the other station is merely a failure to indicate an interlock that is established to prevent obtaining a yellow or a green light for that flight altitude which has been reserved by a controller at the other station. More specifically, if the relay 2RK, for example (see Fig. 6), has been knocked down at station B for the second flight altitude in accordance with a reservation having been made for this flight altitude at station A, all pick up circuits for the relays 2GR and 2YR are opened at front contact 196 of relay 2RK to prevent the energization of these relays, and thus there is no need for checking the integrity of the red lamp 2RE.

If the communication system fails to start in response to the actuation of a push button for a given flight altitude, it may not be apparent to the controller that has actuated the button as to whether he fails to get control because of a burned out indicator lamp, or because there is a conflict with a condition that has been set up by circuit interlocking, or for some other reason. It is therefore desirable to provide each of the control boards with indicator lamp check control push button GEPB, YEPB and REPB (see Figs. 2 and 15) at the top of the panel 21 on each of the flight progress boards. These buttons are provided for checking the respective GE, YE and RE indicator lamps for all flight altitudes, and thus when either of these buttons is actuated, it provides for the energization at the same time of the associated green, yellow or red indicator lamps for all flight altitudes on the associated panel. By this organization, if the communication system fails to be initiated in response to the actuation of a push button for a particular flight altitude, the controller can readily check the integrity of the lamps which could interrupt his GR and YR control circuits by the actuation of these three respective filament check push buttons GEPB, YEPB and REPB. If upon actuation of these buttons, a certain lamp GE or YE fails to be energized for the flight altitude for which reservation has been designated, it becomes readily apparent that the failure of the system to start is because of the failure of that indicator lamp. If on the other hand, the check of the lamps for the associated flight altitude proves positive, then the controller knows that he must look to other reasons for his failure to have obtained a start of the communication system to transmit the control which he has designated.

With reference to Fig. 15, the circuits for the control of the relays GR and YR through their associated push buttons, and for the control of the indicator lamps is the same as is shown in Fig. 5 and as has been heretofore described, except that the back contacts 365, 366 and 367 have been included in series with the pick up circuits of the relays GR and YR for the respective flight altitudes so as to check that the respective relays REK, YEK and GEK are in their dropped away positions whenever designation of a control for transmission can be effective for setting the system into a cycle of operation.

The relays REK, YEK and GEK of Fig. 15 can be picked up in an obvious manner by the depression of their associated push buttons REPB, YEPB and GEPB. The picking up of these relays closes an obvious circuit for the lamps 2RE, 2YE and 2GE at front contacts 368, 369 and 370, respectively; and similarly, for the third flight altitude, the closure of front contacts 371, 372 and 373 provides for the energization of the lamps 3RE, 3YE and 3GE. Thus, in a similar manner the lamps GE, YE and RE for the other flight altitudes (not shown) are checked in response to the actuation of the respective push buttons REPB, YEPB and GEPB.

Modified oscillator

There are of course several modifications that may be made in the structure of the oscillators CT in accordance with the requirements of practice, and to illustrate certain of the modifications that may be desirable, reference is made to Figs. 16, 17 and 18. The oscillator disclosed in Figs. 16, 17 and 18 has many parts which will be readily identified as corresponding to the parts heretofore described for the oscillator according to Fig. 11, and further described in the prior patent to O. S. Field, Patent No. 2,351,588, dated June 20, 1944. Thus, to simplify the description of the modification shown in Figs. 16, 17 and 18, corresponding reference characters are used for those parts identical with those parts shown in Fig. 11 and heretofore described, and reference is to be made to that prior description, and to the above mentioned patent to O. S. Field for a full description of these parts.

The modification according to Fig. 16 involves principally the disposition and structure of the stops S which limit the movement of the armature 37 of the oscillator. Each of these stops S comprises a cylindrical bumper 375 of suitable nonmagnetic material such as fiber to be used as a bumper for the ends 37a of the armature 37, these bumpers 375 being secured to the inner surfaces of the respective pole pieces 36 by suitable screws 376 of magnetic material passing axially through the centers of the associated bumpers 375, the bumpers 375 being secured firmly against the pole pieces 36 by nuts 377 threaded onto the screws 376. Each of the nuts 377 is drawn up against a washer 378 which is preferably of magnetic material and of a diameter just slightly less than the diameter of the associated bumper 375.

By using stops of this structure, when the winding 34 of the oscillator CT is energized, a magnetic field is set up following a path of lowest reluctance as indicated by the dotted line 379 of Fig. 17 which extends axially through the magnetic screws 376 holding the bumpers 375 in place, the magnetic washers 378, the ends 37a of the armature 37 and along the center line of the armature 37. Thus, it will be seen that by the use of the magnetic cores 376 and magnetic washers 378 for the stops S, the magnetic field extending through the armature 37 is distorted at the ends of the armature so as to attract the armature with maximum efficiency in a manner to hold it in its locked up position. Therefore, the stops S, according to the oscillator illustrated in Figs. 16, 17 and 18, can be secured to the respective poles 36 at positions beyond the center line of the associated armature 37 when such armature assumes a position with its center line in correspondence with the shortest distance between the respective poles 36. It has been pointed out with reference to Fig. 12 that if the stops are of nonmagnetic material as is assumed in Fig. 12, the stops should be so disposed that the center line of the armature 37 cannot be drawn in full alignment with the shortest distance between the poles 36, because of it being required that the flux of the magnetic structure maintain a torsional pull on the armature 37 so as to maintain the armature locked against its stops, and against the bias of the oscillator spring.

According to the modification shown in Figs. 16, 17 and 18, however, where the magnetic cores are used for the stops S, a distortion of the magnetic field between the respective poles 36 through the armature 37 is maintained, as compared to the shortest distance between these poles 36, by reason of the path of lowest reluctance for the magnetic field being distorted so as to follow the course that has been heretofore described, and that is indicated by the dotted line 379 of Fig. 17.

In the code oscillator illustrated in Fig. 16, an involute spring 380 of heavier material and shorter in length is employed for driving a shaft 381 to which the inner end of the spring is secured, the effective length of this spring being adjustable by a slotted bracket 382 which is in turn secured to an adjustment screw 383. This screw passes through a suitable radial slot 384 in the adjustment arm 385, which in turn is journaled on the lower bearing support 386 of the oscillator CT. This adjustment arm 385 is secured with respect to rotation after the adjustment position has been located by reason of a suitable set screw 387 passing through a bifurcated portion of the adjustment arm 385, thus causing the adjustment arm 385 to be locked with respect to rotation to the bearing support 386. The wedge 374 extends through the slotted bracket 382 beneath the spring 380 as a spacer to space the spring anchorage above the adjustment arm 385.

In accordance with the principle of torsional pendulum operation, a given rate of oscillation can be obtained either by use of a relatively stiff and short spring such as the spring 380 in combination with a heavy pendulum, or by a long relatively small spring such as the spring 32 of Fig. 11 and a relatively light pendulum as the pendulum 33. Thus, if a heavy spring such as the spring 380 is employed, the pendulum of the oscillator must be relatively heavy, and therefore the pendulum 388 of the oscillator shown in Fig. 16 is substantially heavier than the pendulum 33 shown in Fig. 11 to provide for the same rate of oscillation of the oscillator according to Fig. 16 as is accomplished by the oscillator according to Fig. 11.

Because of the pendulum 388 being substantially heavier than the pendulum 33 of Fig. 11, the inertia of the pendulum 388 is such as to set up excessive strain on the bearings of the oscillator and on the stops S and the cooperating armature 37, if this pendulum 388 were positively secured to the rotating shaft 381. Thus, the relatively heavy pendulum 388 cannot be positively secured to the shaft 381 but must be rotated through friction with a suitable friction plate 389, the friction plate 389 being positively secured to the oscillator shaft 381. The pendulum 388 is biased against the friction plate 389 by a suitable compression spring 390 which extends along the axis of the shaft 381 and is suitably maintained under compression by the adjustment and lock nuts 391 which are threaded onto the shaft 381. By this organization, it will be readily apparent that each time the oscillator CT is energized so as to attract the armature 37 against the respective stops S, the armature 37 upon striking these stops is stopped abruptly, but the friction engagement of the pendulum 388 with the friction plate 389 permits the pendulum 388 to slip with respect to the friction plate 389 and thus permit the inertia of the pendulum 388 to be absorbed upon locking of the armature 37 against the stops S, without excessive strain being applied to these stops, and to the bearings, shaft 381, and other parts of the oscillator CT.

It will be noted with reference to Fig. 18, that the magnetic washer 378 is made slightly smaller in diameter than the nonmagnetic bumper 375 so that the ends 37a of the armature 37 cannot directly contact the washer 378, and thus there is no possibility of the armature 37 being held for a time in its locked up position, subsequent to the deenergization of the winding 34 of the oscillator, by reason of residual magnetism in the magnetic circuits of the oscillator.

*Special features*

It will be readily apparent from the description of the system as it has been set forth, that there are principles of operation of the code communication system provided that make the code communication system readily adaptable to various modified remote control systems, and it is to be understood that various adaptations to the communication system may be applied in accordance with the requirements of practice. Some of these added special features have already been described as being applied to the embodiment of the present invention that is illustrated, others will be readily obvious from the drawings and from the description as it has been set forth; and specific consideration will now be given as to some of the special features of the system, some of which relate more particularly to the solving of the air traffic communication problems which has been heretofore considered.

One of the features of the embodiment illustrated of the present invention is that the system is adapted for protection of reservations made at an airways station A for through flights, so that there is no danger of a controller at the airport approach control station B setting up a condition conflicting, or having a tendency to conflict, with the through reservation that has been designated by an airways controller. That is, if an airways controller has reserved the first flight altitude by the actuation of the green push button GPB for that flight altitude in designating the reservation, he has obtained a green aspect for that flight altitude on his panel 21, and has caused a red aspect to be displayed for the first flight altitude on the panel 21 at the approach controller's station B. As has been described, this red aspect at station B, is distinctive from a yellow aspect that would be displayed, if the airplane flight for the associated flight altitude were to be landed at the airport, and thus the character of the aspect displayed on the panel 21 at station B is such as to inform the controller at that station that the first flight altitude has been reserved for a through flight under the supervision of the controller at station A, without any consideration of transfer of authority. If the airplane assigned to the first flight altitude thus designated is not to be landed and is to fly straight through, it will be readily understood that the controller at station B must not cause the laddering down of an airplane at a higher flight altitude until the airplane assigned to the first flight altitude has reported as being clear of the fix under consideration.

To protect the airplane flight for the first flight altitude from the possibility of a conflict from an airplane that may be in the process of being laddered down from a higher flight altitude, it is provided that the controller at station B is prevented from obtaining a clearance for any flight altitude above the flight altitude that has been reserved for the through flight. This is provided (see Fig. 6) by the inclusion of a front contact of the red indication relay RK for each of the lower flight altitudes in the control circuit for each relay GR. Thus, for the second flight altitude, for example, the relay 2GR can be picked up in response to the actuation of the button 2GPB only provided that the relay 1RK is picked up to close front contact 278 in accordance with the lower flight altitude being unreserved for a through flight. If this lower flight altitude were reserved for a flight for which transfer of authority had been designated so that a yellow aspect would have appeared on the panel 21 at station B, obviously the relay 1RK at station B would be in its picked up position according to the mode of operation of the system as it has been described, and therefore under such conditions the closure of front contact 278 of relay 1RK would condition the relay 2GR so that it could be picked up in response to the actuation of the push button 2GPB for second flight altitude, and a green aspect could be displayed on the panel 21 for the second flight altitude in accordance with the normal procedure in setting up such an indication.

Although specific circuits for the indicator lamps and the indication control relays has been shown only for the second flight altitude in Fig. 6, it is to be understood that in order to provide the feature that is being considered with respect to protection for through flights, the relay 3GR (not shown) for the third flight altitude would include in addition to a front contact of the relay 1RK, a front contact of the relay 2RK in series therewith. Similarly, for the higher flight alitudes, front contacts would be provided in series for the relays RK for the respective lower flight altitudes.

Another feature of the present invention that is inherent in the starting circuit organization as selected by the indication control relays for the respective flight altitudes is that a relay RK for a given flight alitude when knocked down in accordance with a reservation having been designated at the other station provides a positive interlock to prevent cancellation of such reservation from being transmitted by the associated station. Thus, with reference to Fig. 6, for example, the opening of front contact 196 of relay 2RK prevents the energization of relays 2GR and 2YR in response to the actuation of the cancellation push button 2RPB for the second flight altitude.

Another feature that is inherent in the organization as described is that even though a garbled code might be received because of abnormal line circuit conditions so as to permit a red aspect indicative of reservation by the other station to be cancelled, such cancellation would not be complete in that it would not become effective at the other station, and therefore if a reservation were to be designated for such flight altitude at the station where the indication had erroneously been cancelled, there would be no execution of the control thus designated at either station, because of the control designated being contrary to the interlock which had been established at a prior time for that flight altitude at the other station by the condition of the indication control magnetic stick relays for the associated flight altitude. Thus, inasmuch as the magnetic stick indication relays could not be conditioned in accordance with the code received, the check relay CK at the receiving station for the cycle of operation under consideration would not be picked up, and therefore the answer back portion of the cycle would not repeat character for character the code originally transmitted, and the answer back detector relay PBP at the transmitting station would be dropped away before time for execution for the answer back portion of the cycle at the transmitting station so as to prevent any execution from taking place.

To consider more specifically a typical example of the above described mode of operation, it will be assumed that a through reservation has been designated at station A for the second flight altitude by the actuation of the green push button 2GPB, and that a red aspect is obtained according to a mode of operation as has been heretofore described on the panel 21 at station B for the second flight altitude. This is in acoordance with the knocking down of relay 2RK at station B in response to the designation of this control. At station A, upon reception of the answer back portion of the control cycle under consideration the relays 2GK and 2YK (see Fig. 5) are picked up. With conditions set up as has been described, if, for some reason, the relay 2RK at station B were to be restored to its picked up position as by the reception of a garbled code due to line circuit difficulties, the red lamp 2RE at station B for the second flight altitude would of course be established by the opening of back contact 196 (see Fig. 6).

If the controller at station B were not aware of the improper extinguishing of the red lamp 2RE, he might attempt to reserve the second flight altitude for an airplane flight by the actuation of the green push button 2GPB. With the relay 2RK picked up, the system would be conditioned so that the usual transmission would take place during the first half of the cycle thus initiated; but upon reception at station A of the control thus designated at station B, because of the indication control relays 2GK and 2YK (see Fig. 5) being picked up at station A at that time, there could be no knocked down circuit established for the lower winding of relay 2RK at station A because of the knocked down circuit for this relay, including the back contacts 284 and 392 in multiple of relays 2YK and 2GK, being open. Inasmuch as these relays would both be picked up at this time, there can be no knocked down circuit closed for the relay 2RK at station A, and there can be no energization of the relays 2GK and 2YK with knock-down energy so as to restore these relays to their knocked down positions.

Thus, the indication control relays 2RK, 2YK and 2GK cannot be conditioned at station A in correspondence with the control code received, and inasmuch as the response of these indication control relays is checked by the relay CK in correspondence with the code received, the relay CK at station A would not be picked up; and therefore a blank code would be transmitted during the answer back portion of the cycle, which would cause the correspondence detector relay PBP at station B to be dropped away prior to execution time, and no answer back code would be executed. Therefore, there could be no clearance indication obtained at station B, and the controller at that station would have called to his attention the matter of there being a conflict which would have to be straightened out by reason of telephone communication with the controller at station A, and suitable designations at station A to either cancel or again designate the clearance for the second flight altitude.

Another feature of the system organization is the provision for manual cancellation which may be required under certain abnormal conditions of the system which could cause an understep of the stepper so as to fail to complete either a first or a second half of a communication cycle. It will be noted from the considerations of the control of the cancel relay CN (see Fig. 7A) that have been given, that the automatic operation of this relay is dependent upon the last step (picking up of relay 6V) having been taken. If because of a dirty contact in the stepping circuit, or a comparable condition, the last step relay 6V cannot be picked up, it may be necessary to actuate a manual cancel button CPB which is illustrated in Fig. 2 as being provided at the top of the panel 21 at each of the stations. The actuation of this push button would be effective to pick up the cancel relay CN (see Fig. 7A) by the energization of a circuit extending from (+), including contact 393 of push button CPB in its depressed position, back contact 394 of relay ST, and upper winding of relay CN, to (−). Upon the picking up of the relay CN under these conditions, the system would be effective to clear out in a manner comparable to that which has been specifically described for the clearing out of the system at the end of a normal communication cycle.

Another condition under which cancellation may be required to be accomplished by actuation of the cancellation push button CPB is a condition where the system has been inactive because of power being removed therefrom, and thus the oscillators CT at the respective stations involved have come to rest at their center positions. It has been described that the center positions of the oscillators CT are the positions where respective left and right-hand contact fingers break, with no overlap or substantial amount of time difference between the opening of one set of contacts and the closure of the other. Thus, it can be readily understood that when an oscillator CT has come to rest by reason of bias of its torsional spring, with no energy applied to its windings, one or the other of the two groups of contacts might possibly be closed at a time when energy is again restored to the oscillator. If this were true, there could be a condition of momentary energization upon application of energy to the system where a first step relay IV could be picked up if the right-hand contacts of the oscillator CT were closed at a time when energy were applied initially to that oscillator. Under these conditions, the picking up of the first step relay IV (see Fig. 7C) would open the circuit for the oscillator CT at back contact 55, and thus cause the restoration of the oscillator to a position where the circuit for the relay IV could again be closed.

To provide for cancellation under such conditions, the cancel button CPB would be required to be actuated to pick up the cancel relay CN (see Fig. 7A), and the picking up of the relay CN would be effective to open the pick up circuit for the relay IV at back contact 109a (see Fig. 7C) and thus cause the relay IV to be dropped away and close its back contact 55 so that the oscillator CT at the associated station could be actuated to its normally energized position. After the dropping away of the relay IV under these conditions, a pick up would be closed for the relay ST (see Fig. 7B) extending from (+), including contact 395 of push button CPB in its depressed position, back contact 396 of relay SM, back contact 397 of relay CDS, back contact 221 of relay 6V, back contact 222 of relay IV, and upper winding of relay ST, to (—). The picking up of relay ST, with the oscillator CT in its energized position, and with its left-hand contact fingers 41 and 45 (see Fig. 7C) closed, would be effective to establish a knocked down circuit which has been described for the cancellation relay CN so as to cause that relay to be restored to its dropped away position and thus condition the system for normal operation.

With reference to the sequence charts of Figs. 14A and 14B, it is to be understood that the time of operation indicated for the respective relays and for the oscillator CT is merely considered such as to provide the desired sequence of operations which has been illustrated, but it is to be understood that these times of operation for the respective relays may vary in accordance with the requirements of practice, and as required for certain specific conditions which have been heretofore considered in the specification.

It will be noted from the circuits that have been described, that certain circuits include half-wave rectifiers, and it is to be understood that these half-wave rectifiers are particularly required to gain a desired relative timing of operating of certain of the relays where a single source of direct current is used for providing energy for all relays. In other words, the rectifiers are employed to isolate certain circuit organizations under specific conditions where it is desired to cause a particular relay, such as the relay PBP, for example, to be quick in dropping away, according to its own natural characteristics, without being affected by the windings of other relays which may be connected in multiple therewith where a single source of direct current is used for supplying energy to all of the relays.

Having thus considered certain specific embodiments of the present invention, it is to be understood that the consideration of these embodiments has been more particularly directed toward a disclosure of the mode of operation of the system and the principles involved, rather than to specify limits of the present invention with respect to its scope. It is thus to be understood that various modifications, adaptations, and alterations may be made to the specific forms shown in accordance with the requirements of practice, and certain features of the system may be omitted, and others may be included in other combinations in accordance with the requirements of practice, all within the scope of the present invention except as limited by the appending claims.

What I claim is:

1. An air traffic control system of communicating indications between an airport approach control station and a distant station for facilitating the controlling of airplane flights, a control panel at each station for a particular fix near an airport, said control panel having disposed thereon two reservation push buttons for each flight altitude, one of said push buttons being provided for designation of a through reservation and the other of said push buttons being provided for designation of a reservation for an airplane flight to be landed at the airport, said control panel having indicator lamps associated with the respective push buttons, a line circuit connecting said stations, a normally at rest code communication system including said line circuit connecting said stations, an indication control relay for each of the indicator lamps for governing its energization, decoding means at each of the stations for selectively governing the actuation of said indication control relays in accordance with distinctive codes communicated over said line circuit, and circuit means for initiating said communication system into a cycle of operation in response to the actuation of either of said push buttons, said circuit means being effective at the airport approach control station to initiate said code communication system for a given flight altitude if there is an indication relay actuated at the approach control station to cause the energization of an indicator lamp for a lower flight altitude, only provided that this indicator lamp has been energized in response to the actuation of said push button for designating transfer of authority, rather than the actuation of said push button for designating a through flight for the associated flight altitude.

2. An air traffic control system of communicating indications between two remotely spaced stations for facilitating the controlling of airplane flights, one of the stations being at an airport, comprising, a control panel at each station for a particular fix near the airport having disposed thereon manually operable means for designating respective flight altitudes and having indicator lamps for the respective flight altitudes for indicating the flight altitudes that have been reserved, an indication control relay for each of said indicator lamps effective when actuated to a particular position to energize the associated indicator lamp, a line circuit connecting the two stations, a code communication system including said line circuit connecting the two stations, said code communication system being normally inactive but being initiated into a cycle of operation for communication of selected control and check codes in response to the actuation of said manually operable means so as to selectively actuate said indication control relays at both stations for the flight altitude that has been designated, and circuit means at the station at the airport for rendering the actuation of said manually operable means ineffective to initiate said code communication system if one of said indication control relays for a lower flight altitude has been actuated in accordance with the designation of a prior reservation at the other station.

3. An air traffic control system connecting two remotely spaced stations comprising, a control panel at each station having manually operable means for designation of respective flight altitude reservations and having indication means for each flight altitude for distinctively indicating as to whether or not a reservation has been made for that flight altitude, a message relay at each station, a line relay at each station, a single line circuit connecting the two stations and including a single source of energy for normally energizing the line relays through contacts of the respective message relays, a normally inactive oscillatory timing device at each station operable through a number of free oscillations when rendered active, said timing device having different sets of contacts closed alternately at regularly timed intervals during said free oscillations, a bank of stepping relays at each station having its stepping operations governed by said groups of contacts of said timing device, normally at rest code communication apparatus including said oscillatory timing devices and said stepping relay banks rendered active in response to said manually operable means at either station for actuating said message relay at the associated station and transmitting during the first part of a cycle a selected control code over said line circuit characteristic of the particular flight altitude reservation that has been designated, said code communication apparatus being effective to selectively actuate said indication means at the other station upon completion of transmission of said selected control code, and check code transmitting and receiving apparatus at each station, said check code transmitting apparatus being rendered effective in response to the completion of the reception of a control code at the associated station during the first part of a cycle of operation of said code communication apparatus to actuate said message relay at the corresponding station and render said code communication apparatus active to transmit a check code over said line circuit during the second part of such cycle matching character for character with the selected control code which has been received during the first part of the cycle, said check code receiving apparatus being responsive to a check code received over said line circuit to actuate said indication means at the station at which the reservation control code has been designated only provided that the received check code corresponds with the reservation control that has been selected in accordance with the actuation of said manually operable means.

4. An air traffic control system connecting two stations comprising in combination, a control panel at each station for a particular fix along an airway, said panel having disposed thereon manually operable means for designating reservation of each of several flight altitudes, and said panel having disposed thereon indicator lamps for each flight altitude, one indicator lamp being provided for each flight altitude for indicating a reservation designation at that station and another indicator lamp being provided for each flight altitude for indicating a reservation designated at the other station, a message relay at each station, a line relay at each station, a single line circuit connecting the two stations and including a source of energy for normally energizing said line relays through contacts of said message relays, a normally inactive oscillatory timing device at each station operable through a number of free oscillations when rendered active, said timing device having different sets of contacts closed alternately at regularly timed intervals during said free oscillations, a bank of stepping relays at each station having its stepping operations governed by said groups of contacts of said timing device, normally at rest code communication apparatus including said oscillatory timing devices and said stepping relays at each station effective in response to the designation of a reservation control at either station to transmit a control code over said line circuit characteristic of the reservation control designated, said code communication apparatus being effective when thus set into operation to actuate said message relay at the transmitting station and thus disconnect said line relay from said line circuit at the associated station, said code communication apparatus being effective to reverse the direction of code transmission at the midpoint of a code communication cycle by the actuation of said message relay for the station that has received the control code during the first part of the cycle and transmit a check code over said line circuit matching character for character with the code that has been received during the first part of the communication cycle, and code receiving means at each station effective to energize said another indicator lamp for a particular flight altitude in response to a check code transmitted from the other station, said code receiving means being effective to energize said one indicator lamp for a particular flight altitude only provided that the check code received during the last half of a communication cycle corresponds with the reservation code that has been transmitted during the first part of the communication cycle.

5. An air traffic control system for communicating indications from a transmitting station to a receiving station, manually operable means at the transmitting station for each of a plurality of flight altitudes for reservation designation, indicating means at each station for each of the flight altitudes, indication control relays for the respective flight altitudes at each of the stations, normally at rest code communication apparatus including a line circuit connecting the transmitting and receiving stations, and including a pair of code transmitting relays at each station, said code communication apparatus being rendered active by the actuation of said manually operable means at the transmitting station to transmit a selected control code characteristic of the reservation for the flight altitude that has been designated, said code communication apparatus being effective to reverse the direction of transmission at a midpoint in a control cycle and transmit from said receiving station to said transmitting station a check code corresponding to the control code that has been received at said receiving station during the first part of the cycle, a bank of decoding relays means at each station for governing said indication control relays in accordance with codes received over the line circuit, said decoding relays at said receiving station being actuated by the reception of said control code, and said decoding relays at said transmitting station being actuated by the reception of said check code, a check correspondence relay at the receiving station, circuit means for energizing said check relay in response to the actuation of said indication control relays at said receiving station only provided that such indication control relays have responded in correspondence with predetermined positions of said decoding relays corresponding to the particular control code that has been received over the line circuit, and circuit means including said transmitter relays and said check relay for permitting the transmission of an answer back code from said receiving station to said transmitting station checking character for character with the control code received during the first part of the cycle at the receiving station only provided that said check relay has been actuated in response to the reception of the same control code.

6. A code communication system connecting a transmitting and a receiving station comprising in combination, manually operable means at the transmitting station for respectively designating different control codes for transmission, normally at rest code communication apparatus including a line circuit connecting said transmitting and receiving stations, said code communication apparatus being rendered active by the actuation of said manually operable means to transmit a control code selected in accordance with the particular manually operable means that has been actuated, said code communication apparatus at the re-receiving station having check code transmitting means including check code transmitting relays effective to reverse the direction of transmission at a midpoint in a communication cycle and transmit from said receiving station to said transmitting station an answer-back code matching character for character with the control code that has been received during the first part of the code communication cycle, a correspondence check relay at the transmitting station, pickup circuit means for energizing said correspondence check relay in response to the actuation of said manually operable means for selecting any one of said control codes for transmission, stick circuit means for maintaining said check relay at the transmitting station picked up until completion of reception of an answer-back code only so long as each character of the answer-back code received at the transmitting station is the same as the corresponding element of the control code transmitted during the first part of that communication cycle, and indication means at the transmitting station responsive to a check code received over said line circuit only provided that said correspondence check relay is maintained picked up throughout the reception of the complete answer-back code.

7. A code communication system connecting a transmitting and a receiving station comprising in combination, manually operable means at the transmitting station for respectively designating different control codes for transmission, normally at rest code communication apparatus including a line circuit connecting said transmitting and receiving stations, said code communication apparatus being rendered active by the actuation of said manually operable means to transmit a control code selected in accordance with the particular condition of actuation of said manually operable means, a bank of decoding relays at the receiving station distinctively conditioned in accordance with the respective code elements received over said line circuit, a plurality of application relays at the receiving station selectively energized at the end of the first half of a communication cycle in accordance with the condition of said decoding relays, a check relay at the receiving station, circuit means for energizing said check relay at the midpoint in a communication cycle only provided that one of said application relays has responded in correspondence with the code set up for the control of that relay by the condition of said decoding relays, check code transmitting means at the receiving station effective only upon the energization of said check relay to transmit a check code over said line circuit during the last half of a communication cycle matching character for character with the code as set up during the first part of the communication cycle by the response of said decoding relays, a correspondence check relay at the transmitting station, pickup circuit means for energizing said correspondence check relay at the transmitting station in response to the actuation of said manually operable means for selecting any one of several control codes for transmission during the first part of a communication cycle, stick circuit means for maintaining said check relay at the transmitting station picked up until completion of reception of an answer-back code only so long as each character of the answer-back code received at the transmitting station is the same as the corresponding element of the control code transmitted during the first part of that communication cycle, and indication means at the transmitting station responsive to a check code received over the live circuit only provided that said correspondence check relay is maintained picked up throughout the reception of the complete answer-back code.

8. A communication system for transmitting and verifying over a single line circuit code messages exchanged between two stations comprising, a line circuit connecting the two stations and normally energized when the system is at rest, a self propelled contactor at each station, said contactors being restored to and maintained in a predetermined initial condition by a sustained energization of the line circuit, said contactors operating at a uniform rate to measure synchronously a plurality of steppings intervals, a bank of stepping relays at each station operated one at a time in sequence by the contactor at that station, code transmitting means at each station including electrically operable contacts controlling the energization of the line circuit during the successive stepping intervals, code receiving means at each station including decoding relays responsive to the condition of energization of the line circuit during the successive stepping intervals, relay means at each station operable to connect said code trasmitting means or said code receiving means at that station alternately with said line circuit, said relay means under normal-at-rest conditions of the system leaving the code receiving means at both stations connected with the line circuit, code determining means at each station operable when a code message is to be transmitted to actuate the relay means at that station and render effective the code transmitting means of that station, said code transmitting means at such station where the message originates acting first to interrupt the line circuit to initiate synchronous operation of the oscillators and banks of stepping relays at both stations and thereafter control the energization of the line circuit during a predetermined number of stepping intervals in accordance with the code message then set up by its code determining means, said code receiving means at the other station acting to condition its decoding relays in accordance with such controlled energization of the line circuit, said banks of stepping relays at both stations acting after a predetermined number of steps to change the condition of the relay means a both stations, thereby converting the originating sending station to a receiving station and the original receiving station to a sending station for transmission and reception of a verification message, the code elements of said verification message being formed at the original receiving station in accordance with the operated condition of the decoding relays at that station, and circuit means checking correspondence between the code elements of the code message set up by the code determining means at the originating transmitting station and the verification code message as received from the other station in accordance with its reception and registration of such original message.

9. A code communication system normally at rest for transmitting during one portion of an operating cycle a code message originating at one station and retransmitting during another portion of the operating cycle such message as received back to the originating station for verification purposes, said system comprising a line circuit connecting two stations and including a source of energy, transmitter contacts and a line relay at each station, a message relay at each station connecting said transmitter contacts or said line relay alternately to said line circuit, a bank of stepping relays at each station, a local electrically operable timing device at each station operable to define like stepping intervals and sequentially energize the associated stepping relays, a plurality of electrically interlocked code determining relays at each station operable one at a time and governing said transmitter contacts during a predetermined number of stepping intervals to form the code elements of a distinctive code message, decoding relays at each station controlled in accordance with the condition of the line relay at that station during a predetermined number of stepping intervals, circuit connections for positioning the message relays to connect the line relays at both stations to said line circuit after the completion of each stepping operation and establish a normal-at-rest condition for the system, circuit connections established by operation of a code determining relay at a station for shifting the message relay at that station and opening said line circuit temporarily to deenergize the line relay at the other station, thereby initiating operation of the timing device and synchronous operation of the stepping relays at both stations, circuit connections established after a predetermined number of steps for shifting the message relays at both stations and for governing the transmitter contacts at the receiving stations in accordance with the operated condition of the decoder relays at that station, thereby converting the station receiving the original code message to a sending station for transmitting a verification code message in accordance with the message as received and the station where the code message originated to a receiving station for such verification code message, and means for checking correspondence between the code elements of the original message set up by a code determining relay at the originating station with those of the verification message received from the other station.

10. A code communication system for communicating respective designated controls in either selected direction between two stations comprising in combination, a line relay at each station, a message relay at each station, line circuit means connecting the two stations and including a single source of energy normally effective to energize both of the line relays through contacts of both of said message relays, a code oscillator at each station, said oscillator being normally inactive but being initiated in response to the energization of the message relay or the deenergization of the line relay at the associated station, a stepping relay bank at each station operable step by step in response to the operation of said code oscillator, circuit means for energizing said message relay at each station in response to the designation of a control for transmission from that station and thereby disconnect the line relay at that station from said line circuit means, code transmitting means at each station rendered active upon the designation at that station of a control for transmission for selectively governing the energization and deenergization of said line circuit means during respective steps formed by said stepping relay bank, and code receiving means at each station rendered active upon the initial deenergization of said line relay at that station so as to be distinctively conditioned by the respective energized or deenergized condition of said line relay at that station during the successive steps taken by said stepping relay bank, said code receiving means remaining inactive at that station having its message relay energized.

11. A code communication system for communicating controls between two stations comprising in combination, normally at rest code communication apparatus including a line circuit connecting the two stations, said code communication apparatus when initiated being effective to transmit selected control codes from one station to the other station during the first half of a communication cycle and being effective to transmit a check code from said other station to said one station during the second half of the communication cycle, a check relay at each station, circuit means for energizing said check relay during a communication cycle only at the station transmitting a check code, said circuit means being effective to maintain said check relay energized until a second cycle has been initiated, and manually operable means effective when actuated to initiate said code communication apparatus into a communication cycle of operation for the transmission of a control code from the associated station, said manually operable means including circuit selection by said check relay whereby the station having its check relay energized obtains initiation of a second cycle in case said manually operable means is actuated at both stations during a first cycle.

12. A normally at rest code communication system for two-way communication between two stations comprising in combination, a line relay at each station, a line circuit connecting the two stations for governing said line relays, a normally inactive timing device at each station operable through a number of free oscillations when rendered active, said timing device having different sets of contacts closed alternately at regularly timed intervals during said free oscillations, initiating means at each station effective when actuated to render said timing device at the associated station operable through a number of free oscillations, said initiating means also being effective over said line circuit to render said timing device at the other station contemporaneously operable, a bank of stepping relays at each station, circuit means at each station including contacts of each of said sets on said timing device at the associated station for successively actuating said stepping relays at the associated station, transmitting means at each station including contacts of each of said sets on said timing device and contacts of said stepping relays at the associated station for transmitting a series of code elements over said line circuit, said code transmitting means being set into operation responsive to the actuation of said initiating means at the associated station, and receiving means at each station including contacts of each of said sets on said timing device and contacts of said stepping relays at the associated station for distinctively responding to the code elements received over said line circuit from the other station.

13. A normally at rest code communication system for two-way communication between two stations comprising in combination, a line relay at each station, a line circuit connecting the two stations for governing said line relays, a normally energized stick relay at each station having its stick circuit governed by said line relay at the associated station, a normally inactive timing device at each station operable through a number of free oscillations when rendered active, said timing device having different sets of contacts closed alternately at regularly timed intervals during said free oscillations, initiating means at each station including said stick relay at the associated station for rendering said timing device at the associated station active through a number of free oscillations, said initiating means also being effective over said line circuit to render said timing device at the other station contemporaneously active, a bank of stepping relays at each station, circuit means at each station including contacts of each of said sets on said timing device at the associated station for successively actuating said stepping relays at the associated station, transmitting means at each station including contacts of each of said sets on said timing device and contacts of said stepping relays at the associated station for transmitting a series of code elements over said line circuit, said code transmitting means being set into operation responsive to said initiating means at the associated station, and receiving means at each station including contacts of each of said sets on said timing device and contacts of said stepping relays distinctively responsive to the code elements received over said line circuit from the other station.

14. A normally at rest code communication system for two-way communication between two stations comprising in combination, a source of energy, a line relay at each station, a single line circuit connecting the two stations and including said source of energy for governing said line relays, a normally energized stick relay at each station having its stick circuit governed by said line relay at the associated station, a normally inactive timing device at each station operable through a number of free oscillations when rendered active, said timing device having different sets of contacts closed alternatively at regularly timed intervals during said free oscillations, initiating means at each station including said stick relay at the associated station for rendering said timing device active at the associated station for a number of free oscillations, said initiating means being effective over the line circuit to render said timing device at the other station contemporaneously active, a bank of stepping relays at each station, circuit means at each station including contacts of each of said sets on said timing device at the associated station for successively energizing said stepping relays at the associated station, stick circuit means at each station for maintaining said stepping relays energized until the stepping of said bank is completed, transmitting means at each station including contacts of each of said sets on said stepping relays at the associated station for transmitting a series of code elements, said code transmitting means being set into operation responsive to said initiating means at the associated station, and receiving means at each station including contacts of each of said sets on said timing device and contacts of said stepping relays distinctively responsive to the code elements received over said line circuit from the other station.

15. A normally at rest code communication system for two-way communication between two stations comprising in combination, a source of energy, a line relay at each station, a single line circuit connecting the two stations and including said source of energy for normally energizing said line relays, a normally inactive timing device at each station operable through a number of free oscillations when rendered active, said timing device having different sets of contacts closed alternately at regularly timed intervals during said free oscillations, initiating means at each station effective to render said timing device at the associated station active through a number of free oscillations, said initiating means also being effective over said line circuit to render said timing device at the other station contemporaneously active, a bank of stepping relays, circuit means at each station including contacts of said sets on said timing device at the associated station for successively actuating said stepping relays at the associated station, odd and even code determining relays at each station, circuit means for energizing an odd code determining relay during each of a plurality of even steps if it has been determined that the next odd code element is to be of a given character, circuit means for energizing said given character, circuit means for energizing said even code determining relay during each of a plurality of odd steps if it has been determined that the next even code element is to be of a given character, code transmitting means at each station including contacts of each of said sets on said timing device and contacts of said stepping relays and of said odd and even code determining relays at the associated station for conditioning said line circuit on each step in accordance with the character of the code element for that step, and code receiving means at each station including contacts of each of said sets on said timing device and contacts of said stepping relays at the associated station for distinctively responding to the code elements received over said line circuit from the other station.

16. In a code system for communicating in both directions between two stations, a line circuit connecting said stations and including a line relay at each station and a single source of energy at one of said stations for normally energizing said line relays, a bank of stepping relays at each station, a timing device at each station having a torsional type pendulum biased by a spring to a center position with respect to rotation, a said timing device having an electromagnet effective when energized to actuate and hold said pendulum in a stop position beyond its extreme oscillatory position, but when deenergized allowing said pendulum to freely swing to each side of said center position, said timing device also having different contacts respectively, operated when said pendulum swings to opposite sides of its center position, circuit means at each station controlled by said contacts of said timing device at that station as they are alternately operated to sequentially operate the stepping relays at such station, stick circuit means at each station effective to maintain said electromagnet at that station energized dependent upon the steady energization of the associated line relay, said stick circuit means effective when deenergized to maintain the associated timing device deenergized to permit a number of free swinging operations, code forming means at each station capable when rendered effective to selectively govern the energization and deenergization of said line circuit on each step of the associated stepping relay bank in accordance with the desired code message, message sending means at each station at times operative to temporarily deenergize said line circuit, said message sending means also rendering said code forming means effective at the corresponding station, code receiving means at each station rendered effective to be distinctively controlled on each step of the associated stepping relay bank in accordance with the energized or deenergized condition of said line relay for that step only providing said message sending means for that station is inactive, and circuit means at each station controlled by said stepping relays when all have been operated to reenergize said stick circuit means to in turn reenergize said electromagnet of said timing device.

17. In a code communication system for transmitting control codes from a sending station to a receiving station, a line circuit connecting said two stations and normally energized when the system is at rest, a bank of stepping relays at each station, an oscillatory timing device at each station having a torsional type pendulum biased by a spring to a mid-position, said timing device being normally energized to hold the pendulum in a stop position beyond its extreme oscillatory position, said timing device also having different contacts respectively cam operated when said pendulum rotates to opposite sides of its mid-position, initiating means at the sending station effective when actuated to render said timing device at the associated station operable through a number of free oscillations, said initiating means also being effective to temporarily deenergize said line circuit to initiate said timing device at the receiving station, circuit means at each staton controlled by the contacts of the timing device at that station as they are alternately operated to sequentially operate the stepping relays at the associated station, code transmitting means at the sending station selectively governing the energization and deenergization of said line circuit during successive stepping intervals to form the code elements of the desired message, a plurality of decoding relays at the receiving station, circuit means at the receiving station including contacts of the associated oscillator and contacts of said stepping relays acting to form channel circuits for the successive steps which are effective to selectively energize or leave deenergized a decoding relay for each step in accordance with the energized or deenergized condition of said line circuit for that step, said contacts of the associated oscillator acting to prepare the channel circuit for each step which is completed upon the response of the stepping relay for the corresponding position of said oscillator, and circuit means at each station controlled by said stepping relays when all are in their operated position to restore the associated timing device to a normally energized stop position.

18. In a code communication system for transmitting code elements from a sending station to a receiving station, a line circuit connecting said two stations and normally energized when the system is at rest, a bank of normally deenergized stepping relays at each station, an oscillatory timing device at each station having a torsional type pendulum biased by a spring to a mid-position, said timing device also having different contacts respectively cam operated when said pendulum swings to opposite sides of its mid-position, said timing device having an electromagnet effective when energized to hold the pendulum in a stop position beyond its extreme oscillatory position, a stick relay at each station having a normally closed stick circuit dependent upon the energized condition of said line circuit, circuit means at each station controlled by said stick relay for normally energizing said electromagnet of the associated timing device, code forming means at the sending station operable to temporarily deenergize said line circuit and thereby deenergize said stick relays at both stations to control the energy for their associated timing devices to permit a number of free swinging oscillatory operations, circuit means at each station controlled by the contacts of the timing device at that station as they are alternately operated to sequentially pick up said stepping relays at that station, stick circuits for said stepping relays at each station operable to maintain the stepping relays energized until the stepping is completed, said code forming means at the sending station also selectively energizing or deenergizing said line circuit during successive stepping intervals to form the code elements of the desired message, a plurality of decoding relays at the receiving station, circuit means at the receiving station including contacts of the associated timing device and contacts of said stepping relays to sequentially form channel circuits, each channel circuit being completed only after the response of the stepping relay for the corresponding position of said timing devices, and each channel circuit being effective to allow a decoding relay for the corresponding step to be selectively energized or deenergized in accordance with the condition of the line circuit for that step, and circuit means at each station rendered effective when all of said stepping relays at that station have been operated to restore said stick relay to a normally energized position and thereby reenergize the electromagnet of the associated timing device to hold its pendulum in its normal stop position.

NELSON B. COLEY.

REFERENCES CITED

The following references are of record in the file of this patent:

UNITED STATES PATENTS

| Number | Name | Date |
|---|---|---|
| 1,689,294 | Potts | Oct. 30, 1928 |
| 1,871,762 | White | Aug. 16, 1932 |
| 2,004,209 | Miller | June 11, 1935 |
| 2,059,204 | Boswau | Nov. 3, 1936 |
| 2,091,301 | Boswau | Aug. 31, 1937 |
| 2,216,610 | Culbertson | Oct. 1, 1940 |
| 2,351,588 | Field | June 20, 1944 |
| 2,425,973 | Wight et al. | Aug. 19, 1947 |
| 2,433,362 | Hartley et al. | Dec. 30, 1947 |
| 2,462,875 | Lane | Mar. 1, 1949 |
| 2,465,582 | Fink | Mar. 29, 1949 |
| 2,515,633 | Coley | July 18, 1950 |